US012502942B1

(12) United States Patent
Murphy et al.

(10) Patent No.: US 12,502,942 B1
(45) Date of Patent: Dec. 23, 2025

(54) VEHICLE WITH RECONFIGURABLE ENERGY STORAGE

(71) Applicant: Oshkosh Corporation, Oshkosh, WI (US)

(72) Inventors: Mitchell Murphy, Oshkosh, WI (US); Ryan Wolf, Oshkosh, WI (US); David Palmer, Oshkosh, WI (US); Aaron Fisher, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 312 days.

(21) Appl. No.: 17/852,072

(22) Filed: Jun. 28, 2022

Related U.S. Application Data

(60) Provisional application No. 63/326,131, filed on Mar. 31, 2022, provisional application No. 63/216,289, filed on Jun. 29, 2021.

(51) Int. Cl.
*B60K 1/04* (2019.01)

(52) U.S. Cl.
CPC ........ *B60K 1/04* (2013.01); *B60K 2001/0438* (2013.01); *B60K 2001/0472* (2013.01); *B60Y 2200/144* (2013.01)

(58) Field of Classification Search
CPC .............. B60K 1/04; B60K 2001/0438; B60K 2001/0472; B60Y 2200/144
See application file for complete search history.

(56) References Cited

U.S. PATENT DOCUMENTS

| | | | | |
|---|---|---|---|---|
| 5,760,569 A | * | 6/1998 | Chase, Jr. | ........... H01M 50/204 414/281 |
| 6,333,570 B1 | * | 12/2001 | Ilg | ........................... H02J 9/061 307/75 |
| 7,712,563 B2 | | 5/2010 | Niebuhr | |
| 10,023,069 B2 | * | 7/2018 | Kobayashi | .......... H01M 50/264 |
| 10,940,771 B1 | * | 3/2021 | Fatemi | .................... B60L 15/20 |
| 11,040,610 B2 | | 6/2021 | Sloan et al. | |
| 11,043,714 B2 | * | 6/2021 | Sloan | ....................... B60K 1/04 |

(Continued)

FOREIGN PATENT DOCUMENTS

| | | | | |
|---|---|---|---|---|
| CN | 204956070 U | * | 1/2016 | |
| CN | 206914306 U | * | 1/2018 | |

(Continued)

OTHER PUBLICATIONS

CN-204956070-U English Translation (Year: 2016).*

(Continued)

*Primary Examiner* — Michael T. Walsh
(74) *Attorney, Agent, or Firm* — Foley & Lardner LLP

(57) ABSTRACT

A vehicle includes a chassis including a first frame rail and a second frame rail, a tractive element coupled to the chassis, a drive motor configured to drive the tractive element to propel the vehicle, and an energy storage system. The energy storage system includes a first battery module and a second battery module. The energy storage system is selectively reconfigurable between (a) a first configuration in which the first battery module and the second battery module each provide electrical energy to the drive motor and (b) a second configuration in which the first battery module is removed from the vehicle and the second battery module provides electrical energy to the drive motor.

20 Claims, 45 Drawing Sheets

(56) References Cited

U.S. PATENT DOCUMENTS

| | | | |
|---|---|---|---|
| 11,124,076 B1* | 9/2021 | Borghi | B62D 21/02 |
| 11,148,519 B2* | 10/2021 | Hung | B60N 2/01 |
| 11,312,221 B2 | 4/2022 | Sloan et al. | |
| 11,588,199 B2* | 2/2023 | Ramadan | H01M 10/613 |
| 11,685,268 B2* | 6/2023 | Sjöholm | B62D 27/02 |
| | | | 180/68.5 |
| 11,766,925 B2 | 9/2023 | Landvik et al. | |
| 11,772,474 B2 | 10/2023 | Sloan et al. | |
| 11,855,479 B2* | 12/2023 | Abramov | H02J 7/1423 |
| 11,894,533 B2* | 2/2024 | Menon | H01M 10/625 |
| 11,932,098 B2* | 3/2024 | Hendriks | B60K 1/04 |
| 11,938,804 B2 | 3/2024 | Andersson et al. | |
| 12,157,362 B2 | 12/2024 | Sloan et al. | |
| 12,202,542 B2 | 1/2025 | Hendriks | |
| 12,208,669 B2 | 1/2025 | Landvik | |
| 2012/0091731 A1* | 4/2012 | Nelson | B60L 58/19 |
| | | | 74/DIG. 9 |
| 2015/0151651 A1 | 6/2015 | Stingle et al. | |
| 2016/0311253 A1 | 10/2016 | Palmer et al. | |
| 2016/0375805 A1 | 12/2016 | Krueger et al. | |
| 2017/0341860 A1* | 11/2017 | Dodds | B60P 1/50 |
| 2019/0185077 A1 | 6/2019 | Smith et al. | |
| 2019/0276102 A1 | 9/2019 | Zuleger et al. | |
| 2020/0247486 A1 | 8/2020 | Groteleuschen et al. | |
| 2020/0256649 A1 | 8/2020 | Krueger et al. | |
| 2020/0290236 A1 | 9/2020 | Bjornstad et al. | |
| 2020/0290237 A1 | 9/2020 | Steffens et al. | |
| 2020/0290238 A1 | 9/2020 | Andringa et al. | |
| 2020/0291846 A1 | 9/2020 | Steffens et al. | |
| 2021/0171137 A1 | 6/2021 | Zuleger et al. | |
| 2021/0276643 A1 | 9/2021 | Ellifson et al. | |
| 2021/0354329 A1 | 11/2021 | Hou et al. | |
| 2021/0380179 A1 | 12/2021 | Smith et al. | |
| 2022/0072736 A1 | 3/2022 | Steffens et al. | |
| 2022/0118854 A1 | 4/2022 | Davis et al. | |
| 2022/0134372 A1 | 5/2022 | Andringa | |
| 2022/0134856 A1 | 5/2022 | Andringa et al. | |
| 2022/0260344 A1 | 8/2022 | Krueger et al. | |
| 2022/0289290 A1 | 9/2022 | Andringa et al. | |
| 2023/0070769 A1 | 3/2023 | Wheeler et al. | |
| 2024/0166040 A1 | 5/2024 | Coupal-Sikes et al. | |
| 2024/0166060 A1 | 5/2024 | Tyerman et al. | |
| 2025/0042236 A1 | 2/2025 | Maroney et al. | |

FOREIGN PATENT DOCUMENTS

| | | | | |
|---|---|---|---|---|
| CN | 113815394 B | * | 2/2024 | B60K 1/04 |
| EP | 4 438 365 A1 | | 10/2024 | |
| JP | 2012-250830 A | | 12/2012 | |
| WO | WO-2022036364 A1 | * | 2/2022 | B60K 1/04 |
| WO | WO-2025/001202 A1 | | 1/2025 | |

OTHER PUBLICATIONS

CN-206914306-U English Translation (Year: 2018).*

WO-2022036364-A1 English Translation (Year: 2022).* https://info.macktrucks.com/refuse-revolution; "Welcome to the refuse revolution. Mack LR Electric." Retrieved on Mar. 21, 2023.

https://www.youtube.com/watch?v=NQFtAnm7D-c; "All-New Mack LR Electric Garbage Truck." Retrieved on Mar. 21, 2023.

* cited by examiner

VEHICLE WITH RECONFIGURABLE ENERGY STORAGE

CROSS-REFERENCE TO RELATED PATENT APPLICATIONS

This application claims the benefit of and priority to U.S. Provisional Application No. 63/216,289, filed on Jun. 29, 2021, and U.S. Provisional Application No. 63/326,131, filed on Mar. 31, 2022, the entire disclosure of which is hereby incorporated by reference herein.

BACKGROUND

The present disclosure relates generally to vehicles. More specifically, the present disclosure relates to a vehicle including a chassis. A chassis typically includes one or more frame components that support the other structures of the vehicle (e.g., a cab, a body, an implement, etc.). The chassis may include tractive elements coupled the frame that engage a support surface (e.g., the ground) to support the vehicle. The chassis may be coupled to components, such as a body or an implement, that are specific to a desired application of the vehicle.

SUMMARY

One embodiment relates to a vehicle. The vehicle includes a chassis including a first frame rail and a second frame rail extending longitudinally, a tractive element coupled to the chassis, a drive motor configured to drive the tractive element to propel the vehicle, and an energy storage system. The energy storage system includes a first battery module coupled to the chassis and extending between the first frame rail and the second frame rail. The first battery module includes a first array of batteries. The energy storage system includes a second battery module coupled to the chassis. The second battery module includes a second array of batteries. The energy storage system is selectively reconfigurable between (a) a first configuration in which the first battery module and the second battery module each provide electrical energy to the drive motor and (b) a second configuration in which the first battery module is removed from the vehicle and the second battery module provides electrical energy to the drive motor.

One embodiment relates to a vehicle. The vehicle includes a chassis having a first frame rail and a second frame rail, a cab coupled to the chassis, a tractive element coupled to the chassis, a drive motor configured to drive the tractive element to propel the vehicle, and an energy storage system. The energy storage system includes a first battery module, a second battery module, and a third battery module. The first battery module includes a first array of batteries and is coupled to the chassis and extends between the first frame rail and the second frame rail. The second battery module is coupled to the chassis and includes a second array of batteries. The third battery module is coupled to the chassis and includes a third array of batteries. The first battery module, the second battery module, or the third battery module provides electrical energy to the drive motor. The first battery module, the second battery module, and the third battery module are positioned rearward from the cab so that a gap is formed between a rear end of the cab and a front end of each of the first battery module, the second battery module, and the third battery module.

One embodiment relates to a refuse vehicle. The refuse vehicle includes a chassis having a first frame rail and a second frame rail, a tractive element coupled to the chassis, a drive motor configured to drive the tractive element to propel the vehicle, a refuse compartment coupled to and supported on the chassis, an actuator coupled to or arranged within the refuse compartment, and an energy storage system. The energy storage system includes a first battery module and a second battery module. The first battery module includes a first array of batteries, and is coupled to the chassis and extends between the first frame rail and the second frame rail. The second battery module is coupled to the chassis and includes a second array of batteries. The energy storage system provides power to the drive motor and the actuator. The energy storage system is positioned below and covered by the refuse compartment This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various exemplary embodiments disclosed herein relate to a vehicle including a reconfigurable energy storage system. A chassis of the vehicle includes a pair of longitudinal frame rails that support the energy storage system. The energy storage system includes a first battery pod that is positioned between the frame rails. A second battery pod extends laterally outward from a first one of the frame rails. A third battery pod extends laterally outward from a second one of the frame rails. A fourth battery pod is positioned between the frame rails, above the first battery pod. The battery pods are each selectively coupled to the chassis such that each battery pod can be removed, replaced, or exchanged with a different battery pod. Specifically, the first, second, third, and fourth battery pods can each be removed by decoupling the battery pod from the chassis. In some embodiments, at least one of the first, second, third, or fourth is configured to be lowered after being decoupled. In some embodiments, at least one of the first, second, third, or fourth battery pods can be removed by sliding the battery pod rearward out of the back of the vehicle. The reconfigurable energy storage system facilitates rapidly reconfiguring the vehicle for use in a variety of different applications.

Overall Vehicle

Figure 1:
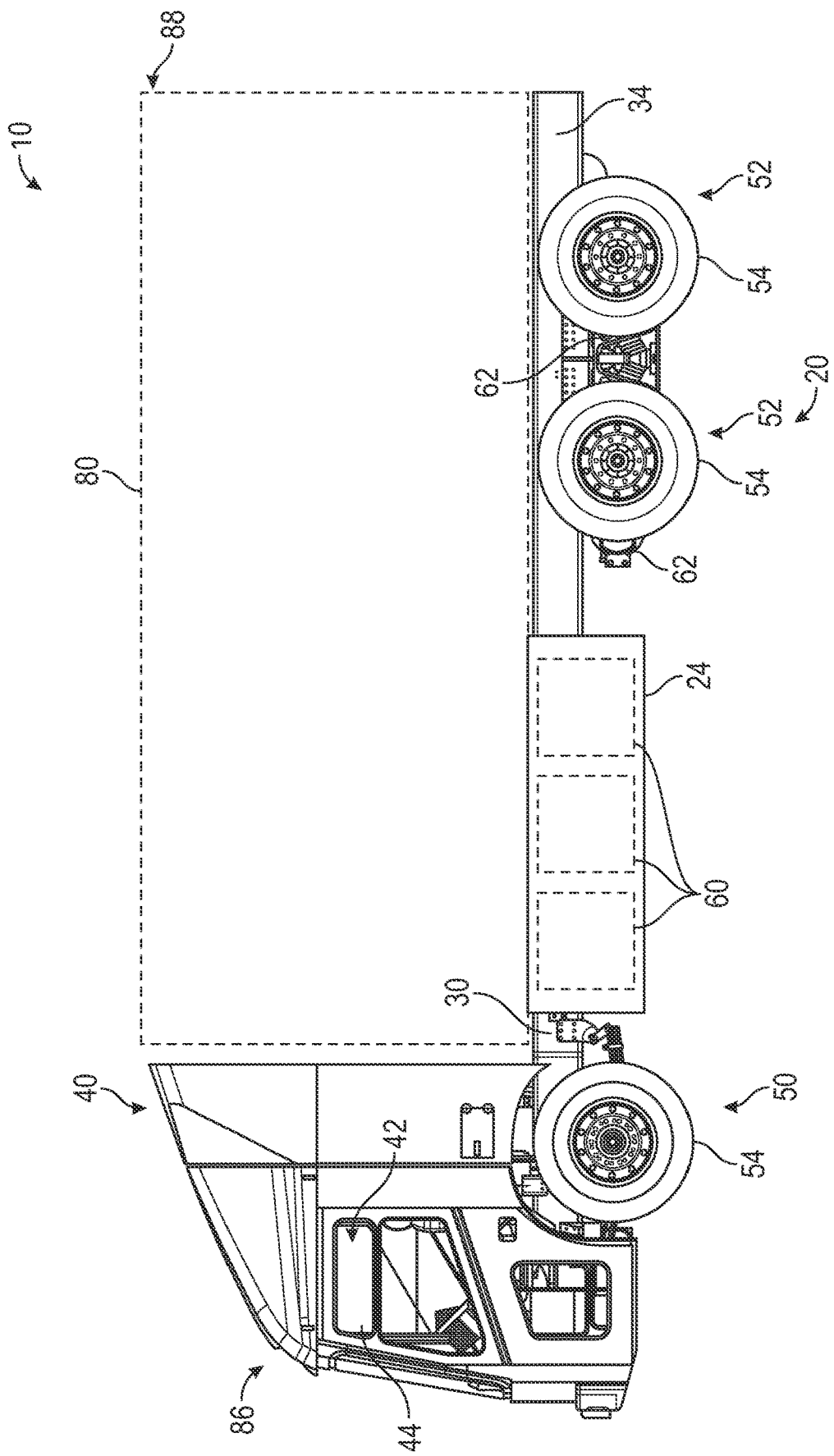
FIG. 1 is a left side view of a vehicle, according to an exemplary embodiment.
Figure 2:
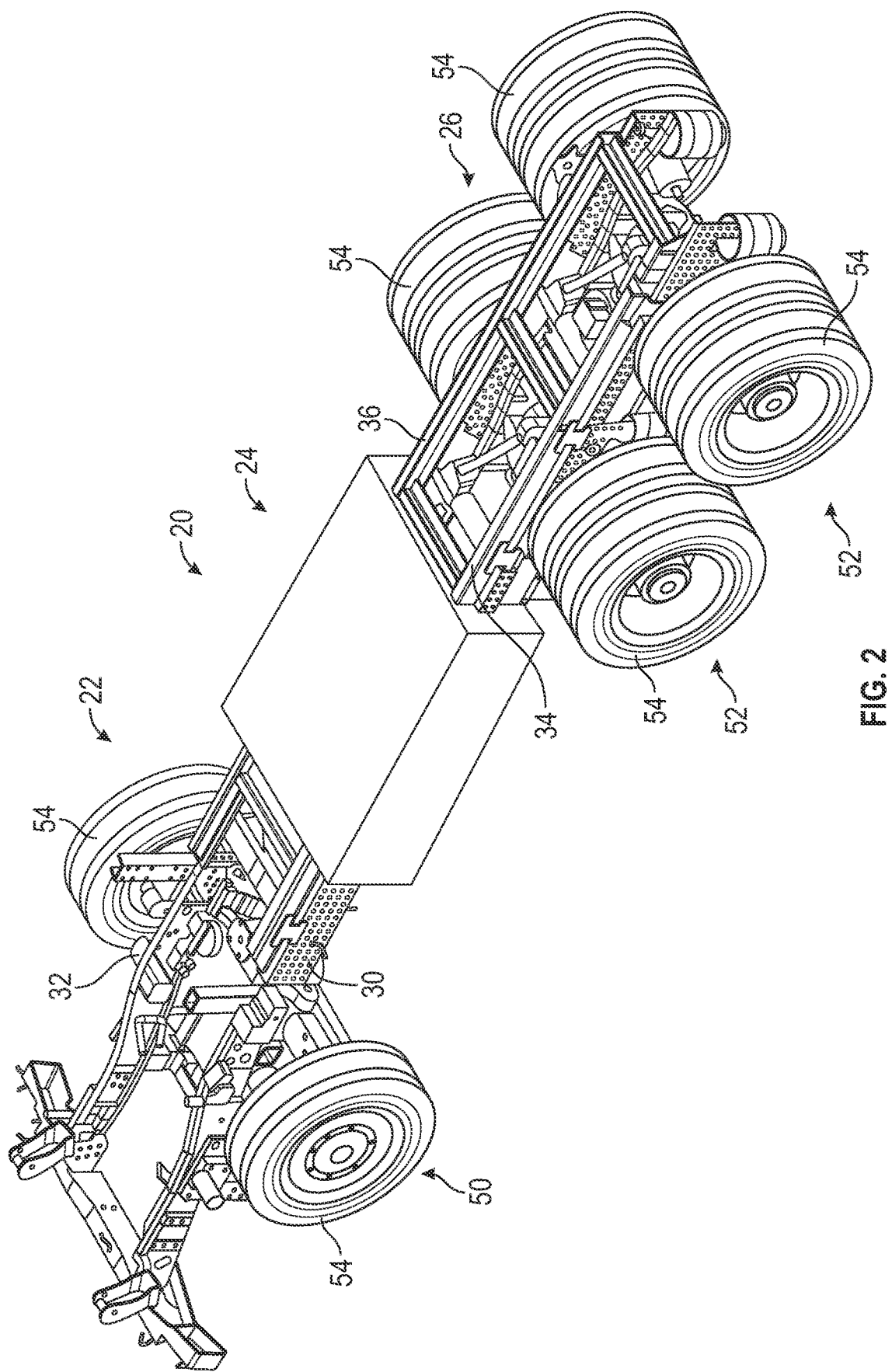
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
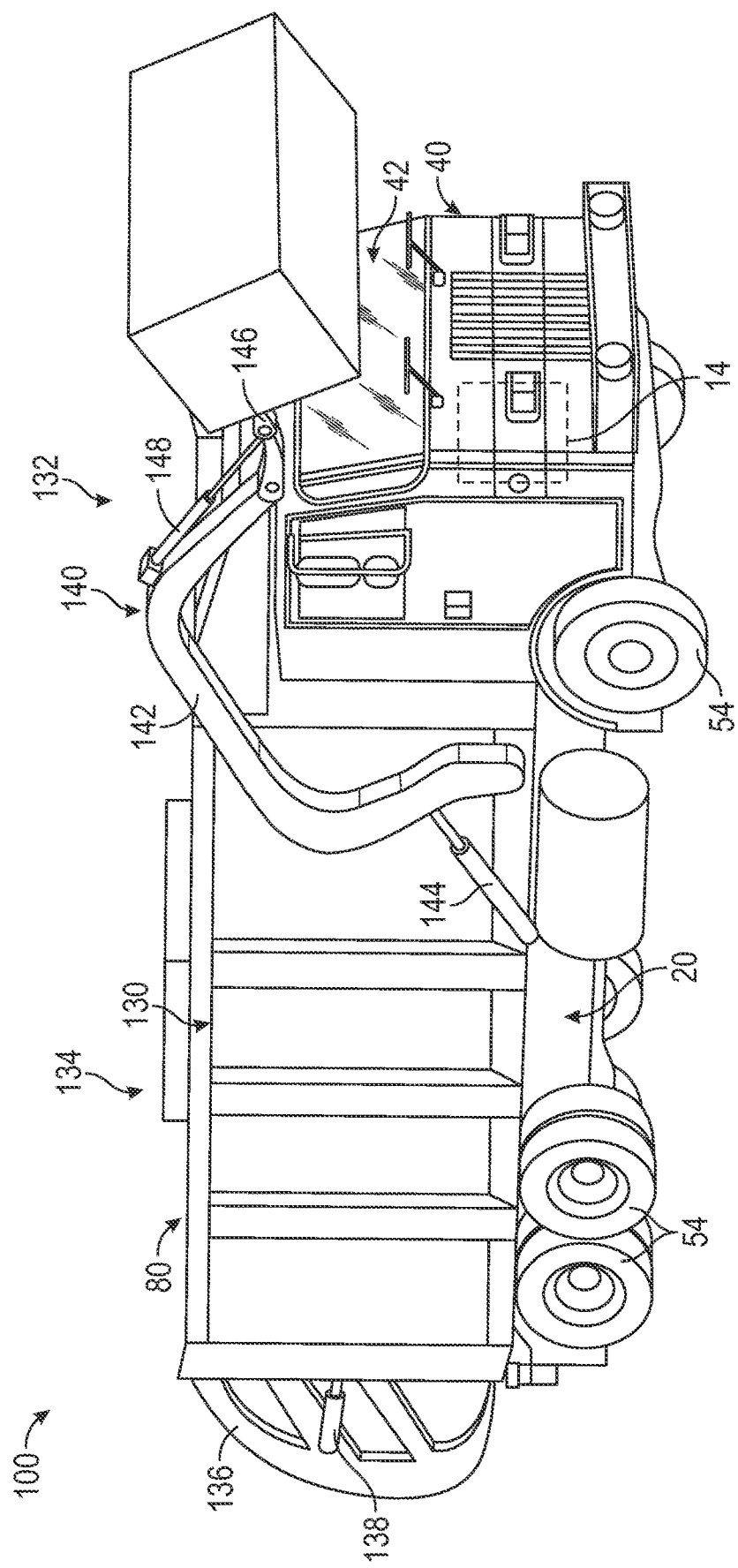
FIG. 3 is a perspective view of the vehicle of FIG. 1 configured as a front-loading refuse vehicle, according to an exemplary embodiment.
Figure 4:
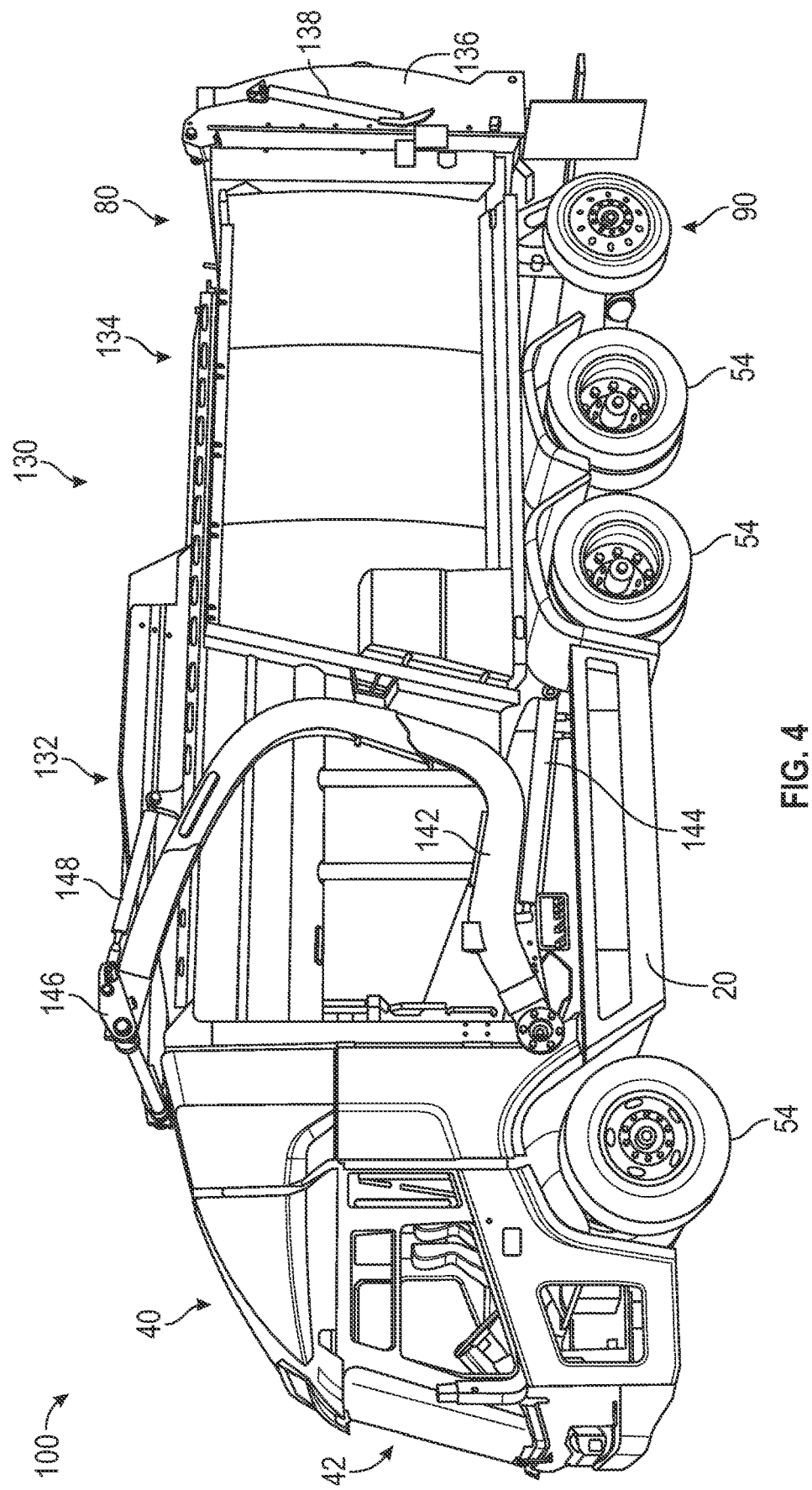
FIG. 4 is a left side view of the front-loading refuse vehicle of FIG. 3 configured with a tag axle.
Figure 5:
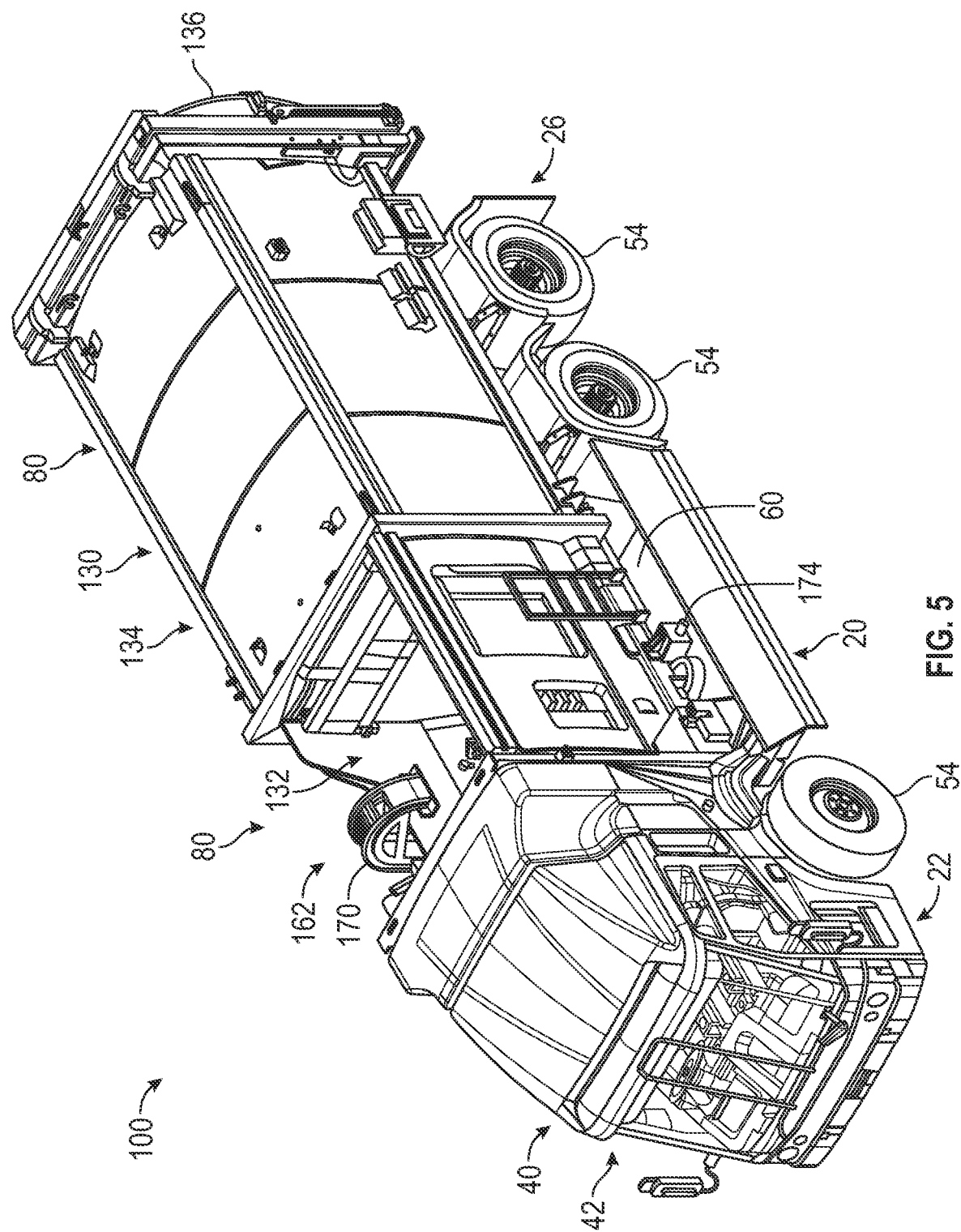
FIG. 5 is a perspective view of the vehicle of FIG. 1 configured as a side-loading refuse vehicle, according to an exemplary embodiment.
Figure 6:
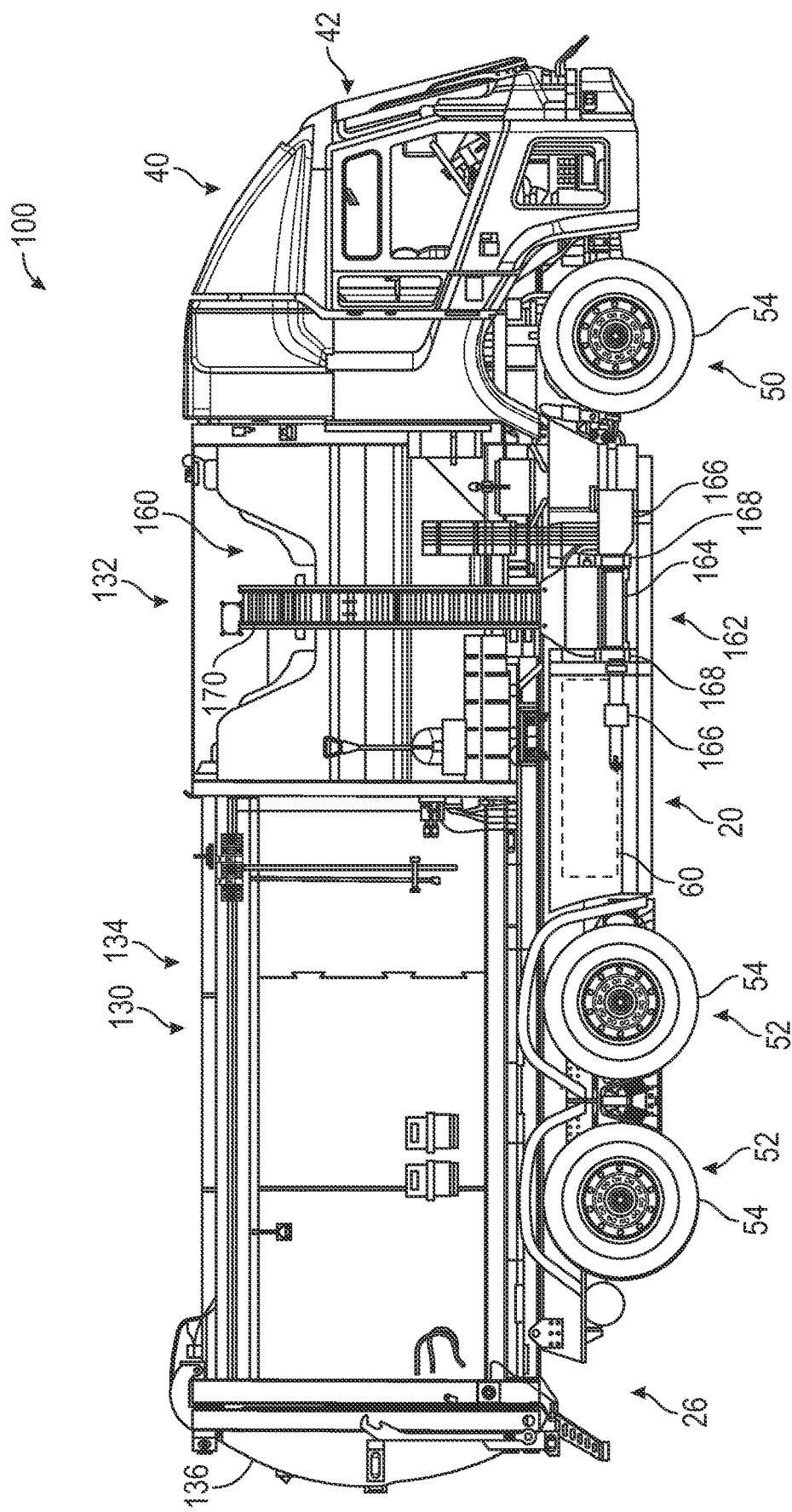
FIG. 6 is a right side view of the side-loading refuse vehicle of FIG. 5.
Figure 7:
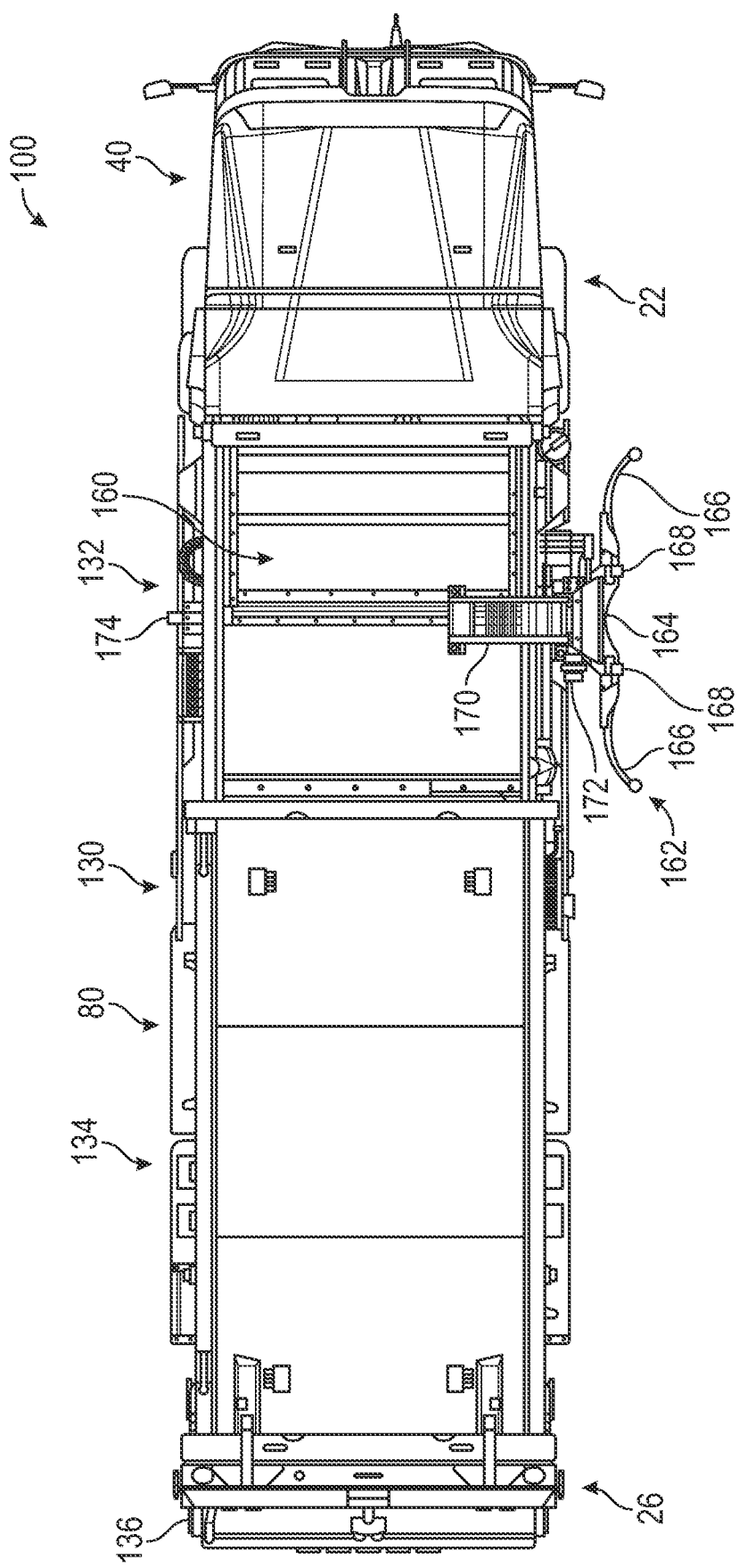
FIG. 7 is a top view of the side-loading refuse vehicle of FIG. 5.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
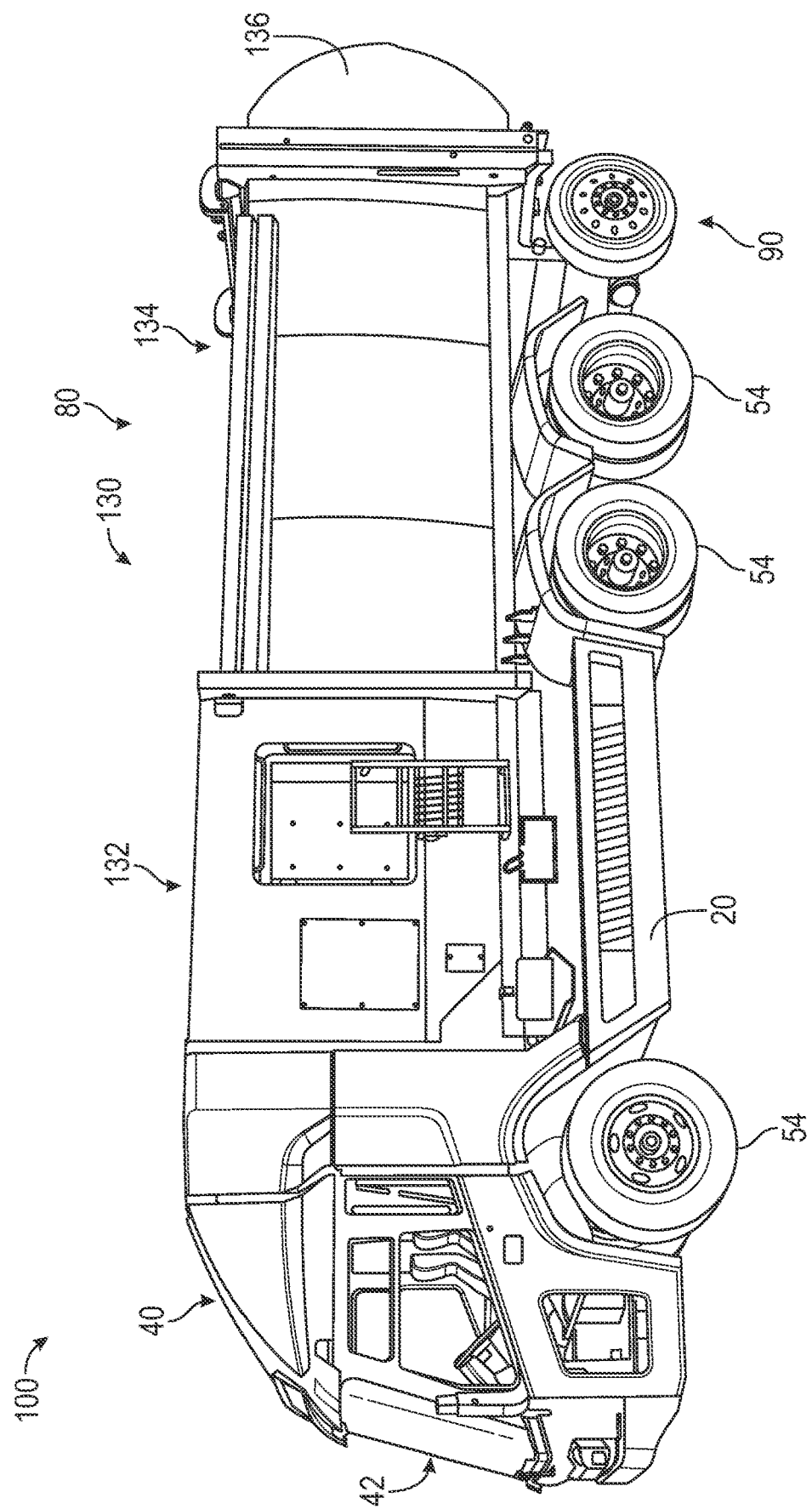
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
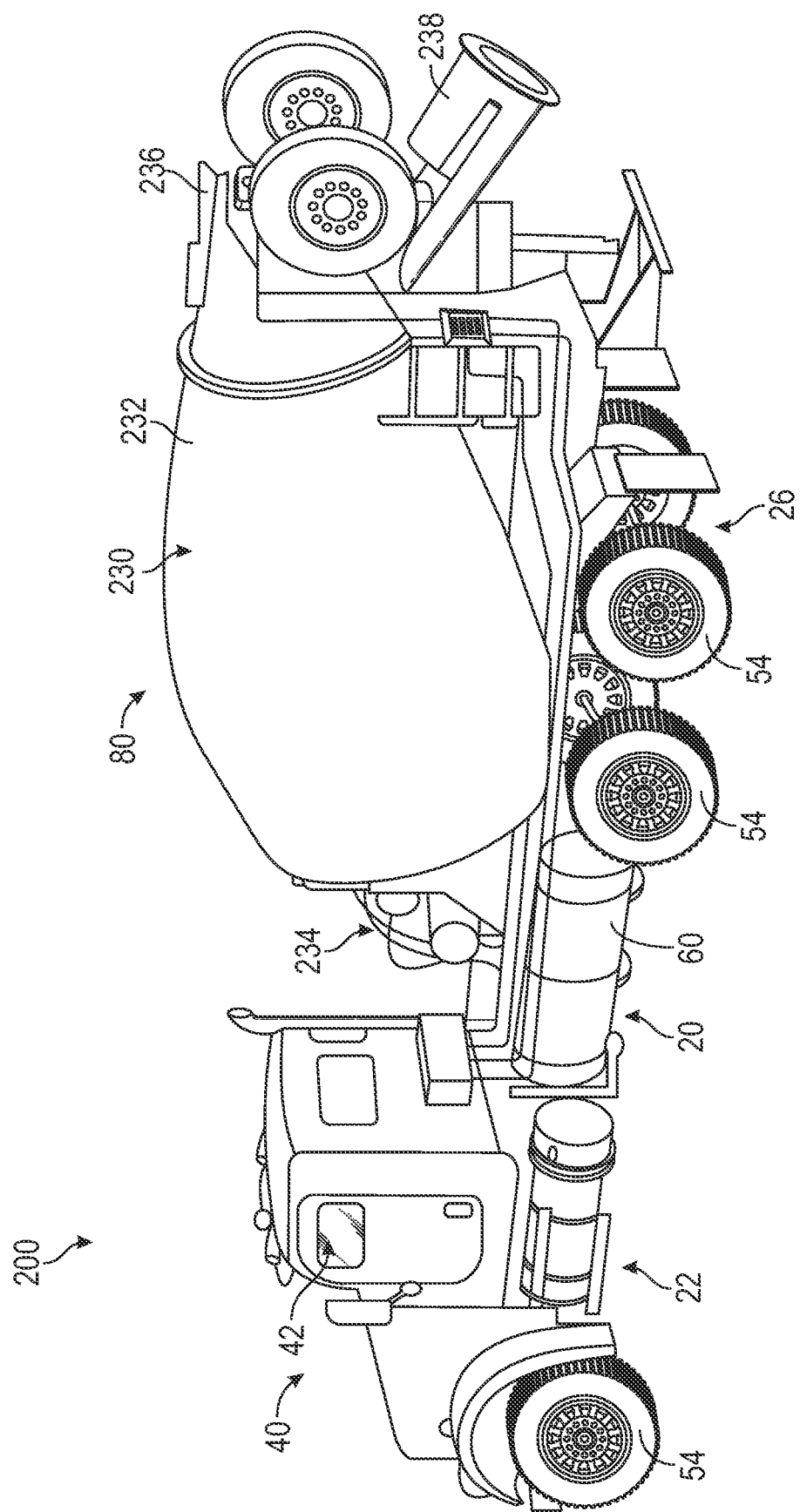
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
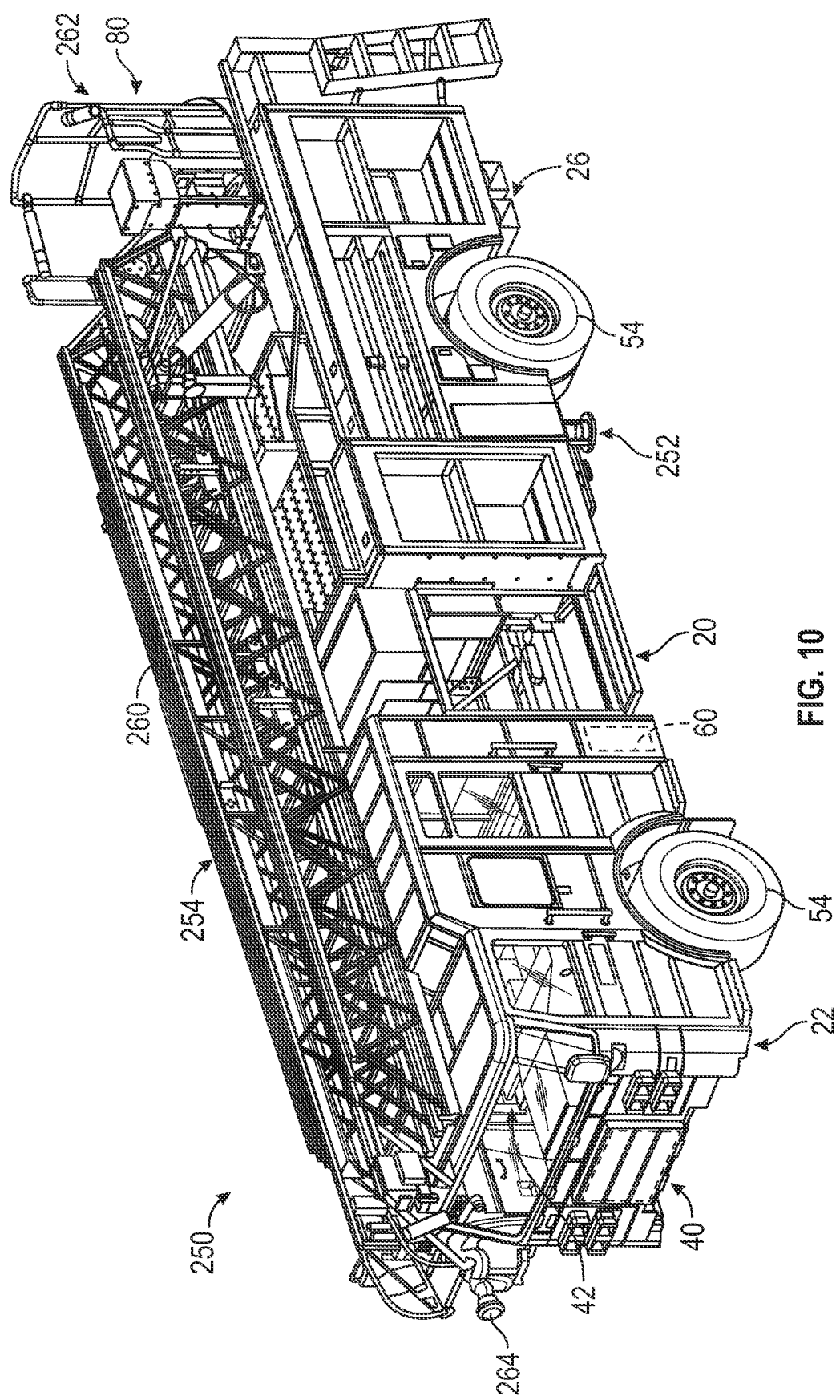
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
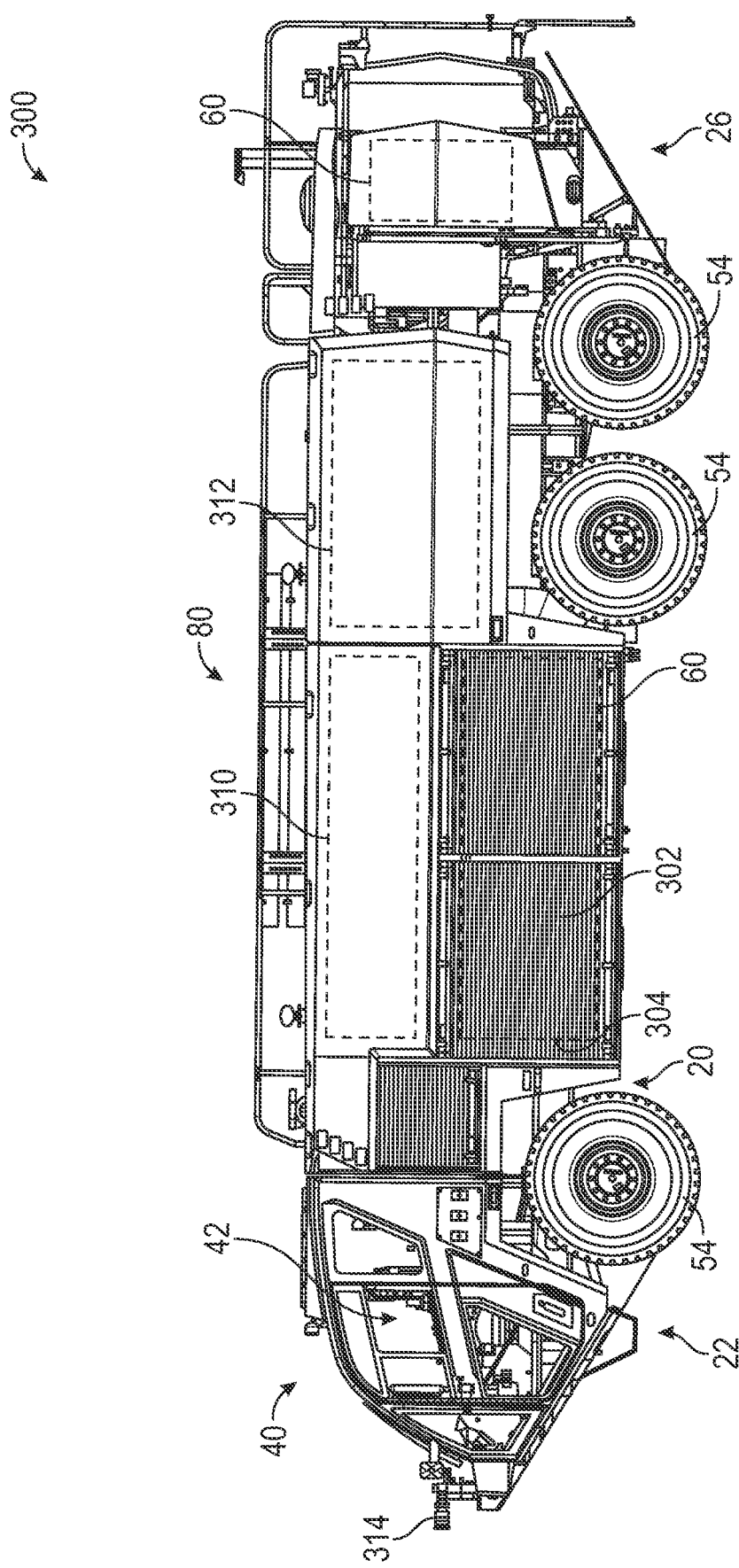
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
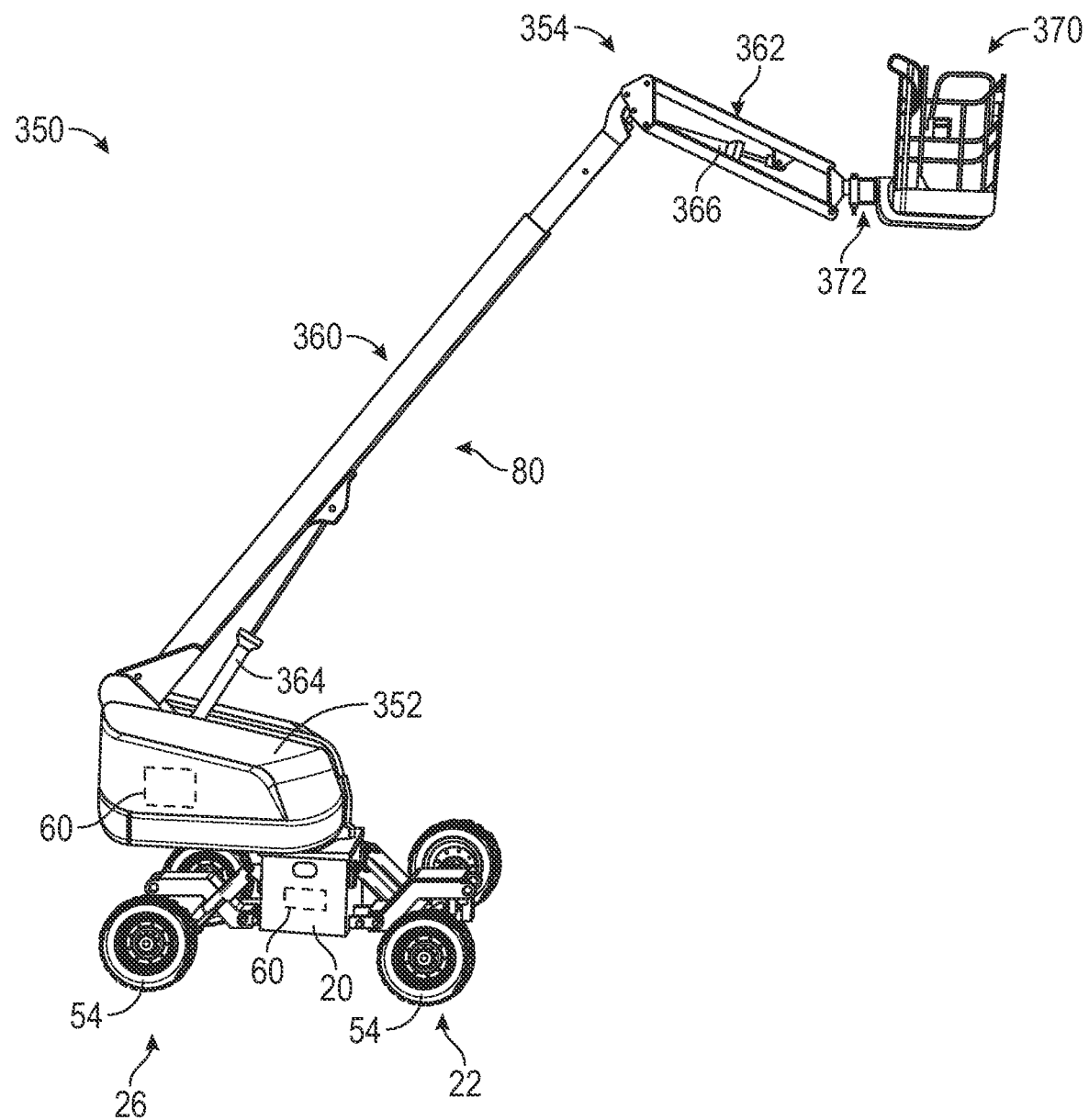
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
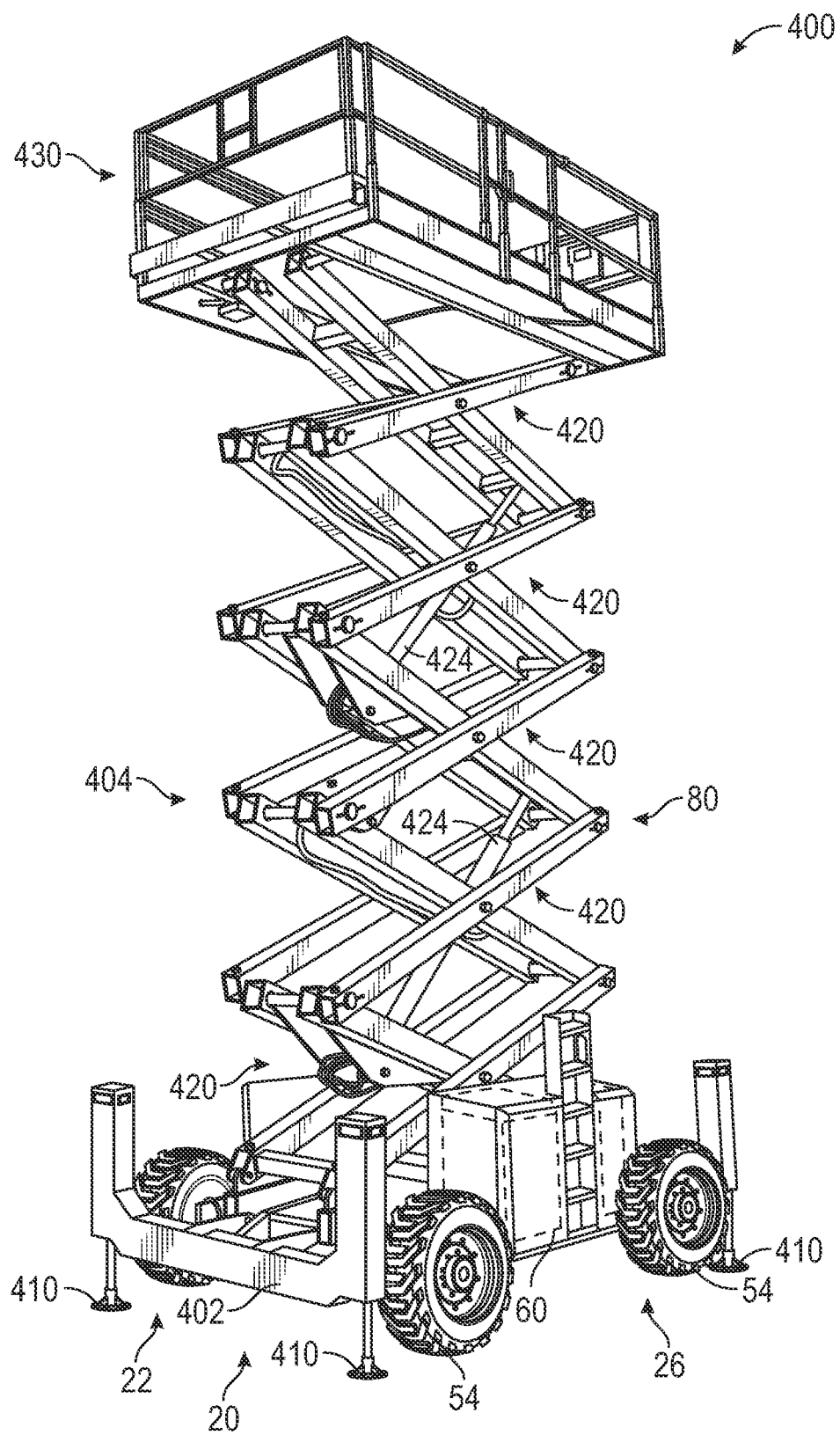
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Reconfigurable Battery Storage

Referring to FIGS. 14-27, a vehicle 2500 is shown as an exemplary configuration of the vehicle 10. Accordingly, any description herein with respect to the vehicle 10 may apply to the vehicle 2500 except as otherwise specified. The vehicle 2500 may be configured with any of the application kits 80 described herein.

Figure 14:
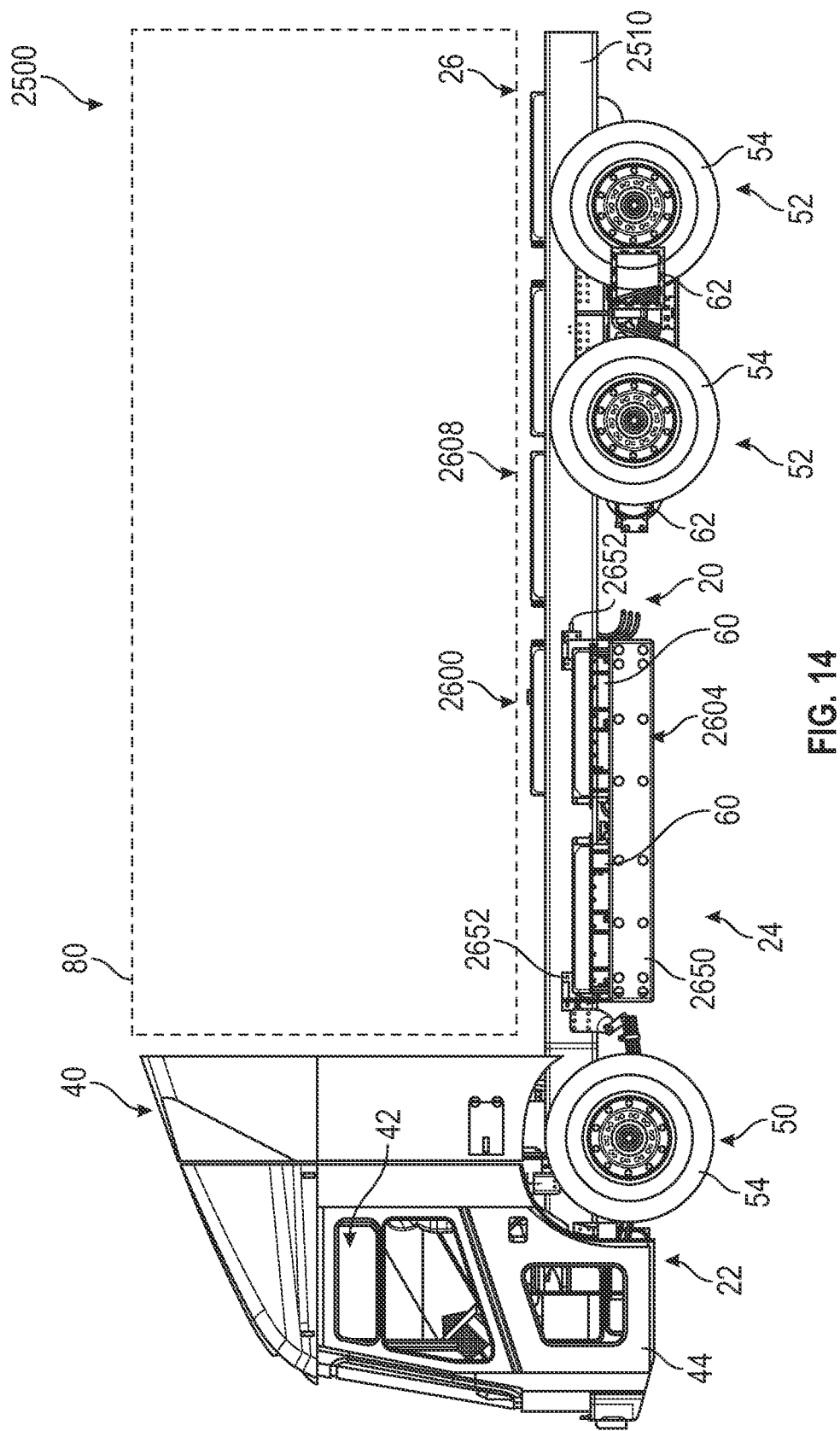
FIG. 14 is a left side view of a vehicle including a battery system, according to an exemplary embodiment.
Figure 15:
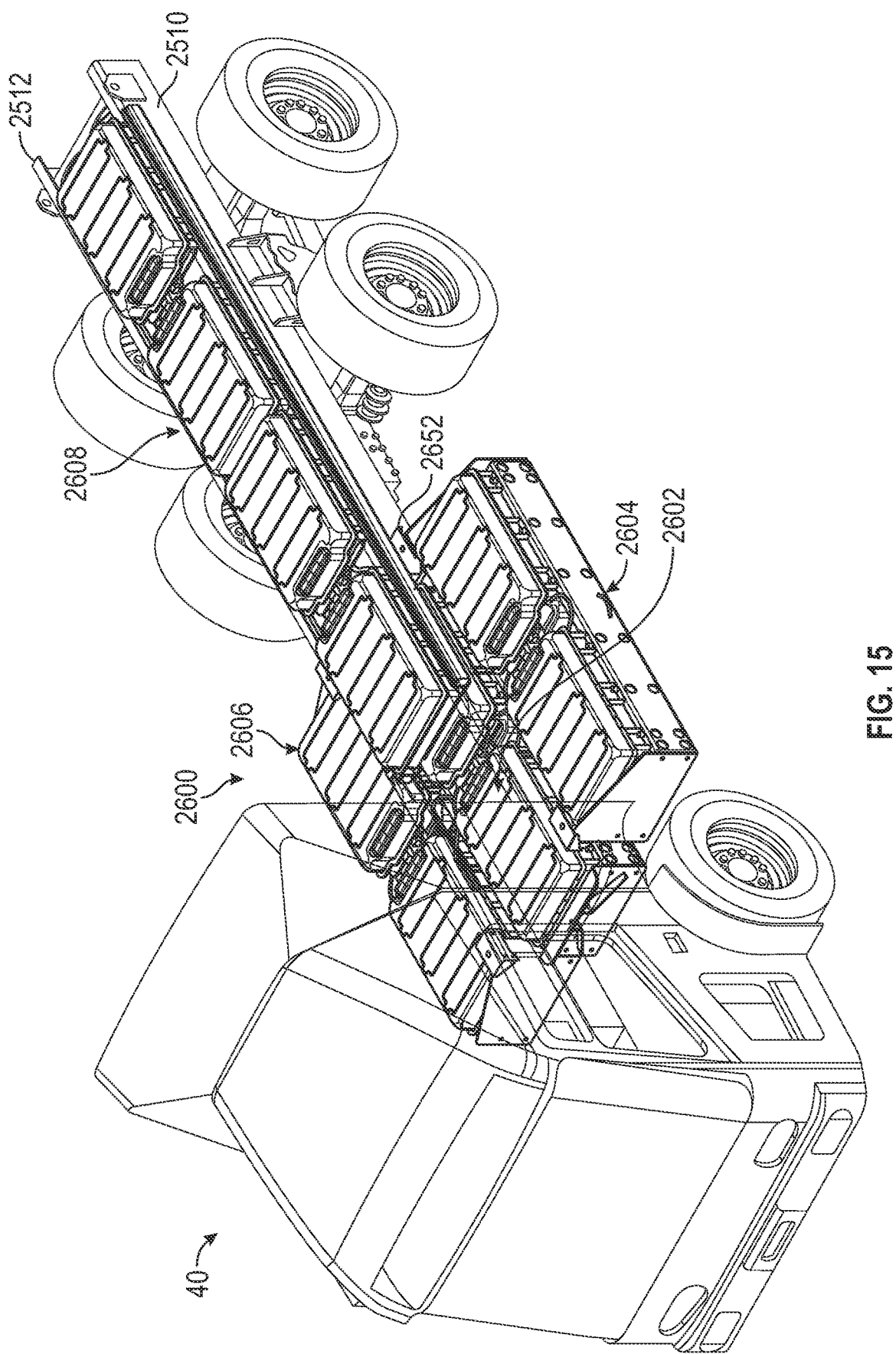
FIG. 15 is a perspective view of the vehicle of FIG. 14 with an application kit hidden.

Referring to FIGS. 14 and 15, the chassis 20 includes two longitudinal frame members, shown as frame rails 2510 and 2512. The frame rails 2510 and 2512 each extend along nearly the full length of the vehicle 2500, from a front end of the vehicle 2500 to a rear end of the vehicle 2500. Accordingly, each of the frame rails 2510 and 2512 extends through the front section 22, the middle section 24, and the rear section 26 of the chassis 20. The frame rail 2510 defines the front rail portion 30 and the rear rail portion 34, and the frame rail 2512 defines the front rail portion 32 and the rear rail portion 36 (see, e.g., FIG. 2).

Figure 16:
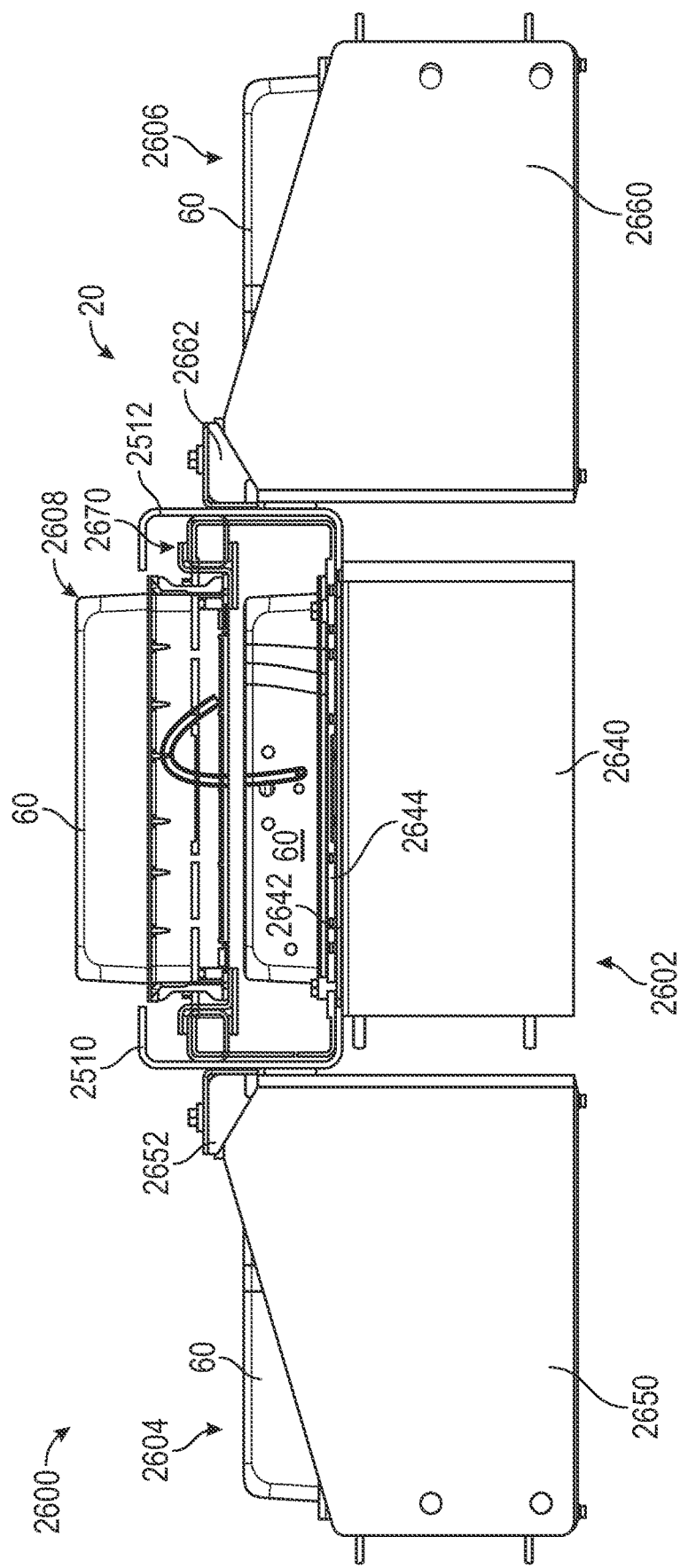
FIG. 16 is a rear view of a chassis and a battery system of the vehicle of FIG. 14, according to an exemplary embodiment.
Figure 17:
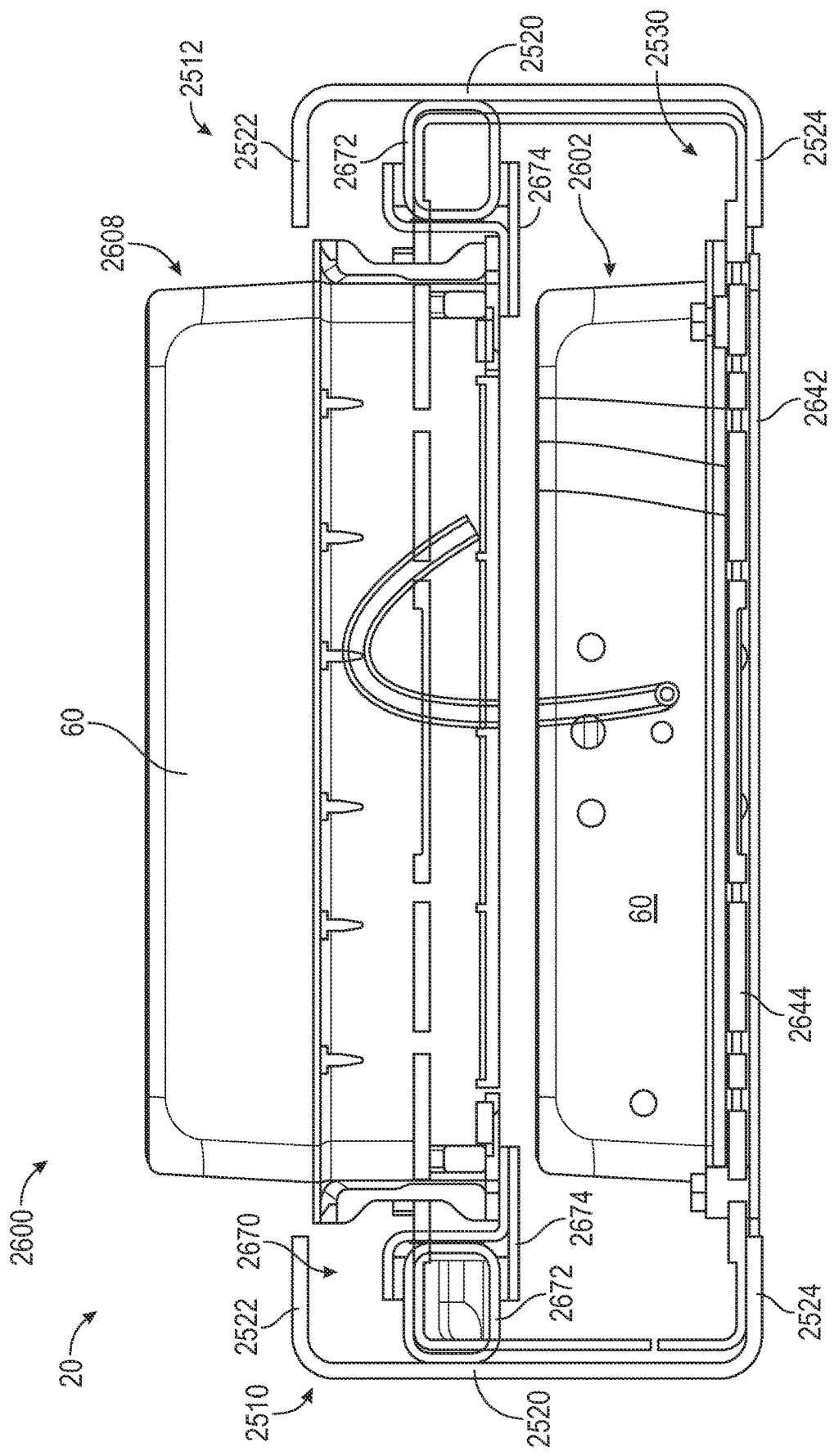
FIG. 17 is an rear view of the battery system of FIG. 14, according to an exemplary embodiment.

Referring to FIGS. 16 and 17, the frame rails 2510 and 2512 each have a C-shaped cross section (e.g., a cross section taken perpendicular to a longitudinal axis). Specifically, each of the frame rails 2510 and 2512 include (a) a first portion or vertical portion (e.g., a wall, a plate, a flange, etc.), shown as base plate 2520, (b) a second portion or horizontal portion (e.g., a wall, a plate, a flange, etc.), shown as top flange 2522, and (c) a third portion or horizontal portion (e.g., a wall, a plate, a flange, etc.), shown as bottom flange 2524. The base plates 2520 each extend substantially parallel to one another, each within separate panes that extend vertically and longitudinally. The top flanges 2522 extend within a common first horizontal plane, substantially perpendicular to the base plates 2520. The bottom flanges 2524 extend within a common second horizontal plane, substantially perpendicular to the base plates 2520. The first horizontal plane is offset above the second horizontal plane. The top flanges 2522 and the bottom flanges 2524 extend laterally toward one another. Accordingly, the frame rails 2510 and 2512 define a partially enclosed space, shown as enclosed space 2530, therebetween.

Referring to FIGS. 14 and 15, the vehicle 2500 further includes a reconfigurable electrical energy storage assembly or a reconfigurable energy storage system (e.g., a battery assembly, a capacitor assembly, etc.), shown as battery system 2600. The battery system 2600 is coupled to the chassis 20 such that the frame rails 2510 and 2512 at least partially support the battery system 2600. The battery system 2600 is configured to provide electrical energy to power the various systems of the vehicle 2500 (e.g., the drive motors 62, the actuators of the application kit 80, etc.).

Figure 18:
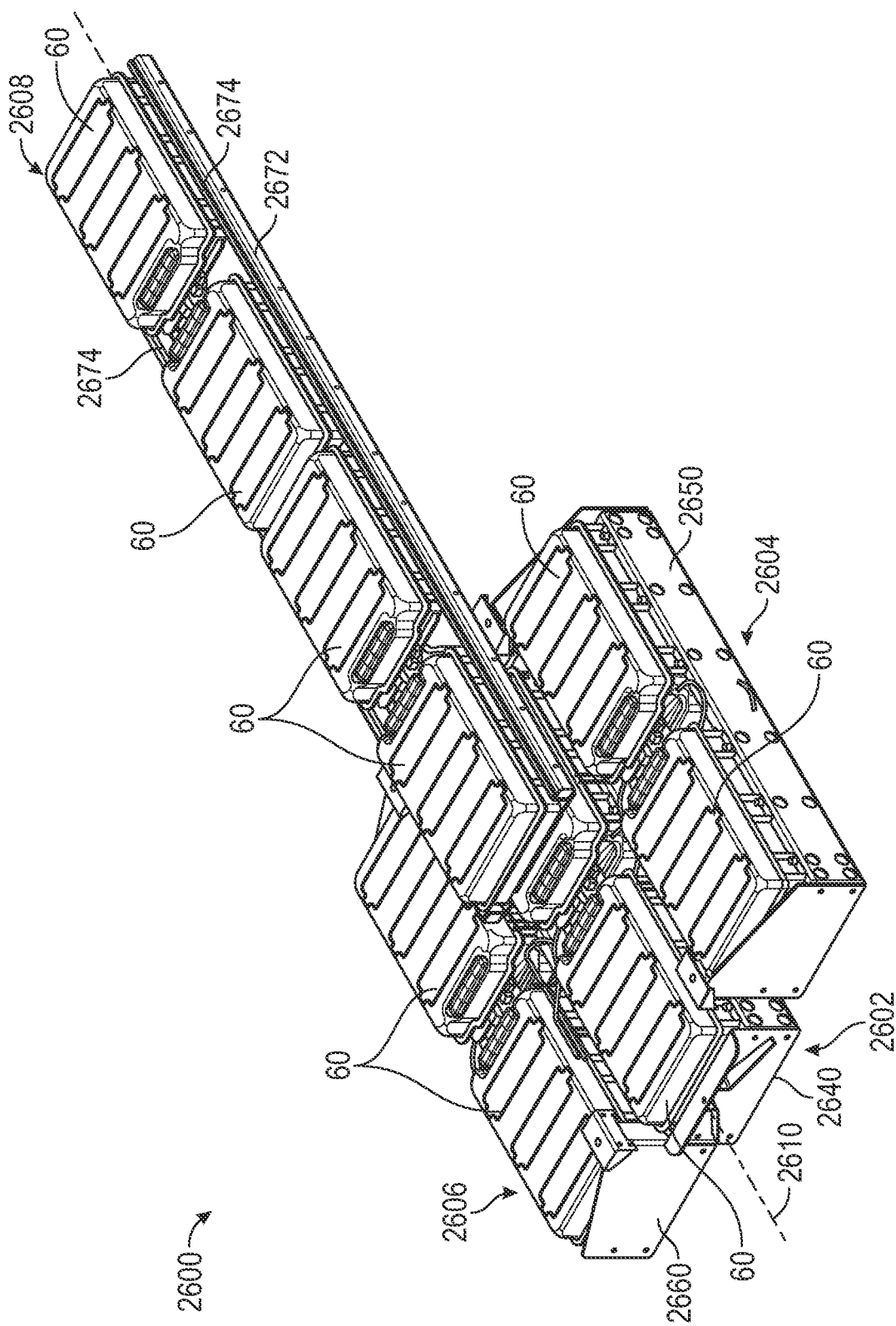
FIG. 18 is a perspective view of the battery system of FIG. 16, according to an exemplary embodiment.

Referring to FIG. 18, the battery system 2600 includes a series of sections, battery strings, battery pods, battery modules, or battery assemblies. Specifically, the battery system 2600 includes a first section (e.g., a middle module, a first module, or lower module), shown as center pod 2602, a second section (e.g., a left side module, or second module), shown as side pod 2604, a third section (e.g., a right side module or third module), shown as side pod 2606, and a fourth section (e.g., a tray module, a center module, a top module, a sliding module, a fourth module, a rear module, etc.), shown as rear or rear pod 2608. Each of the battery pods includes a string of one or more interconnected batteries 60 and a structure (e.g., a frame, a tray, etc.), that supports the batteries 60. For example, the center pod 2602 and the side pods 2604, 2606 are each shown with two batteries 60, while the rear pod 2608 is shown with four batteries 60.

In some embodiments, the battery pods are symmetrically distributed along a longitudinal centerline 2610 of the vehicle 2500 (e.g., an axis that is centered between the frame rails 2510 and 2512). By way of example, the center pod 2602 may be centered about the longitudinal centerline 2610. By way of example, the side pod 2604 and the side pod 2606 may be similarly sized and shaped and each offset laterally from the longitudinal centerline 2610 an equal distance in opposite directions, such that the side pod 2604 and the side pod 2606 are symmetrically arranged relative to one another about the longitudinal centerline 2610. By way of example, the rear pod 2608 may be centered about the longitudinal centerline 2610. Such a symmetrical positioning may facilitate an even lateral distribution of the weight of the battery system 2600 throughout the vehicle 2500.

Referring to FIGS. 14-17, the center pod 2602, the side pod 2604, and the side pod 2606 are located in approximately the same longitudinal position. The center pod 2602, the side pod 2604, and the side pod 2606 are positioned primarily within the middle section 24 of the chassis 20. Specifically, the center pod 2602, the side pod 2604, and the side pod 2606 are offset a distance longitudinally rearward from the cab 40, such that a space or gap is formed between the rear end of the cab 40 and the front ends of the center pod 2602, the side pod 2604, and the side pod 2606. The center pod 2602, the side pod 2604, and the side pod 2606 are positioned longitudinally between the front axle 50 and the frontmost rear axle 52. Specifically, the front ends of the center pod 2602, the side pod 2604, and the side pod 2606 are offset a distance longitudinally from the front axle 50. The rear ends of the center pod 2602, the side pod 2604, and the side pod 2606 are offset a distance longitudinally from the frontmost rear axle 52.

The top surfaces of the center pod 2602, the side pod 2604, and the side pod 2606 are positioned vertically between the top flanges 2522 and the bottom flanges 2524. The center pod 2602, the side pod 2604, and the side pod 2606 each extend below the bottom flanges 2524. The bottom surfaces of the center pod 2602, the side pod 2604, and the side pod 2606 are offset from the ground to provide ground clearance.

The rear pod 2608 is longer in the longitudinal direction than the center pod 2602, the side pod 2604, and the side pod 2606. In some embodiments, the rear pod 2608 is approximately twice the length of the center pod 2602, the side pod 2604, and the side pod 2606 (e.g., because the rear pod 2608 includes twice as many batteries 60). The rear pod 2608 extends longitudinally into the middle section 24 and rear section 26 of the chassis 20. The front end of the rear pod 2608 is positioned between the front ends and the rear ends of the center pod 2602, the side pod 2604, and the side pod 2606. The rear end of the rear pod 2608 is positioned between the rearmost rear axle 52 and a rear end of the chassis 20.

The rear pod 2608 is generally positioned above the center pod 2602, the side pod 2604, and the side pod 2606. Specifically, a bottom surface of the rear pod 2608 is positioned above the top surfaces of the center pod 2602, the side pod 2604, and the side pod 2606. A front end portion of the rear pod 2608 may extend substantially directly above a rear end portion of the center pod 2602 (e.g., such that the frontmost battery 60 of the rear pod 2608 is substantially directly above a rearmost battery 60 of the center pod 2602). A top surface of the rear pod 2608 is positioned above a top surface of the chassis 20. Specifically, as shown in FIGS. 14 and 17, the top surface of the rear pod 2608 is vertically offset a distance above the top surfaces of the top flanges 2522.

Figure 19:
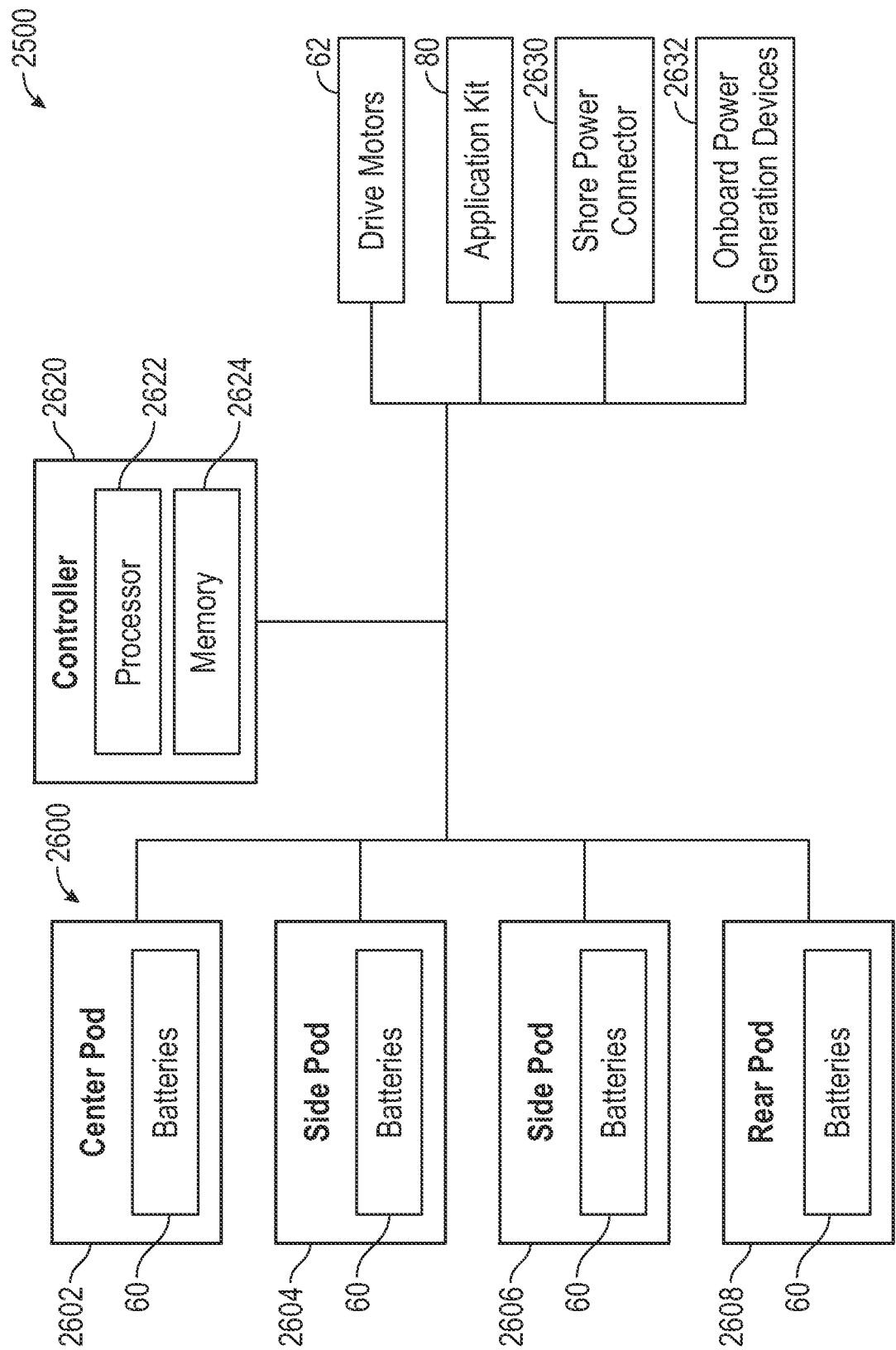
FIG. 19 is a block diagram of the vehicle of FIG. 14, according to an exemplary embodiment.
Figure 20:
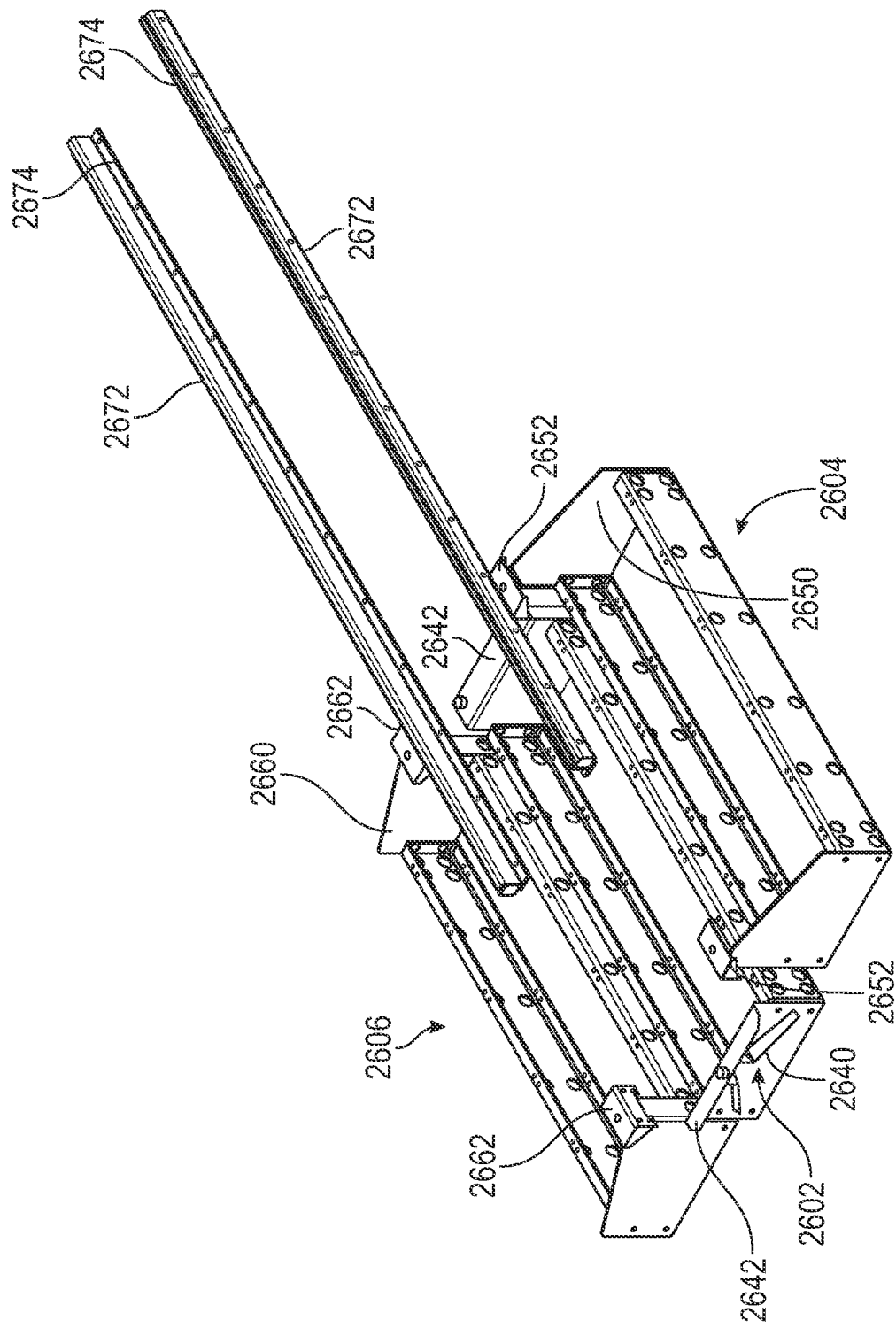
FIG. 20 is a perspective view of the battery system of FIG. 18 with the batteries removed, according to an exemplary embodiment.

Referring to FIGS. 18 and 19, each of the battery pods (e.g., the center pod 2602, the side pod 2604, the side pod 2606, and the rear pod 2608) include one or more energy storage devices (e.g., electrical energy storage devices, batteries, an array of batteries, capacitors, etc.), shown as the batteries 60. For example, the center pod 2602 includes a first array of batteries 60, the side pod 2604 includes a second array of batteries 60, the side pod 2606 includes a third array of batteries 60, and the rear pod 2608 includes a fourth array of batteries 60. The batteries 60 store energy (e.g., as chemical energy, as charge across plates, etc.) to later be provided as electrical energy to power various systems of the vehicle 2500. As shown in FIG. 19, the batteries 60 are electrically coupled to the drive motors 62 and the application kit 80 (e.g., to one or more actuators of the application kit 80). Each of the batteries 60 may include one or more cells.

The batteries 60 within each battery pod may be electrically coupled to one another to form an interconnected battery string. By way of example, the batteries 60 within a battery pod may be connected in parallel with one another to increase the battery life (e.g., battery capacity) provided by the battery pod. The batteries 60 within a battery pod may be connected in series with one another to increase the peak output power of the battery pod. Similarly, the battery pods may be electrically coupled to one another. By way of example, the battery pods may be connected in parallel with one another to increase the battery life of the vehicle 2500. The battery pods may be connected in series with one another to increase the peak output power available to the vehicle 2500.

The vehicle 2500 further includes a processing circuit, shown as controller 2620, that controls operation of the vehicle 2500. The controller 2620 includes a processor 2622 and a memory device, shown as memory 2624. The memory 2624 may store instructions that are executed by the processor 2622 to perform the various functions described herein. The controller 2620 is operatively coupled to the batteries 60. The controller 2620 may be powered by the batteries 60. The controller 2620 may control charging of the batteries 60 (e.g., the flow of electrical energy to each of the batteries 60) and/or depletion of the batteries 60 (e.g., the flow of electrical energy from each of the batteries 60). By way of example, the controller 2620 may cause the batteries 60 of one battery pod (e.g., the rear pod 2608) to have priority over the other battery pods in charging or depletion (e.g., the controller 2620 may cause the batteries 60 of one battery pod to be depleted and/or charged at a faster rate or before the other pods). In one example, the controller 2620 causes the batteries 60 of the rear pod 2608 to be depleted to a threshold charge (e.g., 50% charge, 20% charge, 0% charge, etc.) before discharging energy from the other battery pods. In another example, the controller 2620 draws more energy from the batteries 60 of the rear pod 2608 than any of the other battery pods (e.g., 1000 watts from the rear pod 2608 and 200 watts from each of the other battery pods, etc.).

The batteries 60 of the battery pods may be charged by a variety of different sources. By way of example, the drive motors 62 and/or the actuators of the application kit 80 may provide electrical energy to the batteries 60 when back-driven. Such a configuration may facilitate the drive motors 62 and/or the actuators of the application kit 80 providing a braking force. By way of another example, the batteries 60 may be charged by a power source offboard the vehicle 2500. As shown in FIG. 19, the battery system 2600 of the vehicle 2500 includes a power source (e.g., a charging cable, a charging port, etc.), shown as shore power connector 2630, that is electrically coupled to the batteries 60. The shore power connector 2630 may be selectively coupled to an external power source (e.g., a power grid) to provide electrical energy to the battery system 2600. By way of another example, the vehicle 2500 may include one or more onboard devices that provide electrical energy to charge the batteries 60, shown as onboard power generation devices 2632 (e.g., onboard power generators). The onboard power generation devices 2632 may include solar panels, generators (e.g., diesel generators, gasoline generators, fuel cells, etc.), and/or other devices that provide electrical energy.

Figure 42:
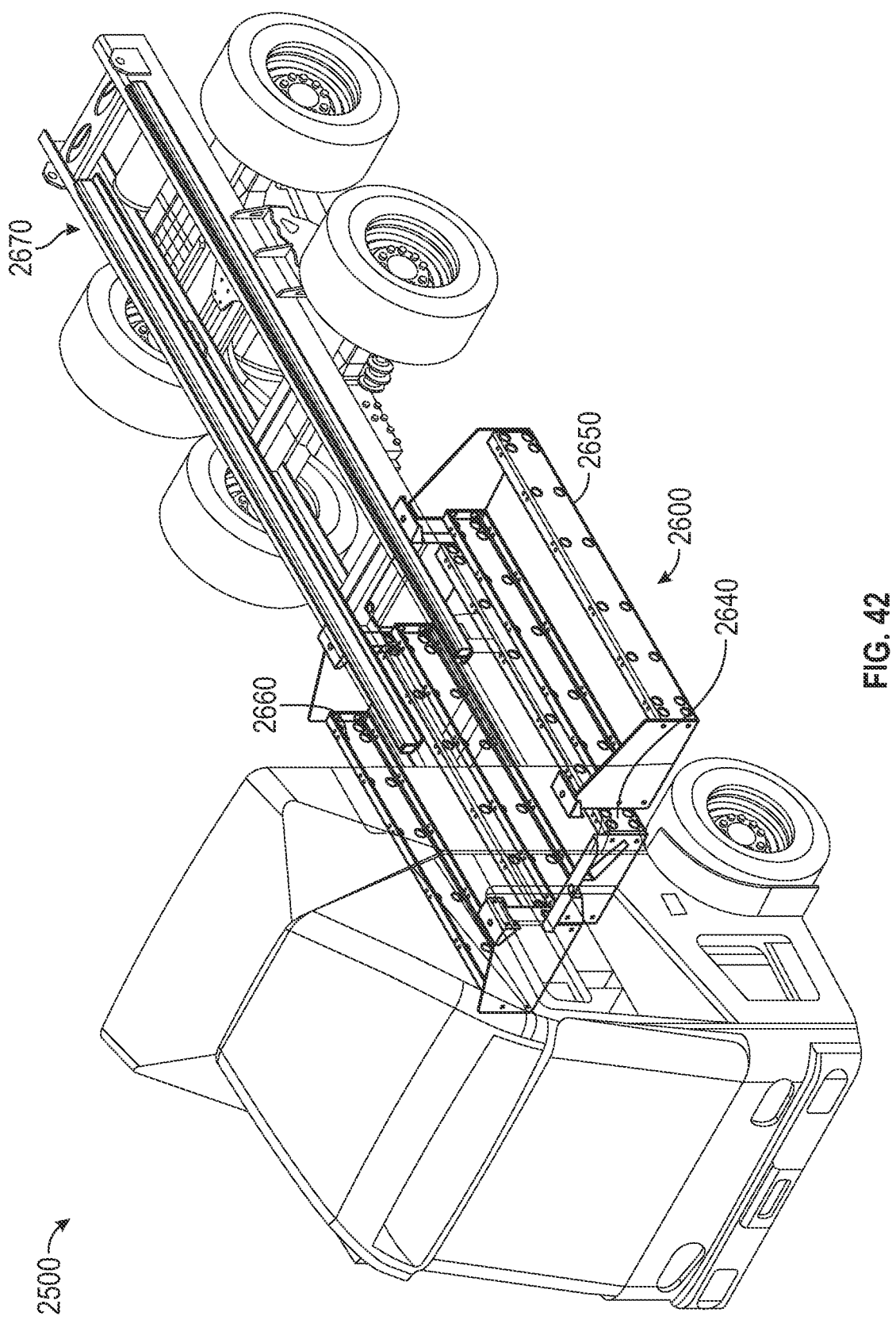
FIG. 42 is a front perspective view of the battery system of FIG. 16 installed on a vehicle chassis with the batteries removed, according to an exemplary embodiment.
Figure 43:
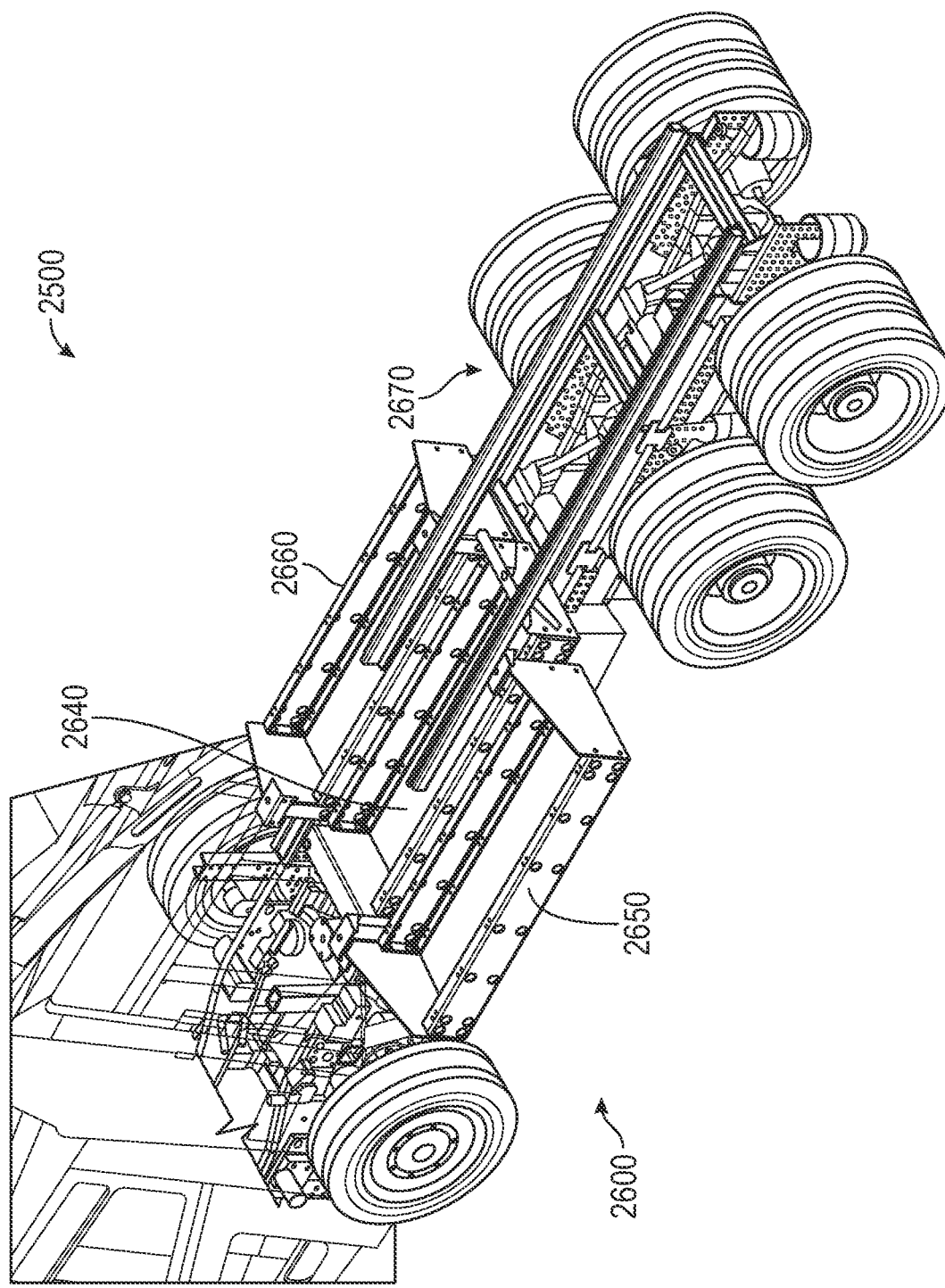
FIG. 43 is a rear perspective view of the battery system of FIG. 16 installed on a vehicle chassis with the batteries removed, according to an exemplary embodiment.

Referring to FIGS. 14-18 and 20, each of the battery pods includes a frame, housing, structure, chassis, or tray that supports the batteries 60 and couples the batteries 60 to the chassis 20 (see, e.g., FIGS. 42 and 43). The center pod 2602 includes a first frame, housing, structure, chassis, or tray, shown as battery tray 2640, coupled to the batteries 60 of the center pod 2602. The battery tray 2640 defines a recess that receives two batteries 60. In other embodiments, the center pod 2602 includes more or fewer batteries 60. The battery tray 2640 and the batteries 60 are positioned between the frame rails 2510 and 2512.

The battery tray 2640 includes a pair of mounting features or protrusions, shown as flanges 2642, that couple the battery tray 2640 to the chassis 20. The flanges 2642 are positioned at the front and the rear of the battery tray 2640 and each extend substantially horizontally. Each of the flanges 2642 is coupled to a frame member, shown as cross member 2644, that couples the battery tray 2640 to the frame rails 2510 and 2512. The cross members 2644 are coupled (e.g., welded) to each of the frame rails 2510 and 2512. Each cross member 2644 extends along the inner surfaces of the base plates 2520 and the bottom flanges 2524 of the frame rails 2510 and 2512. Accordingly, the cross members 2644 are supported at least by the bottom flanges 2524.

In some embodiments, the flanges 2642 are selectively or removably coupled to the cross members 2644 to facilitate removal of the center pod 2602. For example, in the embodiment of FIGS. 16 and 17, the flanges 2642 are fastened to the cross members 2644. As shown, the flanges 2642 are positioned below the cross members 2644. Accordingly, the center pod 2602 can be removed by removing the fasteners (e.g., bolts, screws, etc.) coupling the flanges 2642 to the cross members 2644 and dropping the center pod 2602 downward from the chassis 20.

The side pod 2604 includes a second frame, housing, structure, chassis, or tray, shown as battery tray 2650, coupled to the batteries 60 of the side pod 2604. The battery tray 2650 defines a recess that receives two batteries 60. In other embodiments, the side pod 2604 includes more or fewer batteries 60. The battery tray 2650 and the batteries 60 are positioned laterally outward from the frame rail 2510, along the base plate 2520 of the frame rail 2510.

A pair of mounting structures or mounting brackets, shown as brackets 2652, couple the battery tray 2650 to the frame rail 2510. The brackets 2652 are coupled to an exterior surface of the base plate 2520 of the frame rail 2510, such that the brackets 2652 extend laterally outward from the frame rail 2510. The brackets 2652 are longitudinally offset from one another. Each bracket 2652 couples to the battery tray 2650. Specifically, the brackets 2652 couple to a front end and a rear end of the battery tray 2650, respectively.

In some embodiments, the battery tray 2650 is selectively or removably coupled to the brackets 2652 to facilitate removal of the side pod 2604. For example, in the embodiment of FIGS. 16 and 17, the brackets 2652 are fastened to the battery tray 2650. As shown, the battery tray 2650 is positioned below the brackets 2652. Accordingly, the side pod 2604 can be removed by removing the fasteners (e.g., bolts, screws, etc.) coupling the battery tray 2650 to the brackets 2652 and dropping the side pod 2604 downward and/or laterally outward from the chassis 20.

The side pod 2606 includes a third frame, housing, structure, chassis, or tray, shown as battery tray 2660, coupled to the batteries 60 of the side pod 2606. The battery tray 2660 defines a recess that receives two batteries 60. In other embodiments, the side pod 2606 includes more or fewer batteries 60. The battery tray 2660 and the batteries 60 are positioned laterally outward from the frame rail 2512, along the base plate 2520 of the frame rail 2512.

A pair of mounting structures or mounting brackets, shown as brackets 2662, couple the battery tray 2660 to the frame rail 2510. The brackets 2662 are coupled to an exterior surface of the base plate 2520 of the frame rail 2512, such that the brackets 2662 extend laterally outward from the frame rail 2512. The brackets 2662 are longitudinally offset from one another. Each bracket 2662 couples to the battery tray 2660. Specifically, the brackets 2662 couple to a front end and a rear end of the battery tray 2660, respectively. The arrangement of the battery tray 2660 and the brackets 2662 may be symmetrical with the battery tray 2650 and the brackets 2652.

In some embodiments, the battery tray 2660 is selectively or removably coupled to the brackets 2662 to facilitate removal of the side pod 2606. For example, in the embodiment of FIGS. 16 and 17, the brackets 2662 are fastened to the battery tray 2660. As shown, the battery tray 2660 is positioned below the brackets 2662. Accordingly, the side pod 2606 can be removed by removing the fasteners (e.g., bolts, screws, etc.) coupling the battery tray 2660 to the brackets 2662 and dropping the side pod 2606 downward and/or laterally outward from the chassis 20.

Referring to FIGS. 15-18, 20, and 21, the rear pod 2608 includes a fourth frame, housing, structure, chassis, or tray, shown as battery tray 2670, coupled to the batteries 60 of the rear pod 2608. The chassis 20 includes two rails or frame members, shown as slide rails 2672. The slide rails 2672 are each fixedly coupled to an inner surface of one of the base plates 2520 and each extend laterally inward from the corresponding base plate 2520. The battery tray 2670 includes two rail assemblies, frame members, or linear bushings, shown as slide assemblies 2674, that couple to the slide rails 2672. The slide assemblies 2674 each define a recess 2676 that receives one of the slide rails 2672. The slide assemblies 2674 are laterally offset from one another and define a space therebetween that receives four batteries. In other embodiments, the rear pod 2608 includes more or fewer batteries 60. The battery tray 2670 and the batteries 60 are positioned between the frame rails 2510 and 2512.

Figure 21:
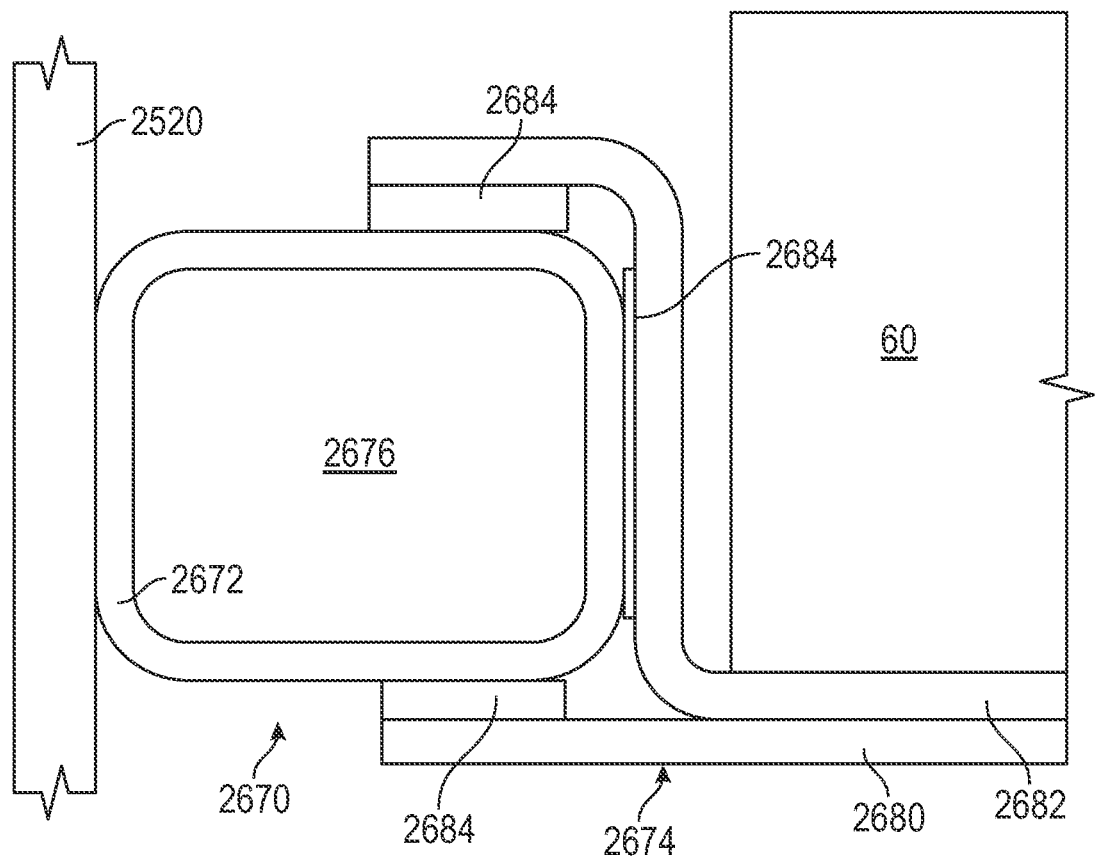
FIG. 21 is a rear detail view of the chassis and the battery system of FIG. 16, according to an exemplary embodiment.

FIG. 21 illustrates one side of the battery tray 2670. It should be understood that the opposing side of the battery tray 2670 may have a similar layout that is symmetrical to the arrangement shown. The slide assembly 2674 includes a pair of structural members, shown as base plate 2680 and top plate 2682. The base plate 2680 is substantially flat and extends below the batteries 60 and the slide rail 2672. The top plate 2682 includes a first horizontal portion, a vertical middle portion, and a second horizontal portion. The first horizontal portion is positioned between the base plate 2680 and the batteries 60 and is coupled to the base plate 2680. The vertical middle portion extends upward from the first horizontal portion. The second horizontal portion extends laterally outward from the vertical middle portion, over the slide rail 2672.

The slide assembly 2674 further includes a series of friction-reducing pads, shown as slides 2684. The slides 2684 facilitate low-friction translation of the slide assembly 2674 relative to the slide rail 2672, even under the weight of the batteries 60. One slide 2684 is coupled to the base plate 2680 and positioned between the base plate 2680 and the slide rail 2672. This slide 2684 limits upward vertical movement of the rear pod 2608. Another slide 2684 is coupled to the vertical middle portion of the top plate 2682 and positioned between the top plate 2682 and the slide rail 2672. This slide 2684 limits outward lateral movement of the rear pod 2608. Another slide 2684 is coupled to the second horizontal portion of the top plate 2682 and positioned between the top plate 2682 and the slide rail 2672. This slide 2684 limits downward vertical movement of the rear pod 2608.

Referring to FIGS. 15-18 and 20-23, the slide rails 2672 and the slide assemblies 2674 each extend longitudinally along the chassis 20. The slide assemblies 2674 are slidably coupled to the slide rails 2672, such that the slide assemblies 2674 are translatable longitudinally. Accordingly, the battery tray 2670 slidably couples the batteries 60 of the rear pod 2608 to the chassis 20 such that the rear pod 2608 is translatable longitudinally relative to the chassis 20. The forward and/or rearward movement of the rear pod 2608 may be limited (e.g., prevented). By way of example, forward movement of the rear pod 2608 may be limited by a cross member of the chassis 20 that extends directly in front of the rear pod 2608. By way of another example, rearward movement of the rear pod 2608 may be selectively limited by a removable stop that is positioned directly rearward of the rear pod 2608.

Figure 22:
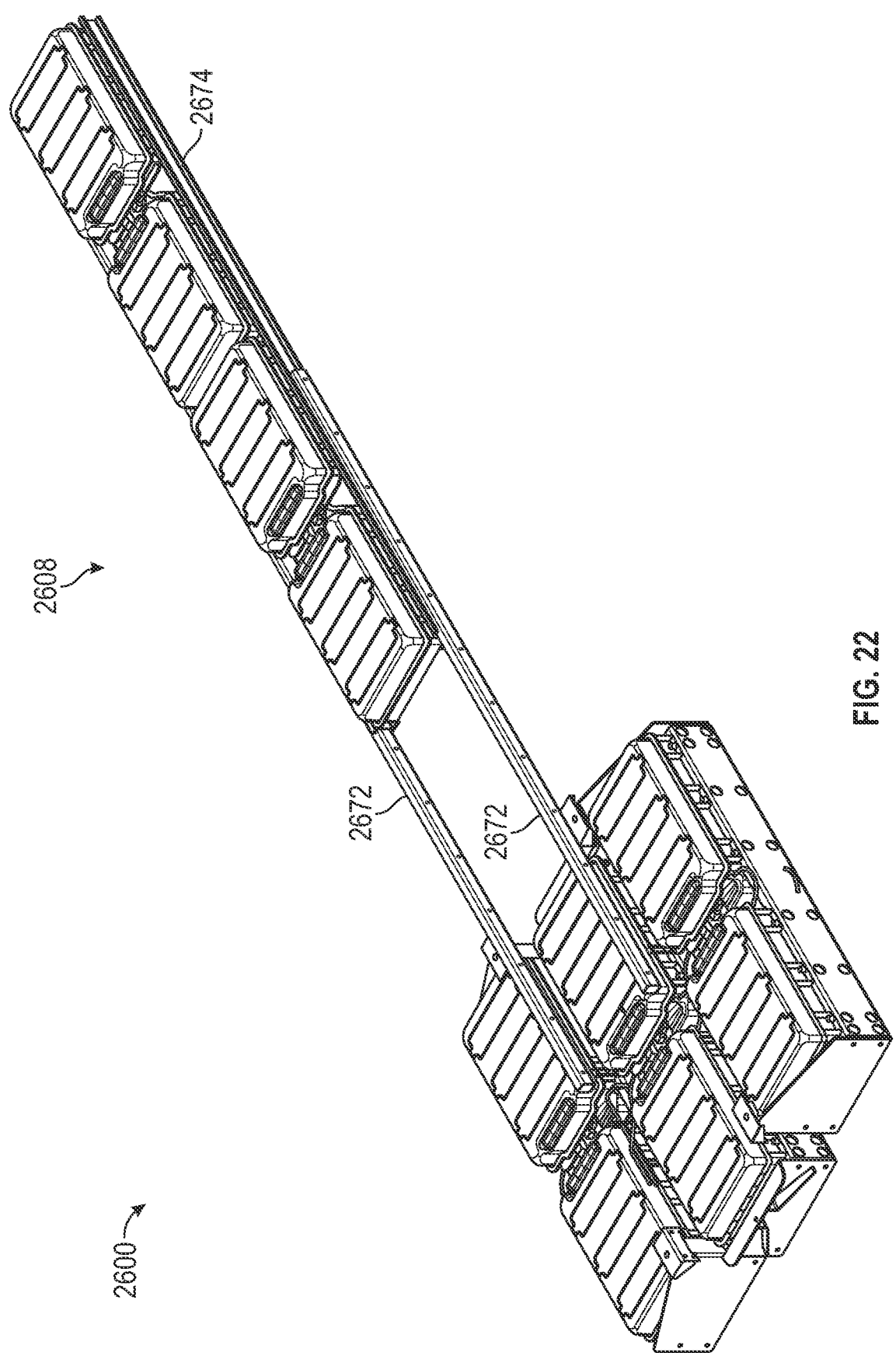
FIG. 22 is a perspective view of the battery system of FIG. 18 illustrating the removal of a rear battery pod to a first position, according to an exemplary embodiment.
Figure 23:
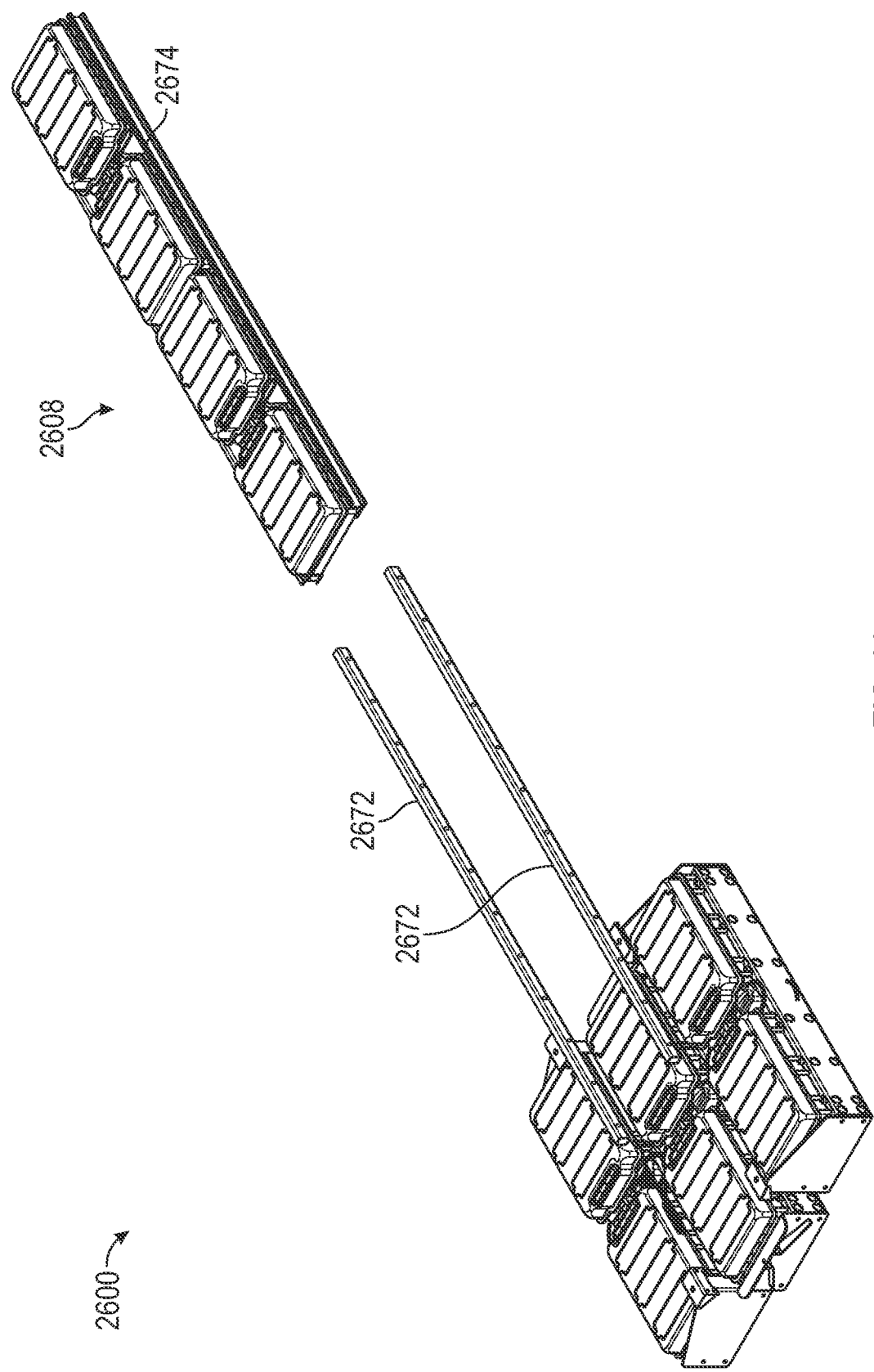
FIG. 23 is a perspective view of the battery system of FIG. 18 illustrating the removal of a rear battery pod to a second position, according to an exemplary embodiment.

In some embodiments, the battery tray 2670 is selectively or removably coupled to the slide rails 2672 to facilitate removal of the rear pod 2608. For example, the rear pod 2608 may be removed by sliding the rear pod 2608 rearward until the slide assemblies 2674 are no longer engaged with the slide rails 2672. FIGS. 22 and 23 illustrate the process of removing the rear pod 2608 from the battery system 2600 by moving the rear pod 2608 rearward. In some embodiments, removal of the rear pod 2608 facilitates service of the rear pod 2608 and/or service of other components of the vehicle 2500 that would be difficult to access with the rear pod 2608 in place.

In some embodiments, the rear pod 2608 is coupled to and supported on the chassis 20 without the slide assembly 2674. For example, the battery tray 2670 or the individual batteries 60 in the rear pod 2608 may be fastened to the chassis 20 using one or more fasteners (e.g., bolts, screws, etc.) so that the battery tray 2670 or the batteries 60 are fixed.

Referring to FIGS. 15, 18, and 22-27, the battery system 2600 is selectively reconfigurable by disconnecting one or more battery pods from the chassis 20 and/or by connecting one or more battery pods to the chassis 20. Accordingly, battery pods may be added, removed, or exchanged as desired (e.g., based on the application of the vehicle 2500). The configurations of the of the battery tray 2640, the battery tray 2650, the battery tray 2660, and the battery tray 2670 facilitate connecting and disconnecting the battery pods quickly and with a minimal amount of specialized tools. By way of example, the center pod 2602, the side pod 2604, the side pod 2606, and the rear pod 2608 can each be removed by simply removing a series of fasteners. By way of another example, the rear pod 2608 can be removed by simply sliding the rear pod 2608 rearward. Accordingly, the battery system 2600 facilitates flexible use of the vehicle 2500 by permitting rapid reconfiguration of the battery system 2600. Because the battery system 2600 is reconfigured by disengaging and reengaging a series of fasteners, the battery system 2600 can be reconfigured by an end user at a field location (e.g., in a user's garage) without specialized tools that might only be available at a dealership or vehicle factory.

An individual or group involved with the manufacturing, configuration, and/or use of the vehicle 2500 (e.g., an end user, a manufacturer, a dealership, an organization operating a fleet of vehicles, etc.) may desire to add, remove, or exchange battery pods in a variety of different situations. Battery pods may be added to increase the capabilities (e.g., battery capacity, peak output power, etc.) of the battery system 2600. By way of example, a large number of battery pods may be beneficial in applications where the vehicle 2500 is required to travel large distances without a charge or when the vehicle 2500 is required to output high power. Conversely, battery pods may be removed to reduce the cost and/or weight of the vehicle 2500 and/or to free up space in the vehicle 2500 for other applications. By way of example, a small number of battery pods may be beneficial in applications where the end user of the vehicle is particularly cost-sensitive or where the application kit 80 requires a large amount of space.

Battery pods may be removed and exchanged with different battery pods to quickly replenish charge within the battery system 2600. By way of example, a depleted battery pod may be removed and replaced with a second battery pod having similar dimensions and/or electrical characteristics (e.g., capacity, output power, etc.) but a full charge. This exchange may be completed quickly, permitting a vehicle to continue operation with minimal downtime. The depleted battery pod may then be charged separately from the vehicle 2500. The recharged battery pod may subsequently be used with the vehicle 2500 or another vehicle. By way of example, the battery system is reconfigurable between (a) a first configuration in which at least two of the center pod 2602, the side pod 2604, the side pod 2606, and the rear pod 2608 provide electrical energy to the drive motor 62 and (b) a second configuration in which one of the center pod 2602, the side pod 2604, the side pod 2606, and the rear pod 2608 is removed from the vehicle and one of the remaining pods provides electrical energy to the drive motor 62. By way of example, an organization may operate a fleet of the vehicles 2500. The organization may have a charging site where several battery pods are charged, and any of the vehicles 2500 may return to the charging site to exchange a depleted battery pod for one of the charged battery pods.

Battery pods may be removed and exchanged with battery pods having different characteristics suitable to different applications. By way of example, a user may have several of the rear battery pods 2608, each having the same or similar physical dimensions, such that each of the rear battery pods 2608 is capable of engaging with the slide rails 2672. Each of the rear battery pods 2608 may have different battery capacities, permitting the user to select a battery pod having a capacity that suits the desired application of the vehicle 2500. The battery pods 2608 may have different battery chemistries, such that each of the battery pods is suited for a different climate (e.g., a different temperature, a different humidity, etc.).

FIGS. 15, 18, and 24-27 illustrate several different configurations of the battery system 2600. In a first configuration or four-string configuration (e.g., a configuration with four battery strings, pods, etc.), shown in FIGS. 15 and 18, the battery system 2600 includes the center pod 2602, the side pod 2604, the side pod 2606, and the rear pod 2608. In some embodiments, this represents the configuration of the vehicle 10 with the greatest battery capacity. This may also represent the configuration with the greatest battery weight (i.e., the total weight of the battery pods coupled to the chassis 20) and/or the configuration with the least space available for non-battery components.

Figure 24:
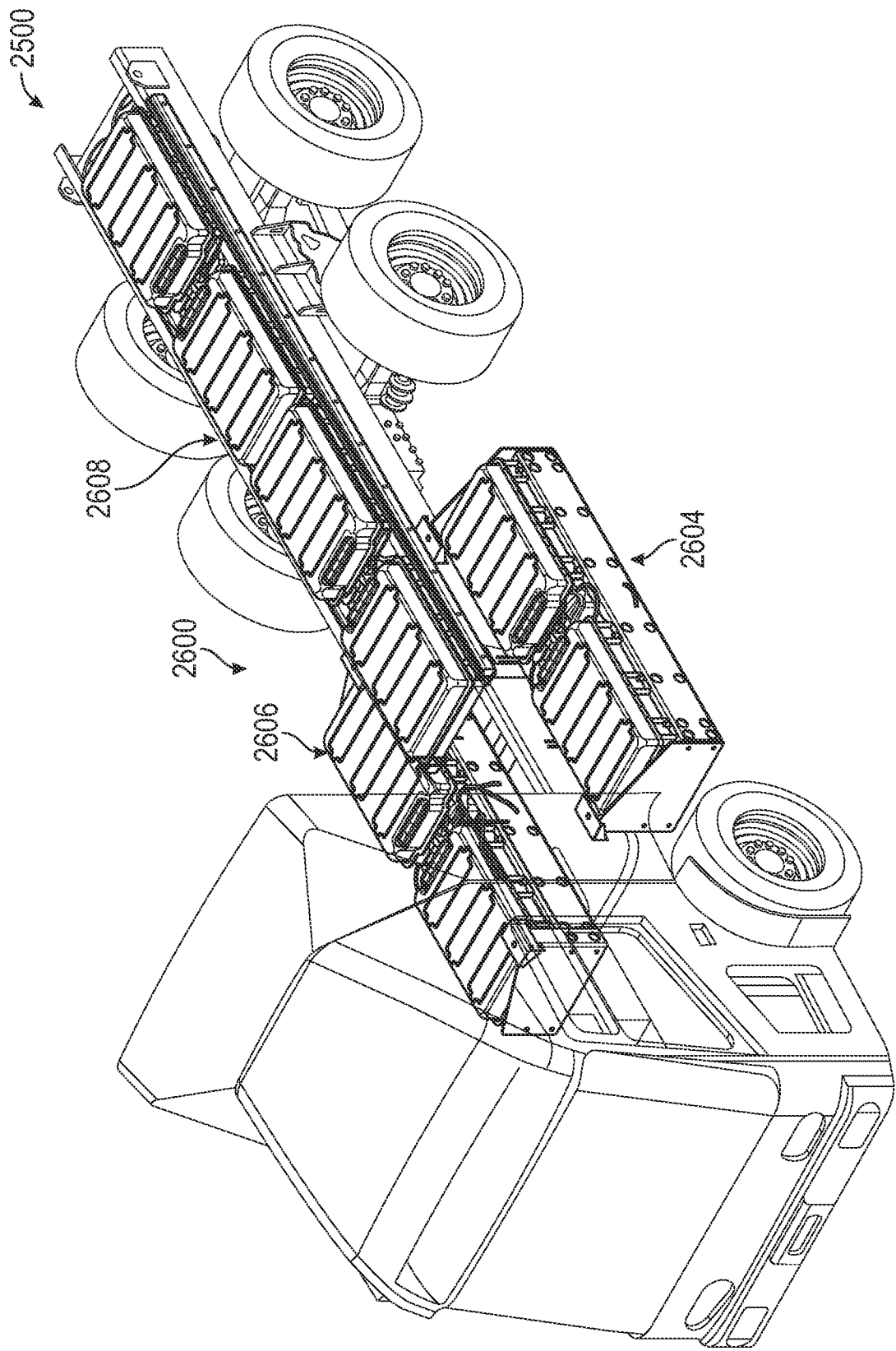
FIG. 24 is a perspective view of the battery system of FIG. 16 with a center battery pod removed, according to an exemplary embodiment.
Figure 25:
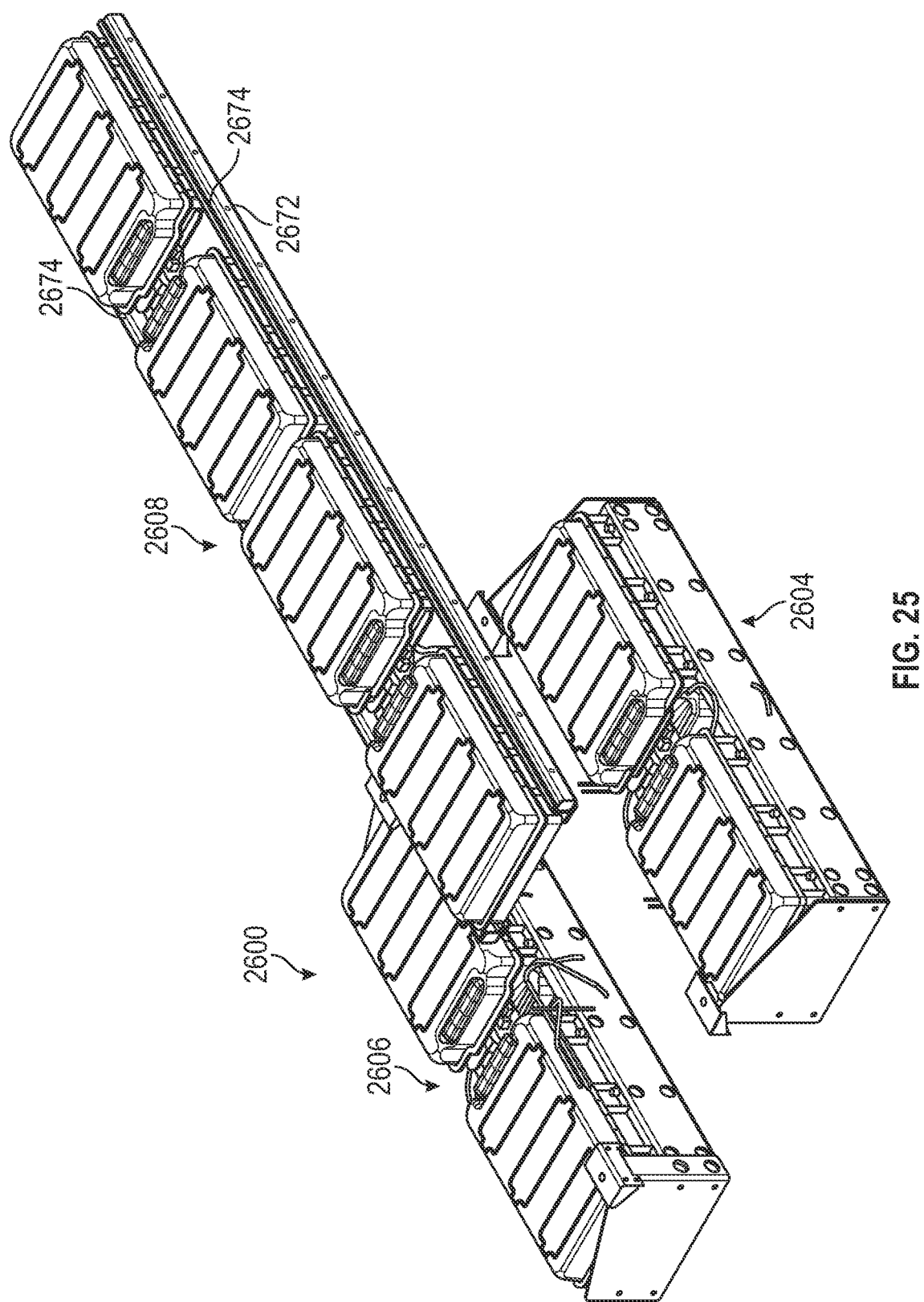
FIG. 25 is a perspective view of the battery system of FIG. 16 with a center battery pod removed and the vehicle chassis hidden, according to an exemplary embodiment.

In a second configuration or three-string configuration (e.g., a configuration with three battery strings, pods, etc.), shown in FIGS. 24 and 25, the battery system 2600 includes the side pod 2604, the side pod 2606, and the rear pod 2608 and omits the center pod 2602. The three-string configuration may have a lesser battery capacity than the four-string configuration. The three-string configuration may have a lesser battery weight than the four-string configuration. The three-string configuration may leave more space available for non-battery components than the four-string configuration.

To reconfigure the battery system 2600 (e.g., and thus the vehicle 2500) from the four-string configuration to the three-string configuration, a user may electrically decouple the center pod 2602 from the vehicle 2500. By way of example, the center pod 2602 and the chassis 20 may include mating electrical connectors that are positioned to disconnect from one another as the center pod 2602 moves away from the chassis 20. The user may disconnect the fasteners that couple the battery tray 2640 to the cross members 2644. The user may then lower the center pod 2602 away from the chassis 20. To reconfigure the battery system 2600 from the three-string configuration to the four-string configuration, a similar process may be performed in reverse order.

Figure 26:
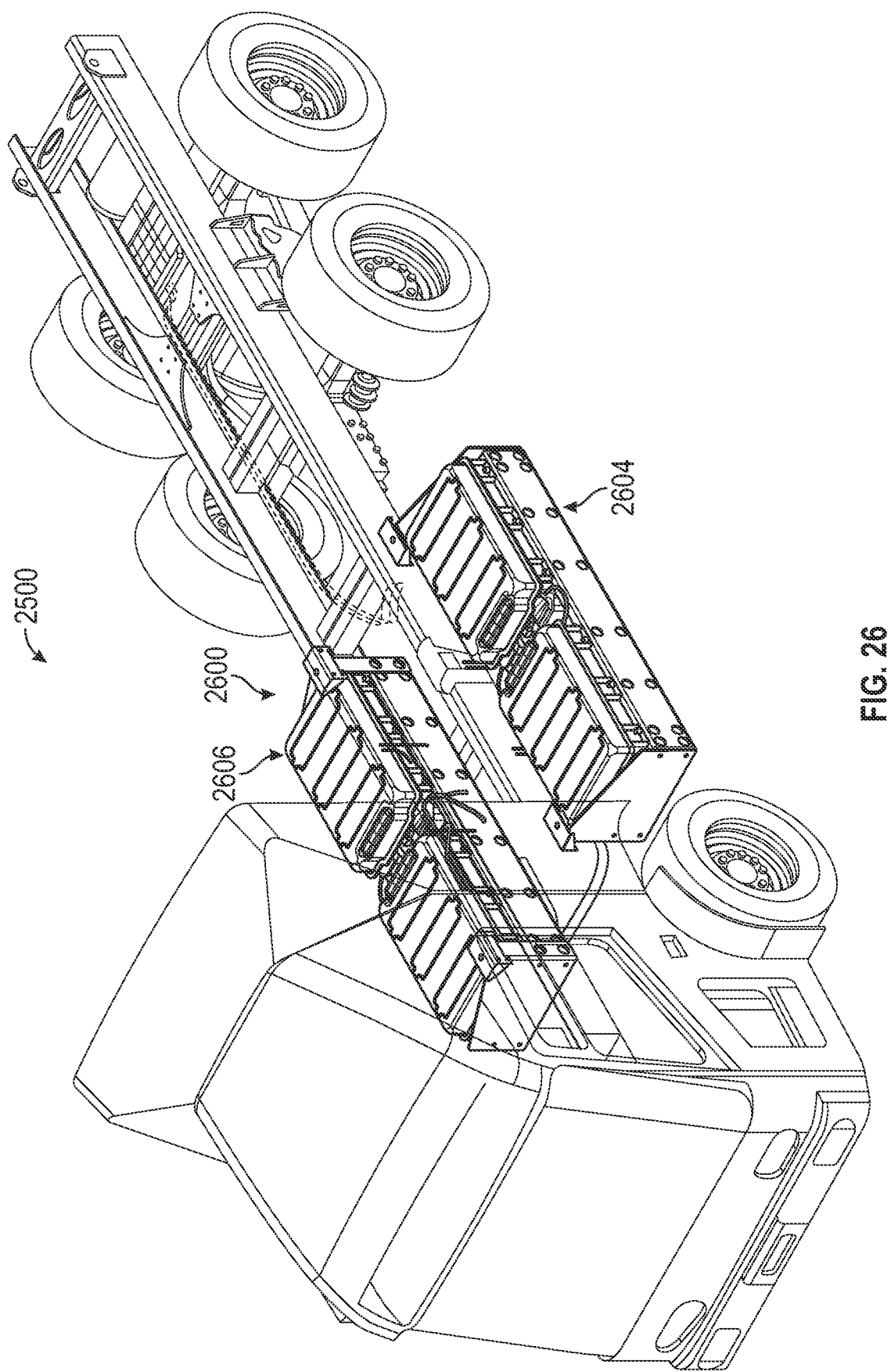
FIG. 26 is a perspective view of the battery system of FIG. 16 with a rear battery pod and a center battery pod removed, according to an exemplary embodiment.
Figure 27:
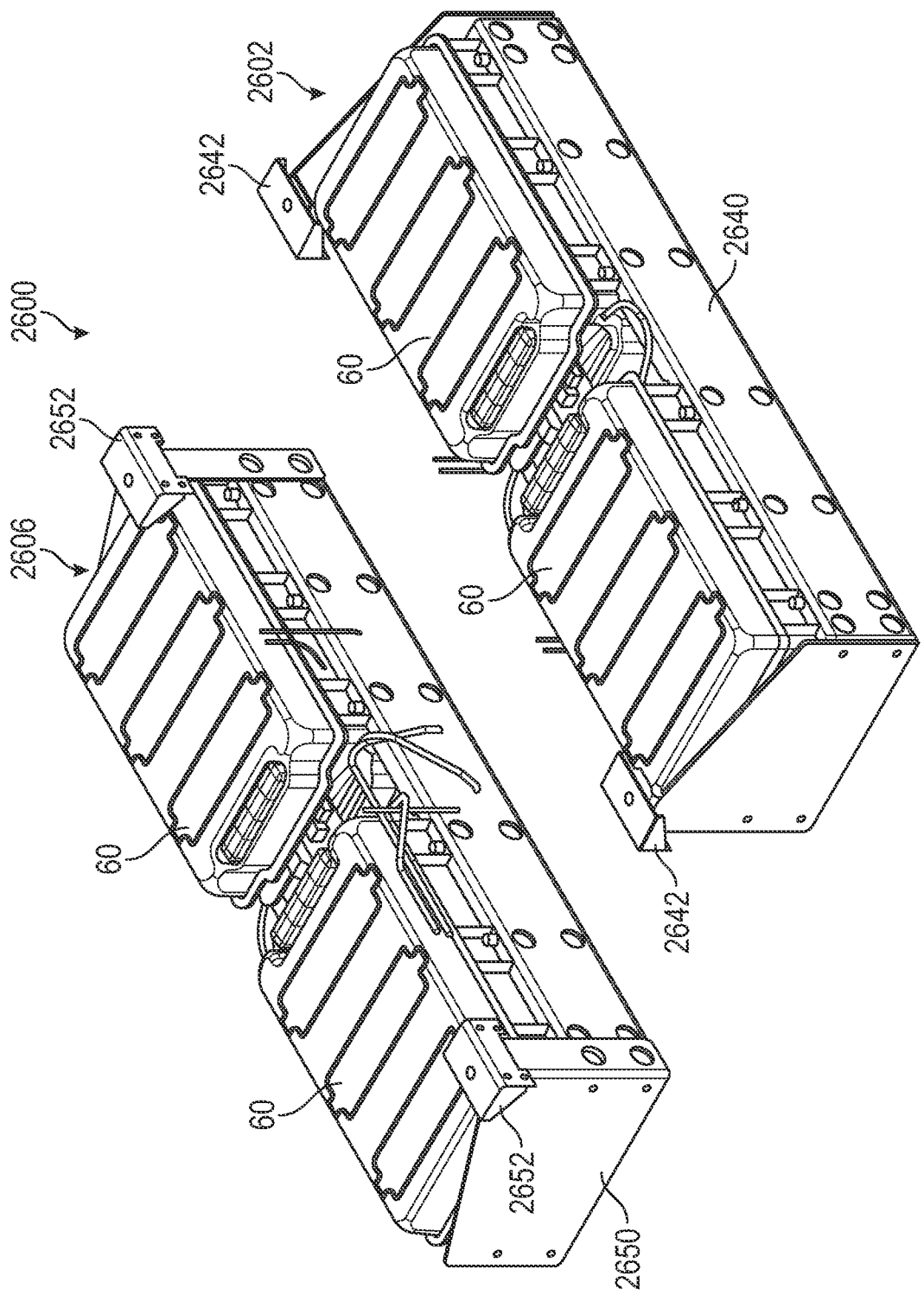
FIG. 27 is a perspective view of the battery system of FIG. 16 with a rear battery pod and a center battery pod removed, and the vehicle chassis hidden, according to an exemplary embodiment.
Figure 28:
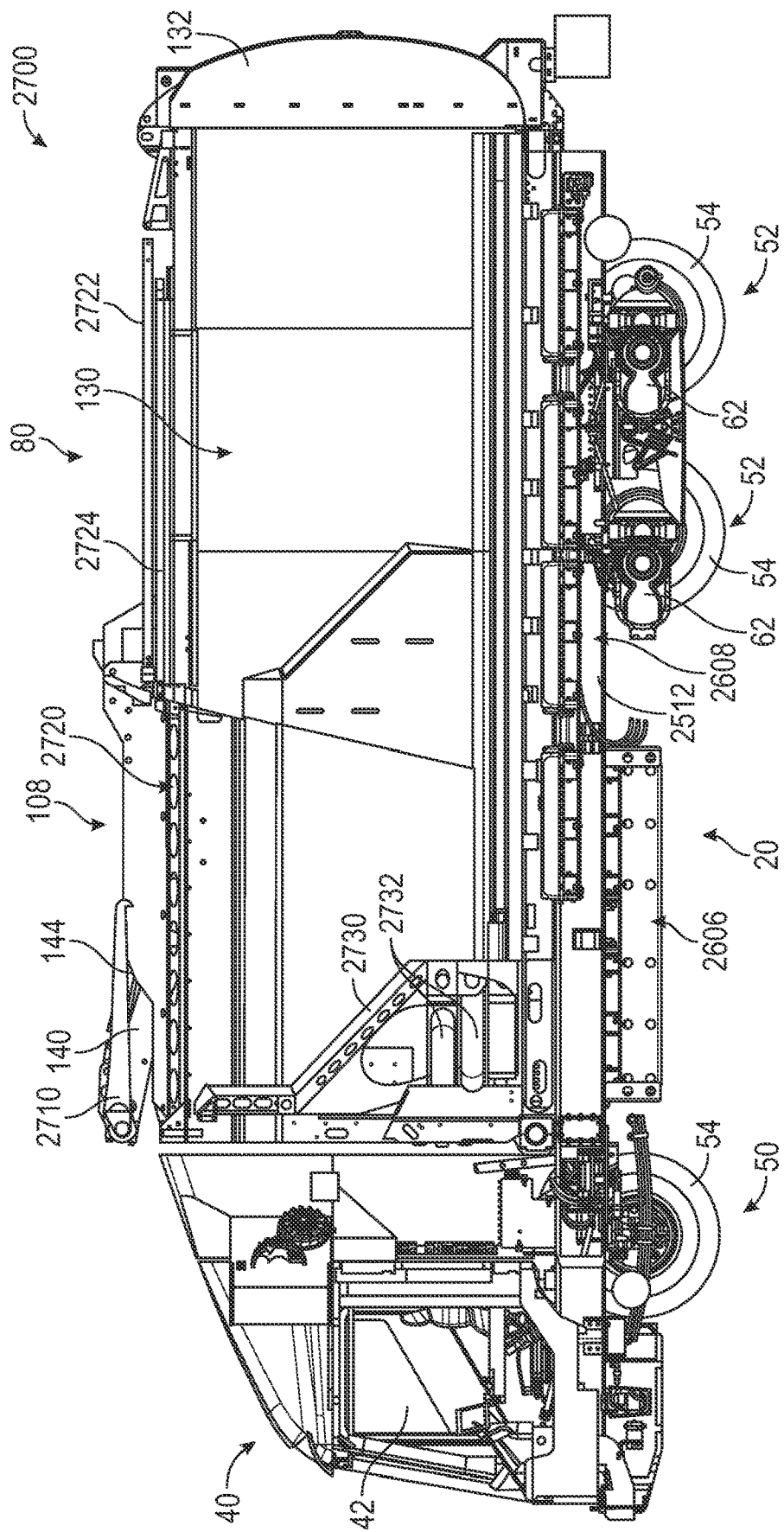
FIG. 28 is a left section view of the vehicle of FIG. 14 configured as a front-loading refuse vehicle and including the battery system, according to an exemplary embodiment.
Figure 29:
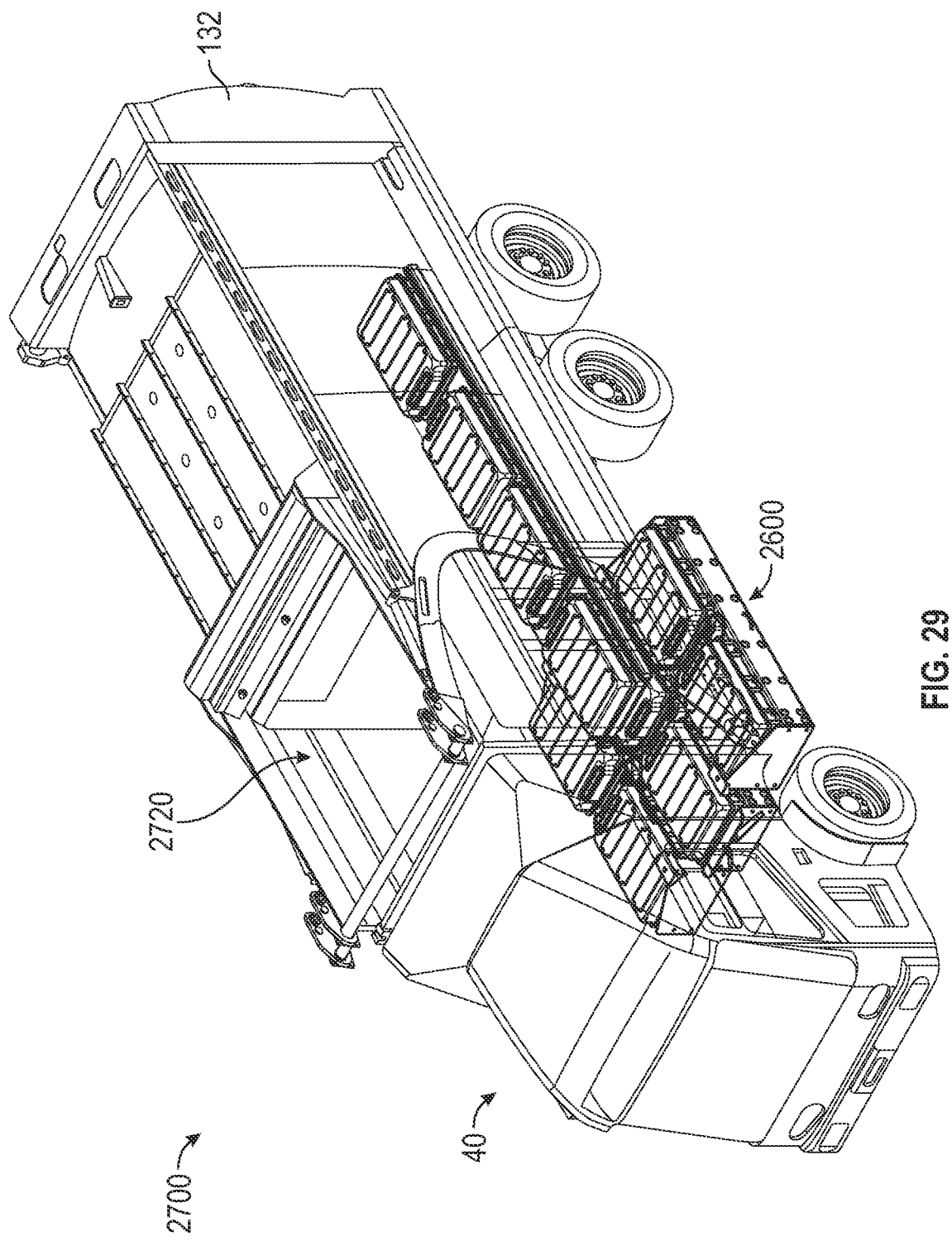
FIG. 29 is a front perspective view of the vehicle of FIG. 28.
Figure 30:
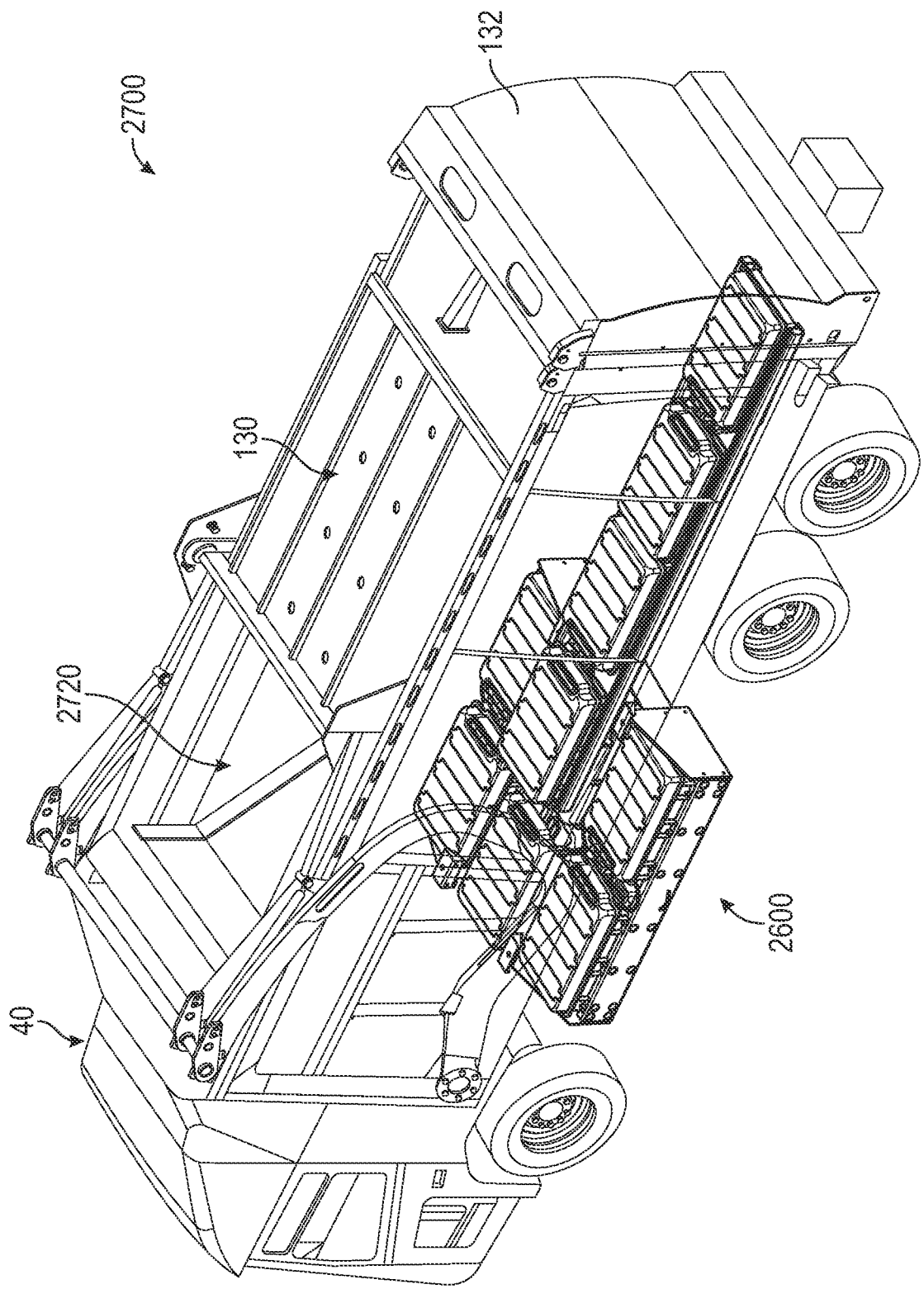
FIG. 30 is a rear perspective view of the vehicle of FIG. 28.
Figure 31:
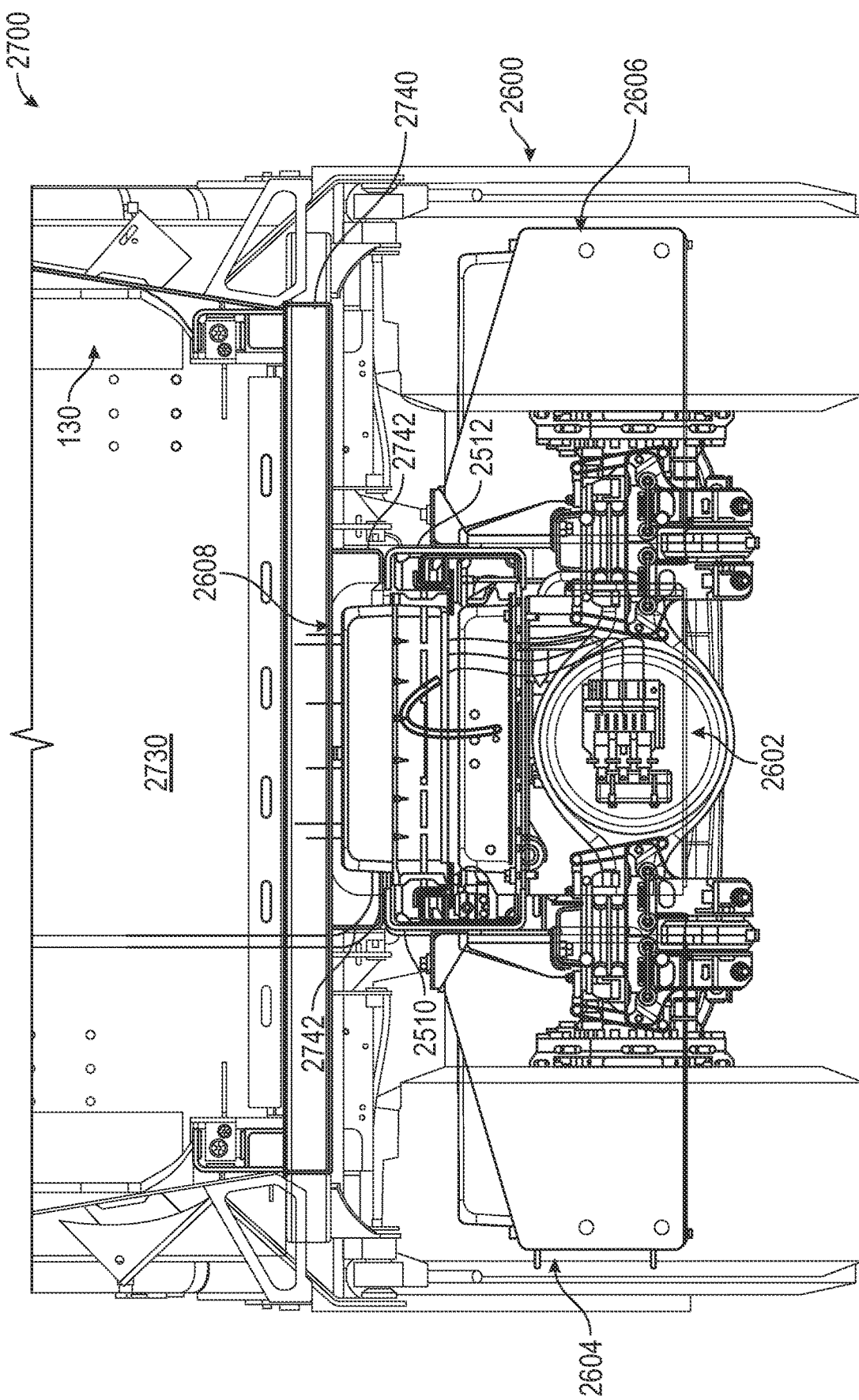
FIG. 31 is a rear section view of the battery system and the vehicle chassis of FIG. 28, with battery trays being transparent, according to an exemplary embodiment.
Figure 32:
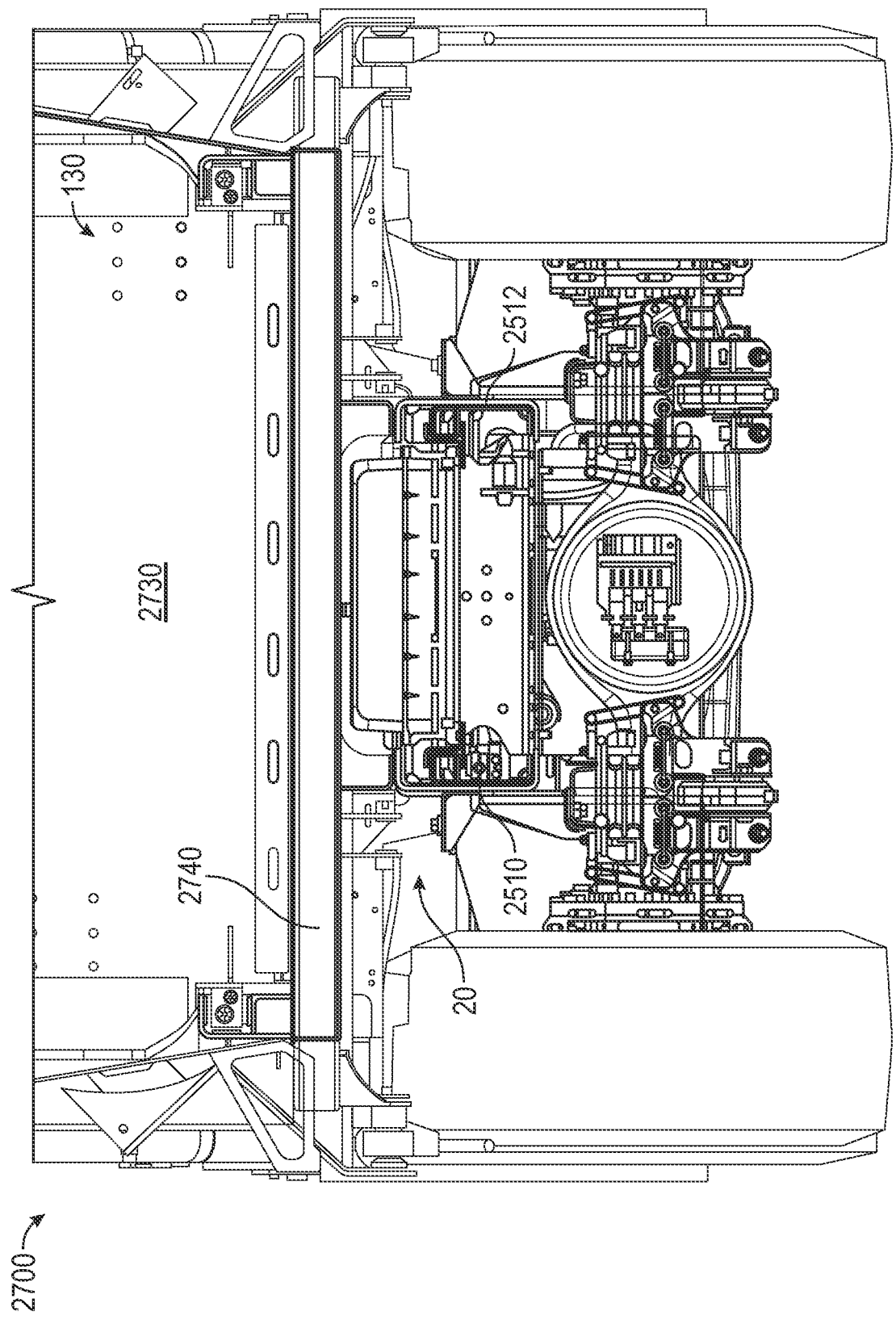
FIG. 32 is a rear view of the battery system and the vehicle chassis of FIG. 28, according to an exemplary embodiment.
Figure 33:
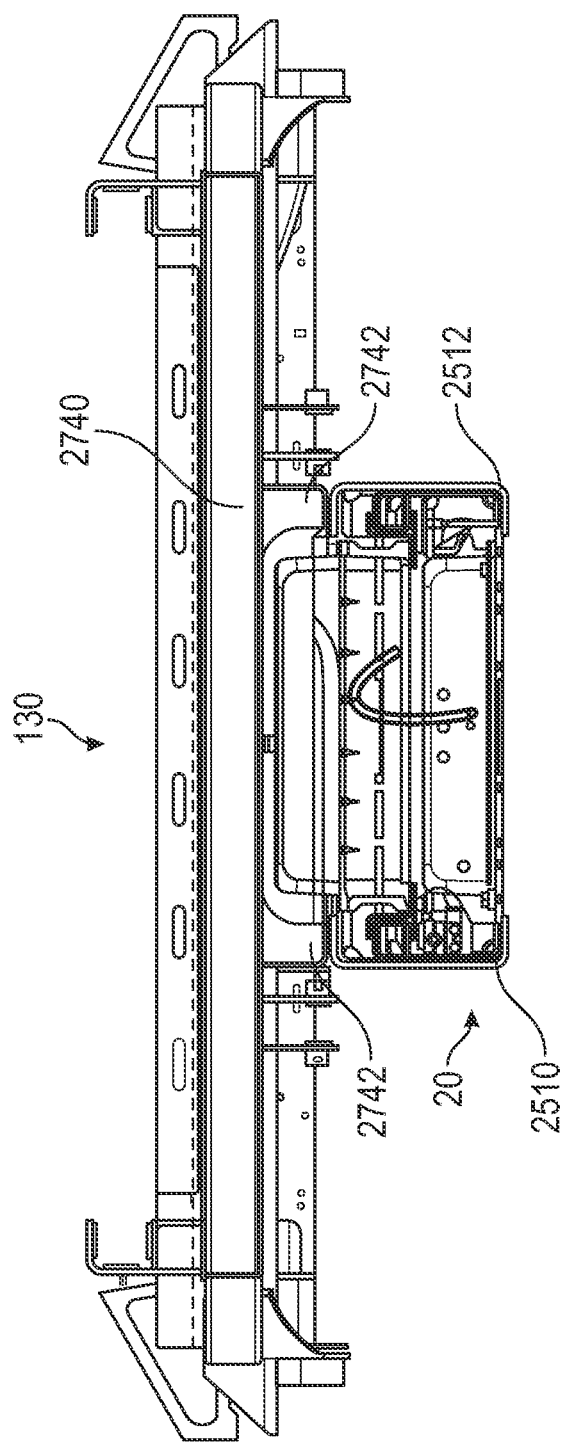
FIG. 33 is a rear section view of the battery system and the vehicle chassis of FIG. 28 illustrating coupling of a refuse compartment to the vehicle chassis, according to an exemplary embodiment.

In a third configuration or two-string configuration (e.g., a configuration with two battery strings, pods, etc.), shown in FIGS. 26 and 27, the battery system 2600 includes the side pod 2604 and the side pod 2606 and omits the center pod 2602 and the rear pod 2608. The two-string configuration may have a lesser battery capacity than the three-string configuration. The two-string configuration may have a lesser battery weight than the three-string configuration. The two-string configuration may leave more space available for non-battery components than the three-string configuration.

To reconfigure the battery system 2600 (e.g., and thus the vehicle 2500) from the three-string configuration to the two-string configuration, a user may electrically decouple the rear pod 2608 from the vehicle 2500. By way of example, the rear pod 2608 and the chassis 20 may include mating electrical connectors that are positioned to disconnect from one another as the rear pod 2608 moves away from the chassis 20. In some embodiments, the user may disconnect any fasteners or other components couple the battery tray 2670 to the chassis 20 and remove the rear pod 2608. In some embodiments, the user may disconnect any fasteners or other components that limit reward longitudinal movement of the rear pod 2608. The user may then move the rear pod 2608 rearward until the slide assemblies 2674 disconnect from the slide rails 2672 and the rear pod 2608 moves freely relative to the chassis 20. To reconfigure the battery system 2600 from the two-string configuration to the three-string configuration, a similar process may be performed in reverse order.

In other embodiments, the battery system 2600 is reconfigurable into configurations other than the configurations shown in FIGS. 15, 18, and 24-27. In some such embodiments, the battery system 2600 is configured in other three-string configurations. By way of example, the battery system 2600 may be reconfigurable into a three-string configuration in which the battery system 2600 includes the center pod 2602, the side pod 2604, and the side pod 2604 and omits the rear pod 2608. By way of another example, the battery system 2600 may be reconfigurable into a three-string configuration in which the battery system 2600 includes the center pod 2602, the rear pod 2608 and one of the side pod 2604 or the side pod 2606 and omits the other of the side pod 2604 and the side pod 2606.

In some embodiments, the battery system 2600 is configured in other two-string configurations. By way of example, the battery system 2600 may be reconfigurable into a two-string configuration in which the battery system 2600 includes the center pod 2602 and the rear pod 2608 and omits the side pod 2604 and the side pod 2606. By way of another example, the battery system 2600 may be reconfigurable into a two-string configuration in which the battery system 2600 includes the center pod 2602 and one of the side pod 2604 or the side pod 2606 and omits the rear pod 2608 and the other of the side pod 2604 and the side pod 2606. By way of another example, the battery system 2600 may be reconfigurable into a two-string configuration in which the battery system 2600 includes the rear pod 2608 and one of the side pod 2604 or the side pod 2606 and omits the center pod 2602 and the other of the side pod 2604 and the side pod 2606.

In some embodiments, the battery system 2600 is configured into a one-string configuration (e.g., a configuration with one battery string). By way of example, the battery system 2600 may be reconfigurable into a one-string configuration in which the battery system 2600 includes only the center pod 2602. By way of another example, the battery system 2600 may be reconfigurable into a one-string configuration in which the battery system 2600 includes only the side pod 2604. By way of another example, the battery system 2600 may be reconfigurable into a one-string configuration in which the battery system 2600 includes only the side pod 2606. By way of another example, the battery system 2600 may be reconfigurable into a one-string configuration in which the battery system 2600 includes only the rear pod 2608.

Referring to FIGS. 28-37, a vehicle 2700 is shown as an exemplary configuration of the vehicle 2500. Accordingly, any description herein with respect to the vehicle 10 and/or the vehicle 2500 may apply to the vehicle 2700 except as otherwise specified. The application kit 80 of the vehicle 2700 is selected such that the vehicle 2700 is configured as a front-loading refuse vehicle (e.g., a refuse truck, a garbage truck, a waste collection truck, a sanitation truck, a recycling truck, etc.). Accordingly, any description herein with respect to the refuse vehicle 100 may apply to the vehicle 2700 except as otherwise specified.

The lift assembly 108 of the vehicle 2700 includes an interface, shown as lift forks 2710. The lift forks 2710 are rotatably coupled to the distal ends of the lift arms 140 and configured to rotate about a lateral axis. The lift forks 2710 are coupled to the articulation actuators 144 such that the articulation actuators 144 move the lift forks 2710 relative to the lift arms 140. The lift forks 2710 are configured to interface with (e.g., engage, couple to, etc.) a refuse container (e.g., a dumpster).

A top surface of the refuse compartment 130 defines an opening, shown as hopper aperture 2720, through which refuse may be introduced into the refuse compartment 130. A panel or plate, shown as hopper cover 2722, is slidably coupled to the refuse compartment 130. An actuator (e.g., a hydraulic cylinder, an electric linear actuator, etc.), shown as hopper cover actuator 2724, is coupled to the hopper cover 2722 and the refuse compartment 130. The hopper cover actuator 2724 is configured to selectively reposition the hopper cover 2722 in the longitudinal direction between an open position, in which the hopper aperture 2720 is uncovered, and a closed position, in which the hopper cover 2722 extends across the hopper aperture 2720. In the closed position, the hopper cover 2722 may prevent refuse from escaping the refuse compartment 130 (e.g., due to wind).

The vehicle 2700 further includes a ram or pusher, shown as packer 2730, positioned within the refuse compartment 130. A pair of actuators (e.g., hydraulic cylinders, electric linear actuators, etc.), shown as packer actuators 2732, are coupled to the packer 2730 and the refuse compartment 130. The packer actuators 2732 are configured to move the packer 2730 longitudinally along a length of the refuse compartment 130. The packer 2730 is configured to move refuse toward the rear end of the refuse compartment 130 and compress the refuse against the tailgate 136.

Referring to FIGS. 28-34, the refuse compartment 130 is positioned above the battery system 2600. Specifically, the refuse compartment 130 is positioned above the battery system 2600 such that the refuse compartment 130 covers the battery system 2600. The refuse compartment 130 includes a lateral frame member, shown as cross member 2740, that extends laterally across the bottom of the refuse compartment 130. The refuse compartment 130 includes a pair of L-shaped mounting brackets, shown as mounting tabs 2742. The mounting tabs 2742 are fixedly coupled to the cross member 2740 and extend downward from the cross member 2740. Each of the mounting tabs 2742 includes a horizontal portion that couples to the top flange 2522 of one of the frame rail 2510 or the frame rail 2512. Accordingly, the refuse compartment 130 is coupled to the frame rail 2510 and the frame rail 2512.

The vehicle 2700 further includes a lateral frame member, shown as rear cross member 2750. The rear cross member 2750 is directly coupled to the base plates 2520 of the frame rail 2510 and the frame rail 2512, such that the rear cross member 2750 extends from the frame rail 2510 to the frame rail 2512. The rear cross member 2750 is positioned between the top flanges 2522 and the bottom flanges 2524. The rear cross member 2750 includes walls that define a recess 2752 having a downward-facing opening. An implement (e.g., a pump, a compressor, a valve assembly, an electrical component, etc.), shown as valve block 2754, is coupled to the rear cross member 2750 and positioned within the recess 2752. In some embodiments, the valve block 2754 is configured to control the flow of fluid to various components of the vehicle 2700 (e.g., the tailgate actuator 138, the packer actuators 2732, etc.).

Figure 34:
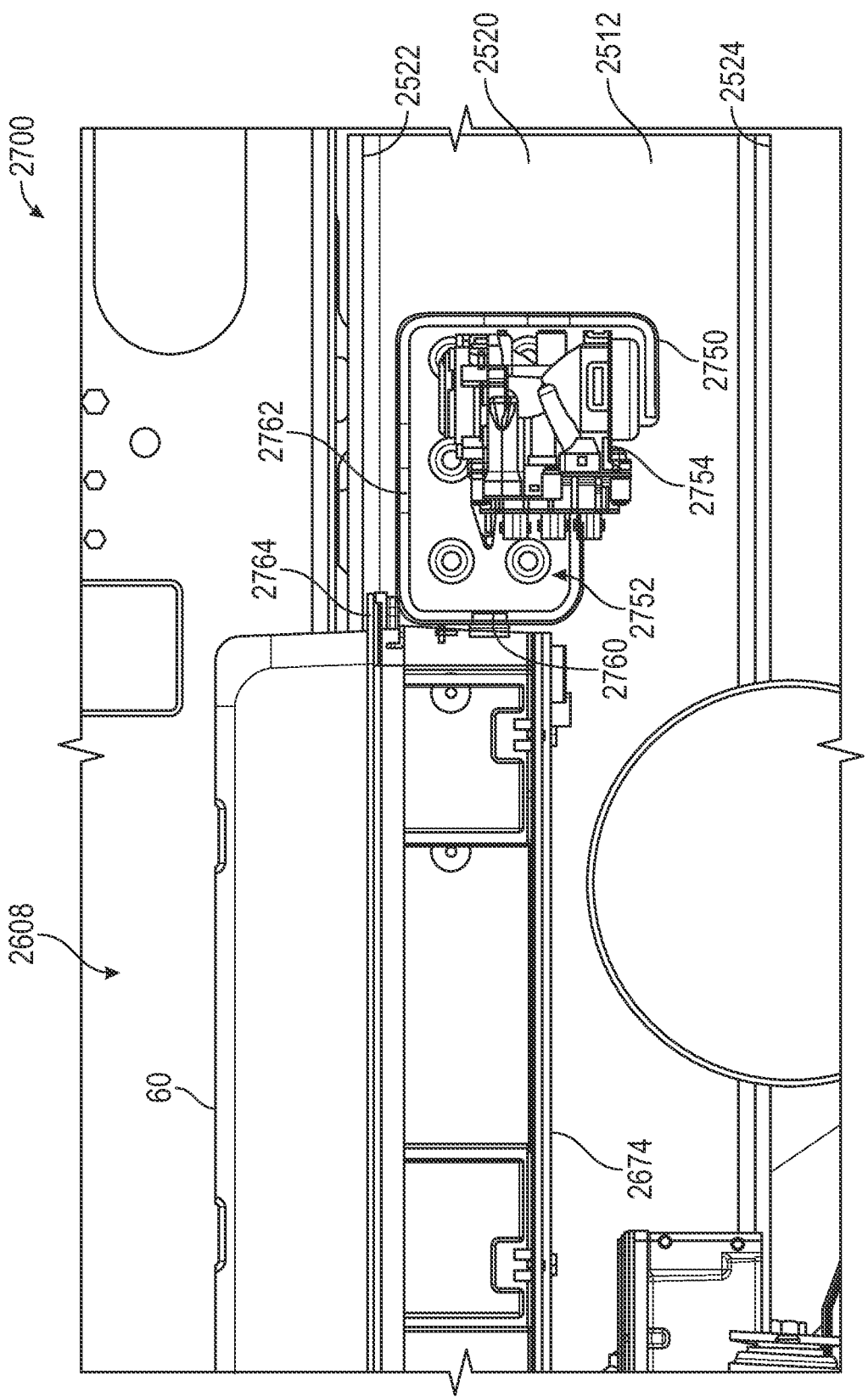
FIG. 34 is a left side view of a portion of the battery system and the vehicle chassis of FIG. 28 illustrating a rear cross member, according to an exemplary embodiment.

With specific reference to FIG. 34, the rear cross member 2750 includes one or more sides or walls that define (a) a front face 2760 or surface that faces toward the front end of the vehicle 2700 and (b) a top face 2762 or surface that faces upward. The rear cross member 2750 is positioned immediately rearward of the rear pod 2608. Specifically, the rear cross member 2750 is positioned such that the front face 2760 engages a rear face of the rear pod 2608. This engagement limits (e.g., prevents) rearward longitudinal movement of the rear pod 2608. Accordingly, the rear cross member 2750 defines a rearmost position that the sliding pod 2708 is capable of occupying. In some embodiments, each of the batteries 60 includes a horizontal flange or protrusion, shown as flange 2764, that extends outward from the housing of the batteries 60. In the embodiment shown in FIG. 34, the flange 2764 engages the top face 2762, limiting downward movement of the rear pod 2608.

Figure 35:
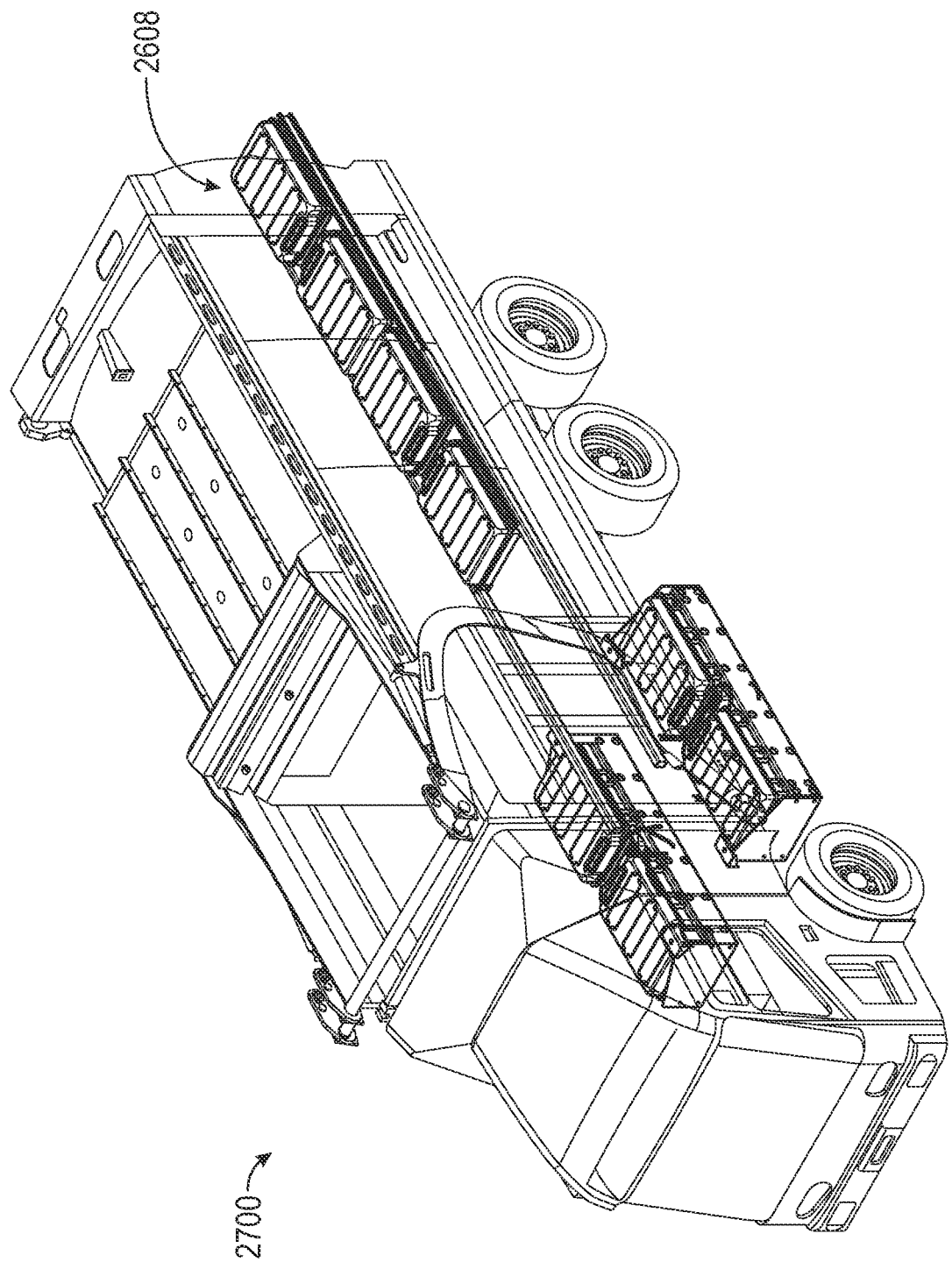
FIG. 35 is a front perspective view of the vehicle of FIG. 28 illustrating the removal of a rear battery pod to a first position, according to an exemplary embodiment.
Figure 36:
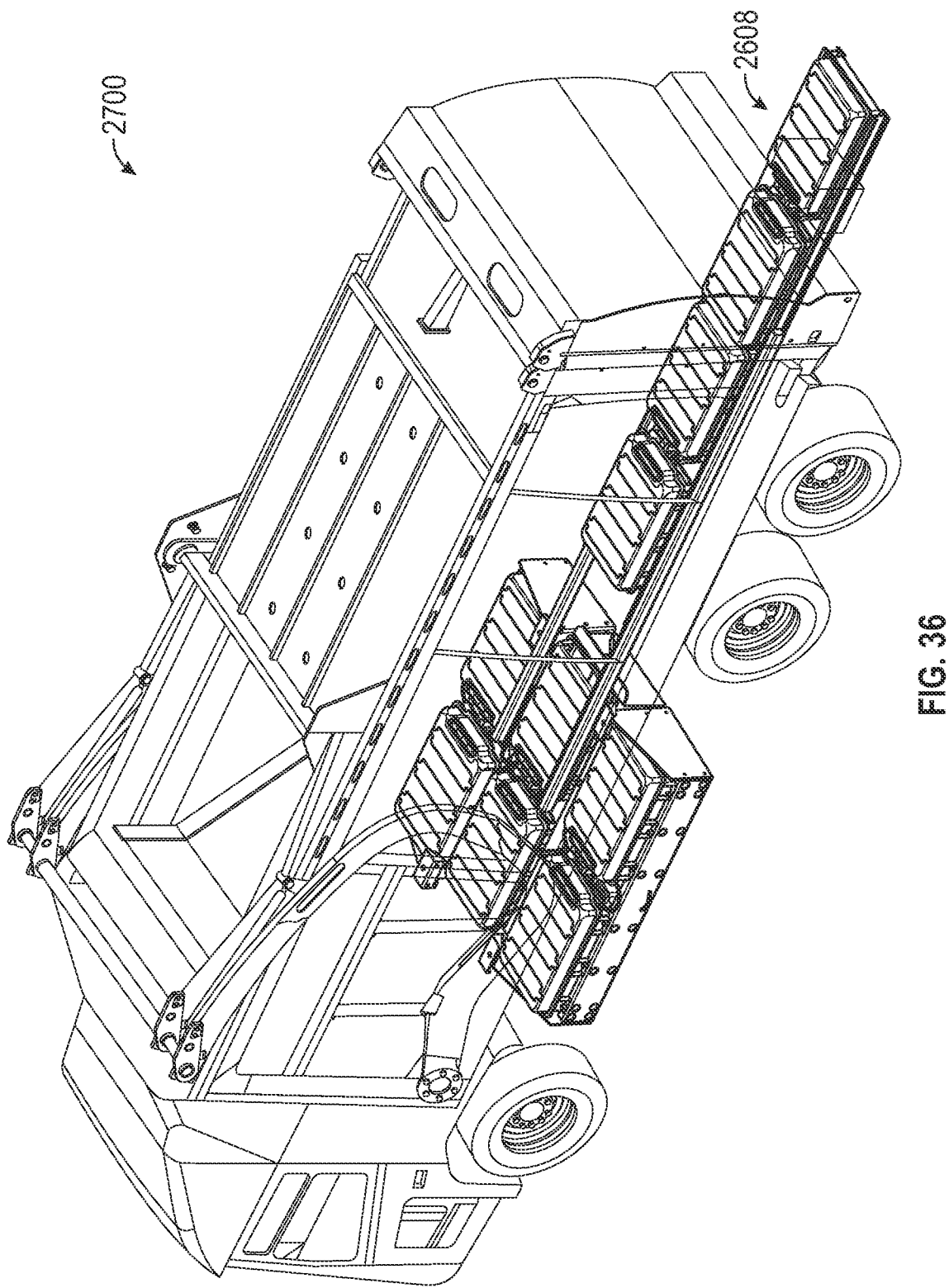
FIG. 36 is a rear perspective view of the vehicle of FIG. 28 illustrating the removal of a rear battery pod to a first position, according to an exemplary embodiment.
Figure 37:
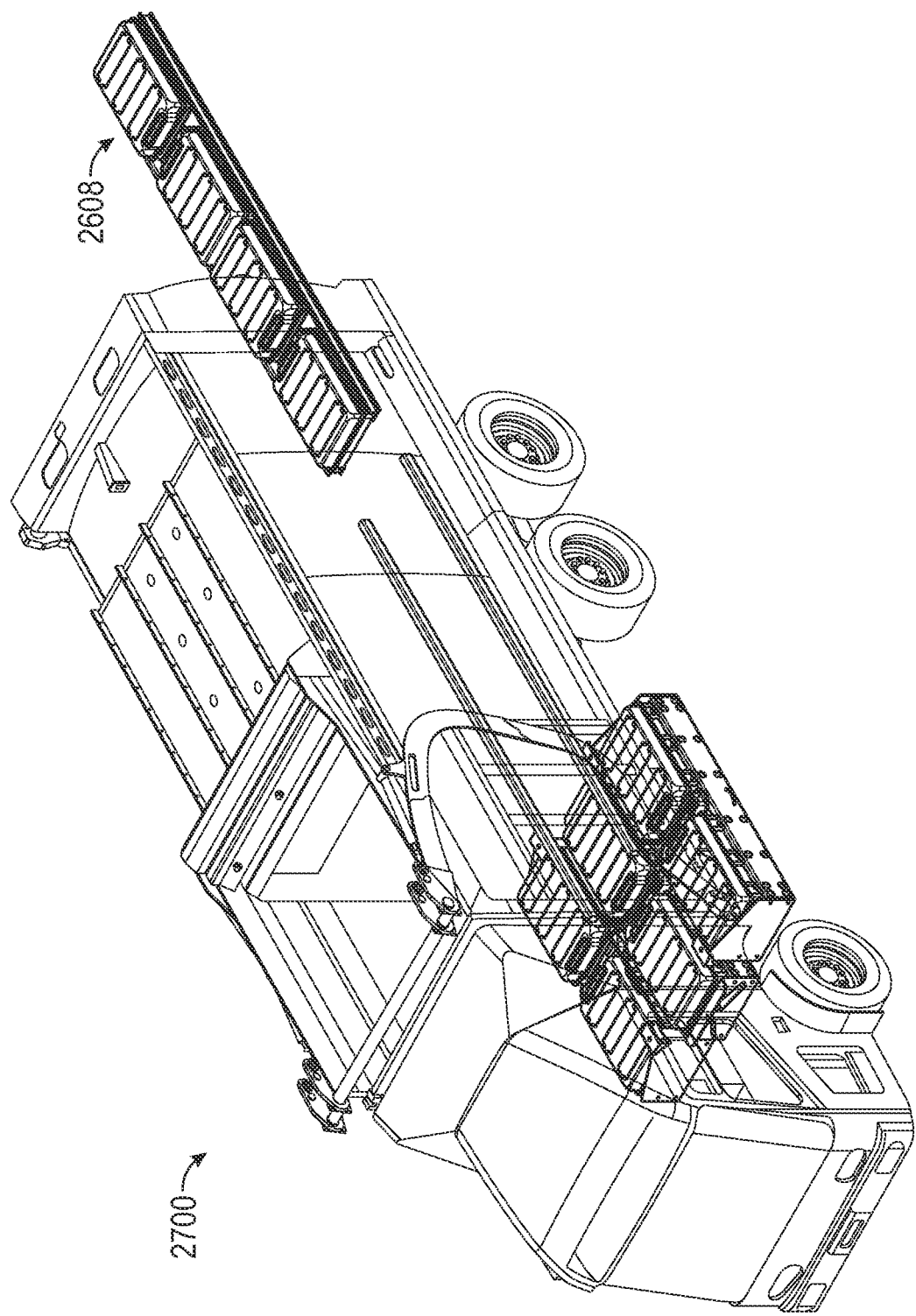
FIG. 37 is a front perspective view of the vehicle of FIG. 28 illustrating the removal of a rear battery pod to a second position, according to an exemplary embodiment.
Figure 38:
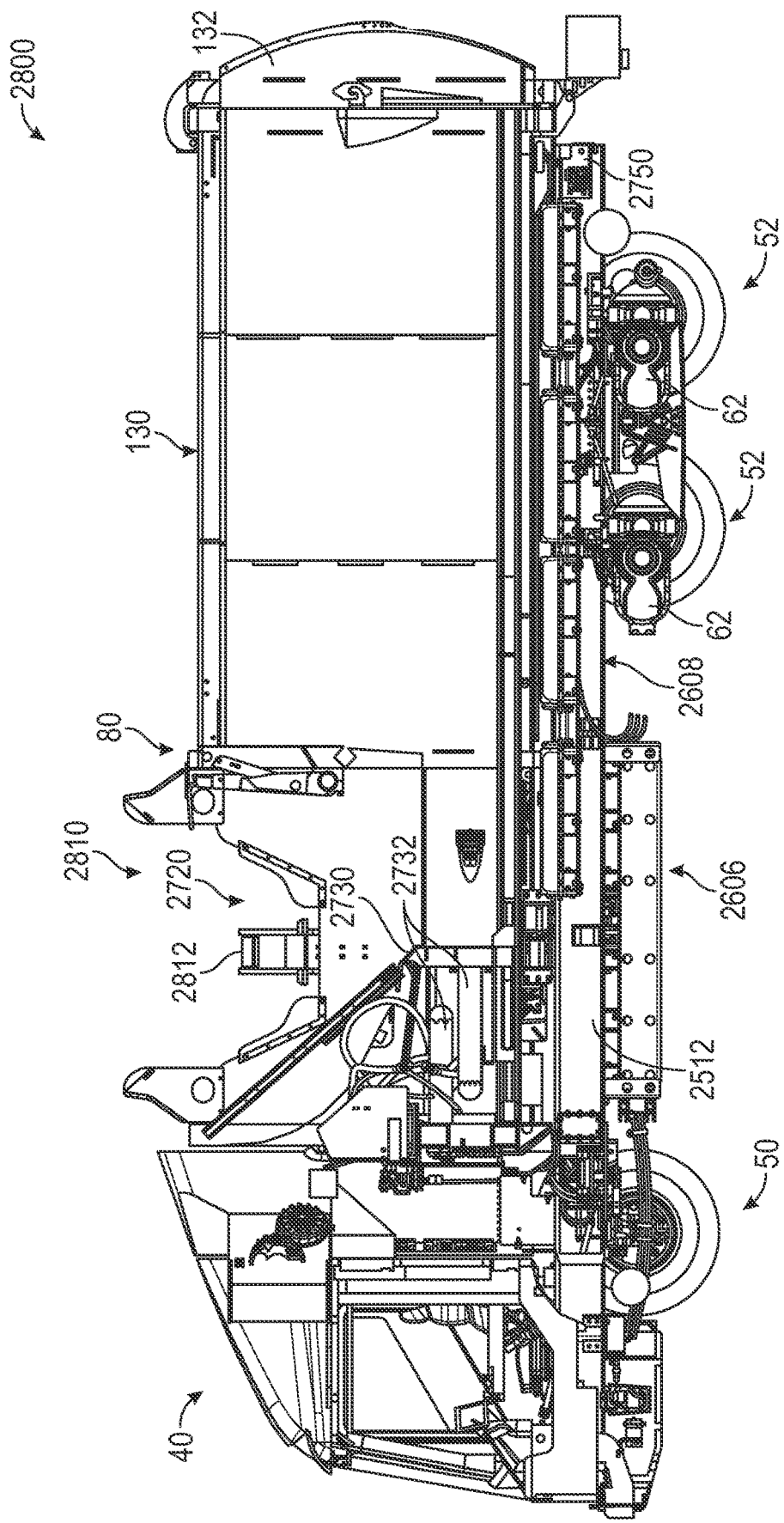
FIG. 38 is a left section view of the vehicle of FIG. 14 configured as a side-loading refuse vehicle and including the battery system, according to an exemplary embodiment.
Figure 39:
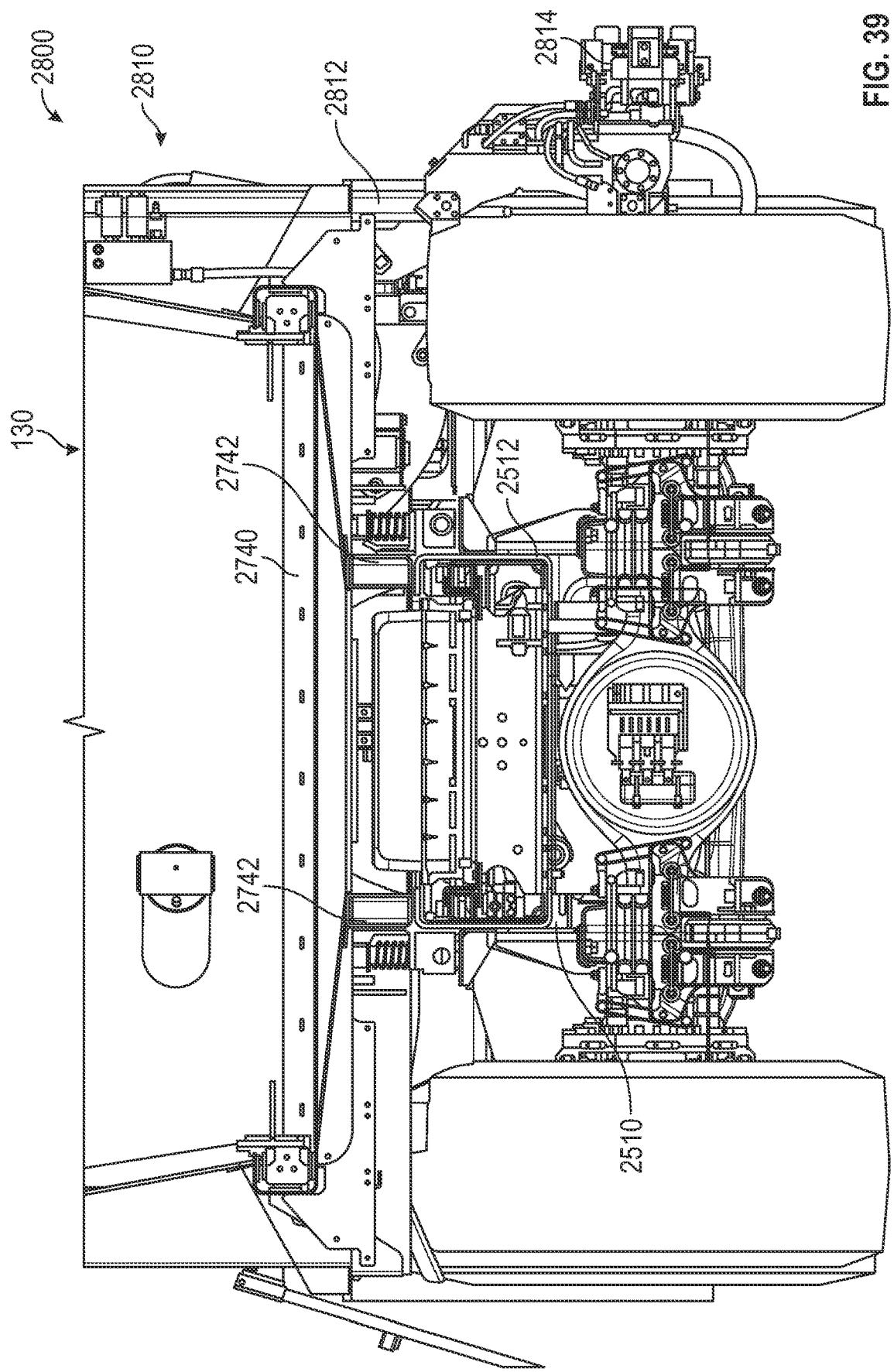
FIG. 39 is a rear view of the battery system and the vehicle chassis of FIG. 38, according to an exemplary embodiment.
Figure 40:
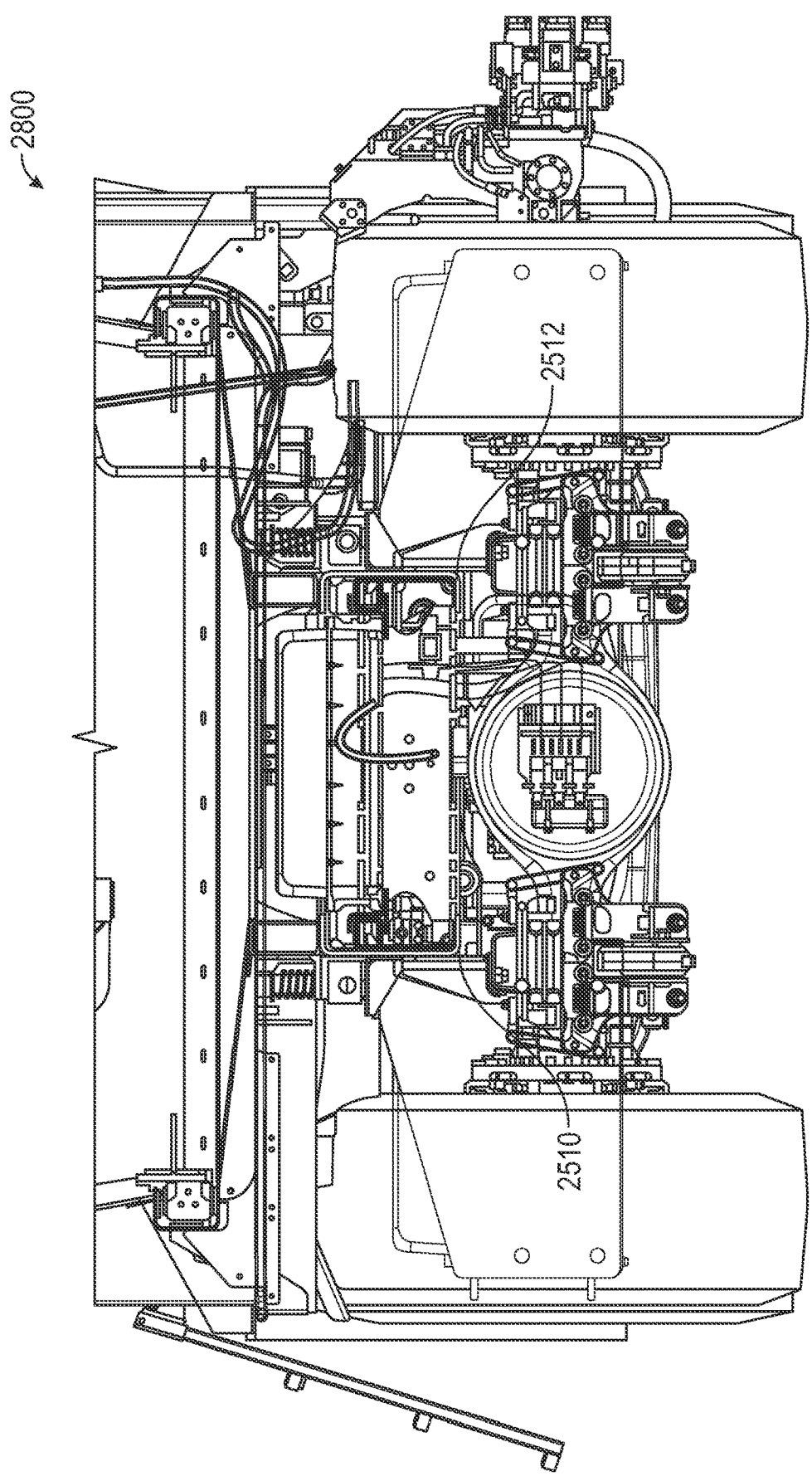
FIG. 40 is a rear section view of the battery system and the vehicle chassis of FIG. 38, with battery trays being transparent, according to an exemplary embodiment.
Figure 41:
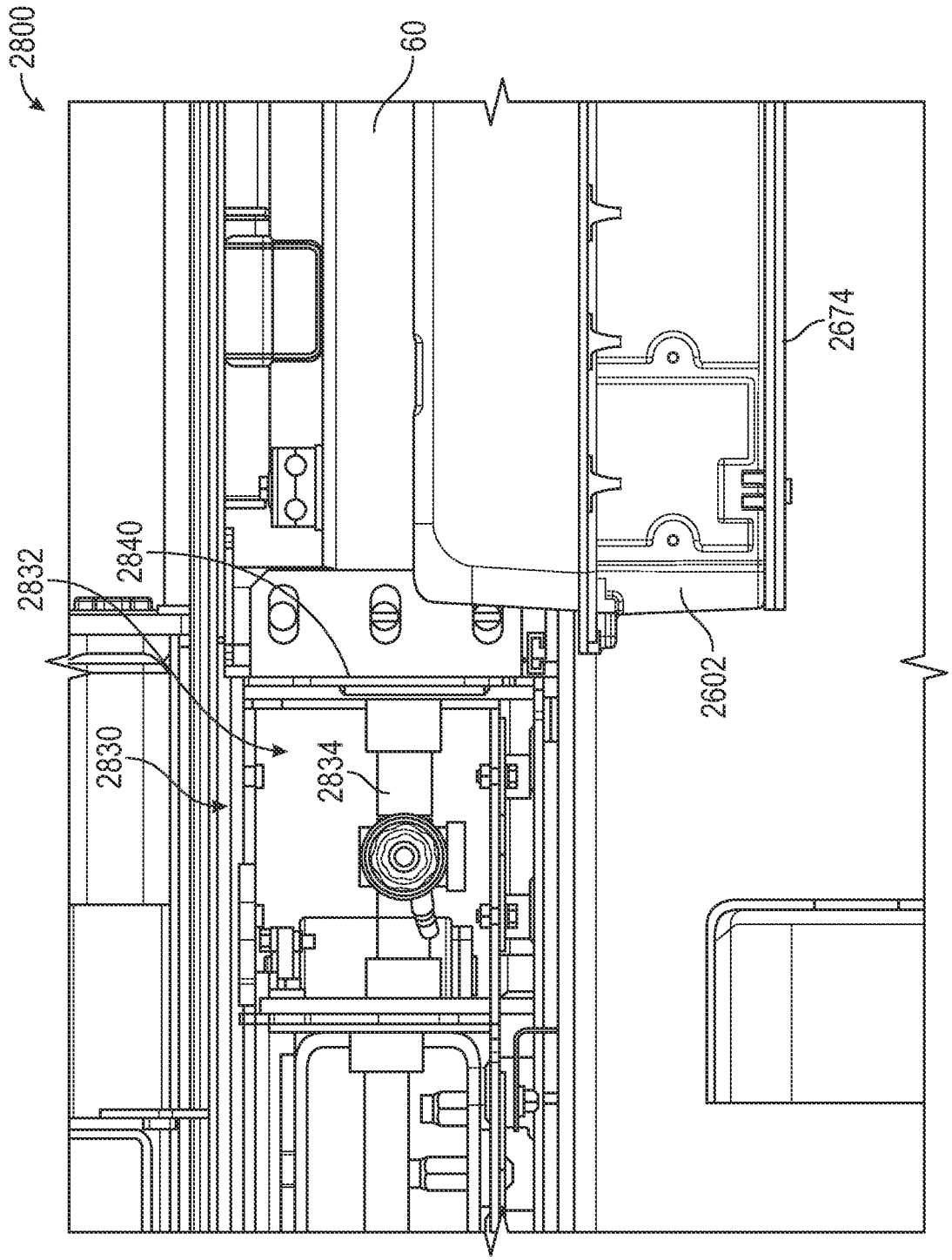
FIG. 41 is a left side view of a portion of the battery system and the vehicle chassis of FIG. 38 illustrating a front cross member, according to an exemplary embodiment.

As discussed herein, the slide assemblies 2674 may limit (e.g., prevent) lateral and vertical movement of the rear pod 2608. The cab 40 and/or the refuse compartment 130 may limit (e.g., prevent) forward longitudinal movement of the rear pod 2608. Accordingly, when the rear cross member 2750 is installed in the chassis 20, the rear cross member 2750 may prevent the rear pod 2608 from disengaging the chassis 20 and being removed from the vehicle 2700. In some embodiments, the rear cross member 2750 is selectively coupled to the frame member 2510 and the frame member 2512 such that the rear cross member 2750 is selectively removable. By way of example, each end of the rear cross member 2750 may be selectively coupled to the frame member 2510 or the frame member 2512. In such embodiments, the rear cross member 2750 may be removed from the chassis 20 to facilitate removal of the rear pod 2608 from the rear of the vehicle 2700. FIGS. 35-37 illustrate the removal of the rear pod 2608 from the rear of the vehicle 2700.

Referring to FIGS. 38-41, a vehicle 2800 is shown as another exemplary configuration of the vehicle 2500. Accordingly, any description herein with respect to the vehicle 10 and/or the vehicle 2500 may apply to the vehicle 2800 except as otherwise specified. The vehicle 2800 may be substantially similar to the vehicle 2700, except as otherwise specified. The application kit 80 of the vehicle 2800 is selected such that the vehicle 2800 is configured as a side-loading refuse vehicle (e.g., a refuse truck, a garbage truck, a waste collection truck, a sanitation truck, a recycling truck, etc.).

The vehicle 2800 includes an implement (e.g., a side-loading lift assembly), shown as lift assembly 2810. The lift assembly 2810 includes a track or guide, shown as track 2812, that extends upward along a side of the refuse compartment 130. The track 2812 may be coupled to the chassis 20 and/or to the refuse compartment 130. The lift assembly 2810 further includes an end effector or interface, shown as grabber 2814. The grabber 2814 is slidably coupled to the track 2812 and configured to move along a length of the track 2812. The grabber 2814 is configured to engage and selectively couple to a refuse container (e.g., a residential can). Once engaged with the refuse container, the grabber 2814 is configured to move upward along the length of the track 2812. When the grabber 2814 nears the end of the track 2812, the track 2812 curves, causing the grabber 2814 to invert the refuse container. This movement empties the contents of the refuse container into the refuse compartment 130 through the hopper aperture 2720.

The vehicle 2800 further includes a lateral frame member, shown as front cross member 2830. The front cross member 2830 is coupled to the top flanges 2522 of the frame rails 2510 and 2512, such that the front cross member 2830 extends from the frame rail 2510 to the frame rail 2512. The front cross member 2830 extends upward from the top flanges 2522. The front cross member 2830 includes walls that define a laterally-extending passage 2832. A shaft, shown as drive shaft 2834, extends across the passage 2832. In some embodiments, the drive shaft 2834 is configured to transfer rotational mechanical energy to the lift assembly 108 to drive the lift assembly. By way of example, the drive shaft 2834 may drive the grabber 2814 to move along the length of the track 2812. By way of another example, the drive shaft 2834 may drive the grabber 2814 to open or close to engage a refuse container.

The front cross member 2830 includes one or more sides or walls that define a rear face 2840 or surface that faces toward the rear end of the vehicle 2800. The front cross member 2830 is positioned immediately forward of the rear pod 2608. Specifically, the front cross member 2830 is positioned such that the rear face 2840 engages a front face of the rear pod 2608. This engagement limits (e.g., prevents) forward longitudinal movement of the rear pod 2608. Accordingly, the front cross member 2830 defines a front position that the rear pod 2608 is capable of occupying.

As discussed herein, the slide assemblies 2674 may limit (e.g., prevent) lateral and vertical movement of the rear pod 2608. The front cross member 2830 may limit (e.g., prevent) forward longitudinal movement of the rear pod 2608. The rear cross member 2750 may limit (e.g., prevent) rearward longitudinal movement of the rear pod 2608. Accordingly, when the front cross member 2830 and the rear cross member 2750 are installed in the chassis 20, the front cross member 2830 and the rear cross member 2750 may each prevent the rear pod 2608 from disengaging the chassis 20 and being removed from the vehicle 2700 or the vehicle 2800.

Figure 44:
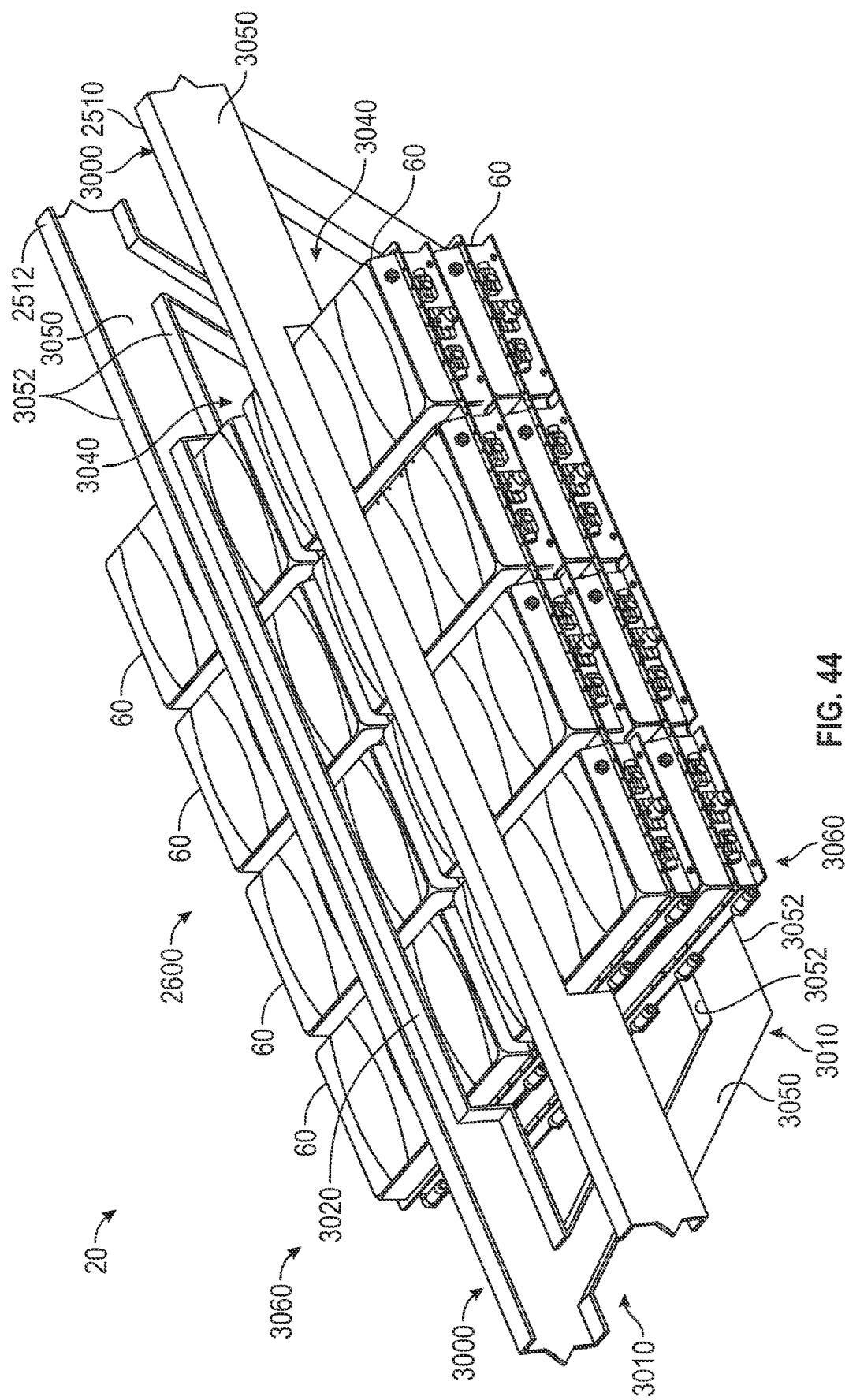
FIG. 44 is a perspective view of the frame rails and batteries of the vehicle of FIG. 14, according to an exemplary embodiment.
Figure 45:
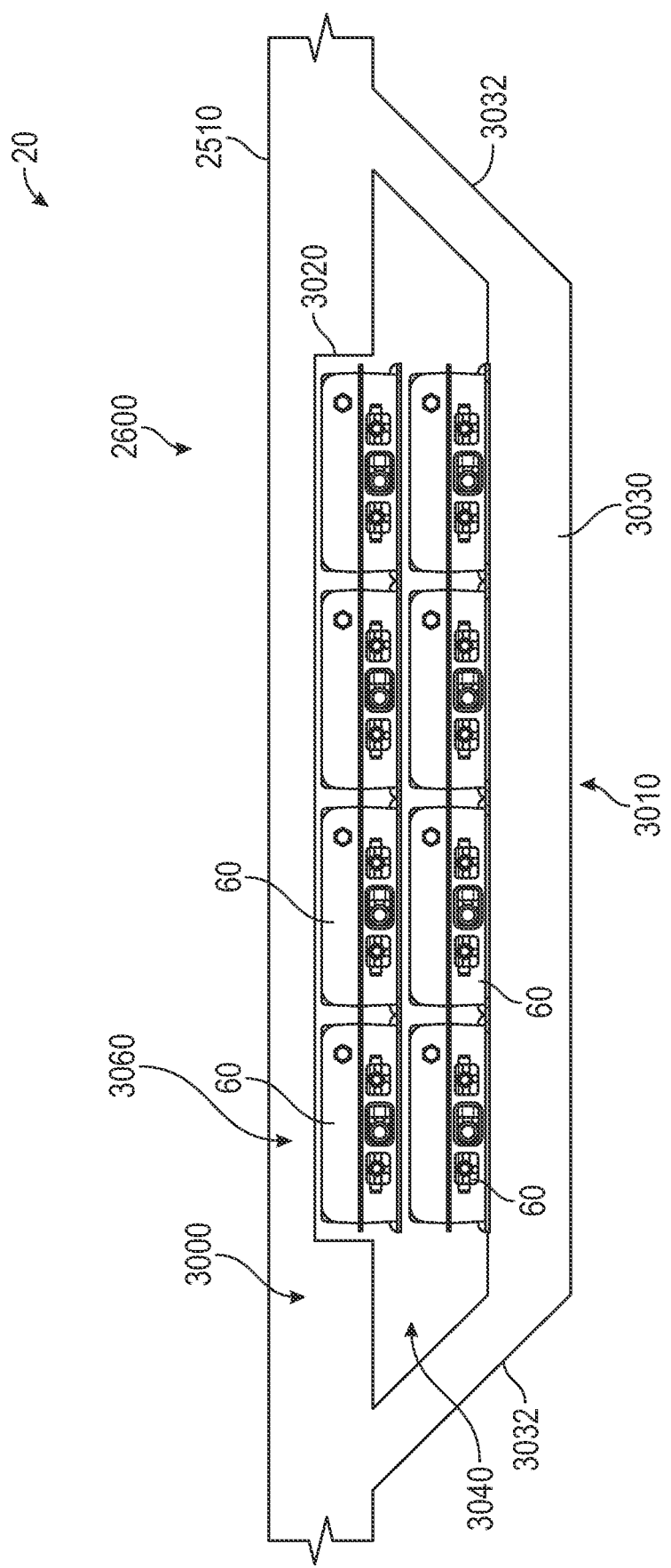
FIG. 45 is a left side view of the frame rails and batteries of the vehicle of FIG. 44, according to an exemplary embodiment.

Referring to FIGS. 44 and 45, an alternative configuration of the chassis 20 is shown, according to an exemplary embodiment. In this embodiment, the frame rails 2510 and 2512 are formed around the battery system 2600 such that the frame rails 2510 and 2512 contain and support the batteries 60. Specifically, each frame rail 2510 is formed to include a first frame section or member, shown as upper section 3000, and a second frame section or member, shown as lower section 3010. The upper section 3000 generally extends above the battery system 2600, and the lower section 3010 generally extends below the battery system 2600. The upper section 3000 is fixedly coupled to the lower section 3010. By way of example, the upper section 3000 may be welded to the lower section 3010. By way of another example, the upper section 3000 may be bolted to the lower section 3010. By way of another example still, the upper section 3000 may be formed as a single, continuous piece with the lower section 3010.

The upper section 3000 generally extends longitudinally, following the paths of the other frame rails 2510 and 2512 described herein. The upper section 3000 further defines a downward-facing recess, shown as frame notch 3020. The frame notch 3020 extends partway along the length of the upper section 3000. The frame notch 3020 extends laterally through the entire width of the upper section 3000. The frame notch 3020 extends partway through the vertical height of the upper section 3000 (e.g., halfway through the vertical height of the upper section 3000). By way of example, the length of the frame notch 3020 may be sized to receive a predetermined number of batteries 60 (e.g., four batteries, five batteries, three batteries, etc.).

Each lower section 3010 includes a main portion, central portion, or member, shown as lower support 3030, and a pair of angled or connecting sections, shown as angled members 3032. The lower support 3030 extends horizontally, substantially parallel to the upper section 3000. The lower support 3030 extends directly beneath the batteries 60, supporting the batteries 60. Each end of the lower support 3030 is coupled to one of the angled members 3032. Each angled member 3032 extends upward toward the upper section 3000, coupling the lower support 3030 with the upper section 3000. Together, the upper section 3000, the lower support 3030, and the angled members 3032 form a continuous loop defining an aperture, shown as battery aperture 3040.

Each of the upper section 3000, the lower support 3030, and the angled members 3032 include (a) a first portion or vertical portion (e.g., a wall, a plate, a flange, etc.), shown as base plate 3050, and (b) a pair of second portions or lateral portions (e.g., a wall, a plate, a flange, etc.), shown as flanges 3052. The flanges 3052 are positioned at opposing edges of the base plate 3050 and extend laterally inward toward a longitudinal centerline of the vehicle 10. Accordingly, each of the upper section 3000, the lower support 3030, and the angled members 3032 has a substantially C-shaped cross section.

In the embodiment of the battery system 2600 shown, the battery system 2600 includes sixteen total batteries 60. The batteries are arranged in two layers, each layer including eight batteries 60. The batteries 60 are arranged in two longitudinal columns 3060, each column 3060 including eight batteries 60. Each column 3060 is contained within one of the battery apertures 3040. In this position, the column 3060 is received within the frame notch 3020, such that the upper section 3000 longitudinal (e.g., forward or rearward) movement of the column 3060. The column 3060 rests atop the lower support 3030, such that the lower support 3030 supports the weight of the batteries 60. The lower section 3010 may advantageously distribute the weight of the batteries 60 along the length of the frame rails 2510 and 2512. In some embodiments, the overall lateral width of the battery system 2600 is approximately 82 inches.

The batteries 60 may be coupled to the frame rails 2510 and 2512 through fasteners, friction, adhesive, or another attachment method. In some embodiments, the batteries 60 are removably coupled to the frame rails 2510 and 2512. By way of example, the batteries 60 may be selectively decoupled from the frame rails 2510 and 2512 and removed by shifting the batteries 60 laterally outward.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A vehicle comprising:
a chassis including a first frame rail and a second frame rail extending longitudinally;
a tractive element coupled to the chassis;

a drive motor configured to drive the tractive element to propel the vehicle; and
an energy storage system comprising:
a first battery module comprising a first array of batteries positioned within a first housing, the first housing removably and directly coupled to the chassis and extending between the first frame rail and the second frame rail; and
a second battery module comprising a second housing and a second array of batteries positioned within the second housing, the second housing removably and directly coupled to an outer surface of the first frame rail, the first housing removable from the chassis separate from the second housing, wherein at least a portion of the second housing is positioned transverse to and at the same longitudinal position as at least a portion of the first housing;
wherein the energy storage system is selectively reconfigurable between (a) a first configuration in which the first battery module and the second battery module each provide electrical energy to the drive motor and (b) a second configuration in which the first battery module is removed from the vehicle and the second battery module provides electrical energy to the drive motor.

2. The vehicle of claim 1, wherein at least one of the first battery module or the second battery module is arranged along a longitudinal centerline defined by the chassis.

3. The vehicle of claim 1, wherein the second battery module is positioned laterally outwardly from the first frame rail or the second frame rail.

4. The vehicle of claim 1, wherein the chassis defines a front section, a middle section, and a rear section, wherein the first battery module and the second battery module are positioned within the middle section.

5. The vehicle of claim 1, wherein the chassis defines a front section, a middle section, and a rear section, wherein the first battery module is positioned within the middle section and the second battery module extends between the middle section and the rear section.

6. The vehicle of claim 1, wherein the first frame rail and the second frame rail each include a top flange and a bottom flange, and wherein a top surface of the second battery module is arranged vertically between the top flanges and the bottom flanges.

7. The vehicle of claim 1, further comprising a third battery module comprising a third housing and a third array of batteries positioned within the third housing, the third housing removably and directly coupled to the chassis, wherein the second battery module is positioned laterally outwardly from the first frame rail, and the third battery module is positioned laterally outwardly from the second frame rail.

8. The vehicle of claim 1, further comprising a third battery module comprising a third housing and a third array of batteries positioned within the third housing, the third housing removably and directly coupled to the chassis, and a fourth battery module comprising a fourth housing and a fourth array of batteries positioned within the fourth housing, the fourth housing removably and directly coupled to the chassis, wherein at least a portion of the third housing is positioned transverse to and at the same longitudinal position as at least a portion of the first housing.

9. The vehicle of claim 1, further comprising a refuse compartment coupled to the first frame rail and the second frame rail.

10. The vehicle of claim 9, wherein the energy storage system is positioned below and covered by the refuse compartment.

11. The vehicle of claim 1, wherein the first housing includes a first slide assembly configured to slidably couple to the first frame rail and a second slide assembly configured to slidably couple to the second frame rail.

12. The vehicle of claim 11, wherein the first housing is removable from the first frame rail and the second frame rail by sliding the first housing longitudinally rearward along the chassis.

13. The vehicle of claim 11, wherein the chassis comprises a first slide rail coupled to the first frame rail and a second slide rail coupled to the second frame rail, wherein the first slide assembly includes a first slide pad in sliding contact with an upper surface of the first slide rail, and the second slide assembly includes a second slide pad in sliding contact with an upper surface of the second slide rail.

14. The vehicle of claim 13, wherein the first slide rail is coupled to an inner surface of the first frame rail, wherein the second housing is coupled to the outer surface of the first frame rail opposite the inner surface.

15. The vehicle of claim 14, further comprising a third battery module comprising a third housing and a third array of batteries positioned within the third housing, the third housing removably and directly coupled to the chassis, the third housing coupled to a first lower flange of the first frame rail and a second lower flange of the second frame rail.

16. The vehicle of claim 15, wherein at least a portion of the first housing is positioned transverse to and at the same longitudinal position as at least a portion of the third housing.

17. A vehicle comprising:
a chassis including a first frame rail and a second frame rail;
a cab coupled to the chassis;
a tractive element coupled to the chassis;
a drive motor configured to drive the tractive element to propel the vehicle;
an energy storage system comprising:
a first battery module comprising a first array of batteries positioned within a first housing, the first housing removably and directly coupled to the chassis and extending between the first frame rail and the second frame rail;
a second battery module comprising a second housing and a second array of batteries positioned within the second housing, the second housing removably and directly coupled to an outer surface of the first frame rail, the first housing removable from the chassis separate from the second housing, wherein at least a portion of the second housing is positioned transverse to and at the same longitudinal position as at least a portion of the first housing; and
a third battery module comprising a third housing and a third array of batteries positioned within the third housing, the third housing removably and directly coupled to the chassis,
wherein the first battery module, the second battery module, or the third battery module provides electrical energy to the drive motor, and wherein the first battery module, the second battery module, and the third battery module are positioned rearward from the cab so that a gap is formed between a rear end of the cab and a front end of each of the first battery module, the second battery module, and the third battery module, and wherein the energy storage system is selectively reconfigurable between (a) a first configuration in which the first battery module, the second battery module, and the third battery module each provide electrical energy to the drive motor and (b) a second configuration in which the first battery module is removed from the vehicle and the second battery module and the third battery module provide electrical energy to the drive motor.

18. The vehicle of claim 17, further comprising a refuse compartment coupled to the first frame rail and the second frame rail, and wherein the energy storage system is positioned below and covered by the refuse compartment.

19. A refuse vehicle comprising:
a chassis including a first frame rail and a second frame rail;
a tractive element coupled to the chassis;
a drive motor configured to drive the tractive element to propel the vehicle;
a refuse compartment coupled to and supported on the chassis;
an actuator coupled to or arranged within the refuse compartment; and
an energy storage system comprising:
a first battery module comprising a first array of batteries positioned within a first housing, the first housing removably and directly coupled to the chassis and extending between the first frame rail and the second frame rail; and
a second battery module comprising a second housing and a second array of batteries positioned within the second housing, the second housing removably and directly coupled to an outer surface of the first frame rail, the first housing removable from the chassis separate from the second housing, wherein at least a portion of the second housing is positioned transverse to and at the same longitudinal position as at least a portion of the first housing;
wherein the energy storage system provides power to the drive motor and the actuator, and wherein the energy storage system is positioned below and covered by the refuse compartment, wherein the energy storage system is selectively reconfigurable between (a) a first configuration in which the first battery module and the second battery module each provide electrical energy to the drive motor and (b) a second configuration in which the first battery module is removed from the vehicle and the second battery module provides electrical energy to the drive motor.

20. The refuse vehicle of claim 19, further comprising a third battery module comprising a third housing and a third array of batteries positioned within the third housing, the third housing removably and directly coupled to the chassis, wherein at least a portion of the third battery module is positioned transverse to and at the same longitudinal position as at least a portion of the first battery module.

* * * * *